(12) United States Patent
Rottier et al.

(10) Patent No.: US 11,332,317 B1
(45) Date of Patent: May 17, 2022

(54) TOOLLESS REMOVABLE WEAR STRIP AND/OR GUIDE RAIL FOR A CONVEYOR

(71) Applicant: Nercon Eng. & Mfg., Inc., Neenah, WI (US)

(72) Inventors: Andrew Francis Rottier, Suamico, WI (US); Jeffrey Kent Falash, Crivitz, WI (US); Michael Paul Weickert, Oshkosh, WI (US)

(73) Assignee: Nercon Eng. & Mfg., Inc., Neenah, WI (US)

( * ) Notice: Subject to any disclaimer, the term of this patent is extended or adjusted under 35 U.S.C. 154(b) by 0 days.

(21) Appl. No.: 17/114,428

(22) Filed: Dec. 7, 2020

Related U.S. Application Data

(63) Continuation-in-part of application No. 16/228,409, filed on Dec. 20, 2018, now Pat. No. 10,858,193.

(60) Provisional application No. 62/609,175, filed on Dec. 21, 2017.

(51) Int. Cl.
*B65G 21/02* (2006.01)
*B65G 21/22* (2006.01)
*B65G 15/62* (2006.01)

(52) U.S. Cl.
CPC ............. *B65G 21/02* (2013.01); *B65G 15/62* (2013.01); *B65G 21/22* (2013.01); *B65G 2207/48* (2013.01)

(58) Field of Classification Search
CPC .. B65G 17/086; B65G 21/18; B65G 2207/24; B65G 21/22; B65G 15/62; B65G 2207/26; B65G 21/02
USPC ................................................. 198/837, 841
See application file for complete search history.

(56) References Cited

U.S. PATENT DOCUMENTS

| | | | | |
|---|---|---|---|---|
| 3,779,368 A | * | 12/1973 | Smith | B65G 21/02 198/841 |
| 3,964,800 A | * | 6/1976 | Grimes | B65G 21/20 384/42 |
| 4,325,480 A | * | 4/1982 | Butt | B65G 21/02 198/841 |
| 5,111,929 A | * | 5/1992 | Pierick | A21B 3/16 134/145 |
| 5,137,145 A | * | 8/1992 | Clopton | B65G 21/06 198/841 |
| 5,186,314 A | * | 2/1993 | Clopton | B65G 21/06 198/841 |
| 5,190,145 A | * | 3/1993 | Ledginham | B65G 21/22 198/841 |
| 5,355,994 A | * | 10/1994 | Foster | B65G 25/065 198/750.2 |

(Continued)

*Primary Examiner* — James R Bidwell
(74) *Attorney, Agent, or Firm* — Brannen Law Office, LLC

(57) ABSTRACT

A wear strip for a conveyor having a frame with frame spacers is provided. There are two frame spacers at one end of the frame, each having at least one lock. The lock has a riser and a head, wherein the head is wider than the riser forming a generally but not limited to T-shaped profile. A wear strip having a hole with an upper cavity and a lower passage having a wide gap and narrow gap is provided. The wear strip can be secured by the lock. This is accomplished by mounting the wear strip on the frame spacers so that the head of the lock projects into the upper cavity of the wear strip. Then, the wear strip is longitudinally moved so that the riser enters the narrow gap in the wear strip. Longitudinal wear strips can be inserted that longitudinally lock the wear strips in place.

21 Claims, 59 Drawing Sheets

(56) References Cited

U.S. PATENT DOCUMENTS

| | | | | |
|---|---|---|---|---|
| 5,419,426 | A * | 5/1995 | Foster | B65G 25/065 |
| | | | | 198/750.4 |
| 6,523,679 | B1 * | 2/2003 | Manchester | B65G 15/62 |
| | | | | 198/841 |
| 6,533,108 | B1 * | 3/2003 | Ledingham | B65G 21/02 |
| | | | | 198/841 |
| 7,681,719 | B2 * | 3/2010 | Hosch | B65G 21/105 |
| | | | | 198/861.1 |
| 7,757,840 | B2 * | 7/2010 | Rogers | B65G 47/8823 |
| | | | | 198/841 |
| 9,670,003 | B2 * | 6/2017 | Ferguson | B65G 39/12 |
| 10,329,093 | B2 * | 6/2019 | Bannerman | B65G 21/22 |
| 10,858,193 | B1 * | 12/2020 | Rottier | B65G 21/22 |
| 2013/0277181 | A1 * | 10/2013 | Kuiper | B65G 15/62 |
| | | | | 198/841 |
| 2016/0355347 | A1 * | 12/2016 | Rottier | F16B 2/12 |

* cited by examiner

TOOLLESS REMOVABLE WEAR STRIP AND/OR GUIDE RAIL FOR A CONVEYOR

This United States utility patent application (Continuation-In-Part) claims priority on and the benefit of pending nonprovisional application Ser. No. 16/228,409, filed Dec. 20, 2018, which itself claims priority on and the benefit of provisional application 62/609,175 filed Dec. 21, 2017, the entire contents of both are hereby incorporated herein by reference.

BACKGROUND OF THE INVENTION

1. Field of the Invention

The present invention relates to a wear strip for a conveyor, and in particular to a wear strip that is replaceable without tools.

2. Description of the Related Art

Many types of conveyor systems currently exist. Many are designed with replaceable wear parts that can be replaced as needed. Designing in wear elements can protect and extend the lifespan of the conveyor assembly, as individual components that are subject to stresses and damage during use can be replaced.

Some examples include:

U.S. Pat. No. 3,779,368 to Smith is titled Wear Strip Construction for Conveyor. It shows an improved wear strip construction for a conveyor. The conveyor includes a pair of spaced side walls and the upper and lower extremities of each side wall are provided with inwardly extending flanges. Metal wear strips are snap fitted on the upper flanges of the side walls and serve to support the side edges of a plastic link belt conveyor chain in a conveying path of travel, while a sinusoidal metal wear strip is supported on the lower flanges of the side walls and serves to support the link chain in its return path of travel.

U.S. Pat. No. 3,964,800 to Grimes et al. is titled Wear Strip. It shows a wear strip for conveyor chains comprising a flat upper wear member having at least two spaced-apart holes therethrough for the reception of connection means, at least one linear support member joined to the underside of the wear member, and at least two base members joined to the underside of the wear member and having holes therethrough in registry with the holes through the wear member. The whole wear strip is preferably integrally injection molded, and each of the holes in the wear member are preferably countersunk on the upper surface. Two embodiments are disclosed, one in which one linear support member is joined to the wear member along each lateral edge thereof and one in which a single linear support member is joined to the wear member along one lateral edge thereof.

U.S. Pat. No. 4,325,480 to Butt is titled Conveyor Support Way. It shows a conveyor support way for a table top chain comprises a series of alternating first and second cross members in spaced disposition transverse to the axis of the conveyor support way. Each of the first cross members contains a first pair of open top spaces and each of said second cross members contains a second pair of open top spaces, the first pair of spaces being disposed laterally inwardly of the second pair of spaces. A pair of serpentine wear strips are provided to support the chain, each of the wear strips extending along the length of the series of cross members, alternately through an associated one of the first cross member spaces and through an associated one of the second cross member spaces. Each wear strip is axially slidably and easily removably mounted on the series of cross members.

U.S. Pat. No. 5,186,314 to Clopton is titled Conveyor System. It shows a conveyor system is provided comprising conveyor beams, conveyor frame members, conveyor accessory mounting brackets, connectors, wearstrip converters, and various combinations of each. The conveyor beam comprises first and second side walls connected in one piece by an integral web, a first flange disposed along at least the tops of the side walls to support a conveyor, and at least two mounting slots on outer surfaces of each side wall. The conveyor frame members comprise at least three mounting slots formed in sides thereof, at least one of the mounting slots open to each of three different directions, and at least one flange disposed along an edge of the frame member to support a conveying surface. The brackets are for mounting conveyor accessories to the conveyor beams and frame members. The connectors are for connecting conveyor beams or frame members together. And the converters are for altering the location or orientation of wearstrips.

U.S. Pat. No. 5,190,145 to Ledginham et al. is titled Apparatus for Supporting Conveyor Belts. It shows a multifunction return-way system for one or more chains in a conveyor system. U-shaped mounting clips, having U-shaped arm ends, are snapped onto cross members between frame portions of the conveyor system, and are shaped to have snapped therein wear strips that are oriented in serpentine manner as viewed from above. Portions of the wear strips are maintained spaced apart by spacers mounted onto the rods and by spacer pins that are provided on the mounting clips for association with each other or with side frames. The mounting clips are thus trapped in desired locations. Intermediate clips, or pinch clips, are provided to hold central regions of the wear strips close to each other, at regions where there are no cross members.

U.S. Pat. No. 5,355,994 to Foster is titled Replaceable Wear Surface for Conveyor Slats. It shows a replaceable wear plate assembly for a reciprocating floor conveyor that includes a plurality of elongated slat members mounted adjacent each other in a common plane. A replaceable wear plate is provided for each slat member of the reciprocating floor conveyor. The slat members are formed with a ridge and inwardly projecting lip extending along the side edges of each slat member. The ridge and lip portion form a slot along the side edges of the slat members for receiving the side edges of the replaceable wear plates. The ridge and lip portion and the edges of the wear plates form a tongue and groove arrangement whereby the movement of the wear plate is restricted sideways and in a vertical direction. A connector is provided to secure each wear plate to its slat member in order to restrict movement of the wear plate longitudinally along its length.

U.S. Pat. No. 5,419,426 to Foster is titled Snap-in Conveyor Slat Wear Plate. It shows a wear plate for each conveyor slat of a reciprocating floor conveyor, each wear plate biased laterally by an O-ring tube, so that one side edge of each wear plate is pressed into a slot formed by a side ridge and lip of a conveyor slat. O-ring tube biases wear plate laterally so that side edge is secured in slot and wear plate is held on conveyor slat.

U.S. Pat. No. 6,523,679 to Manchester is titled Conveyor Frame with Removable Wear Strips. It shows a modular sanitary conveyor includes a longitudinal conveyor bed frame that is slidably received and supported on a support stand and a motor and clutch assembly that is slidably received and supported on the side of the frame. The frame has lateral side walls secured together by a series of cross members and has a serpentine support way for supporting belts and table top chains that is formed of individual wear strips that are installed, retained in place, and removed without the use of tools. Unitary bearings are slidably received in slots at each end of the side walls and rotatably support a drive sprocket shaft and an idler sprocket shaft having respective drive sprockets and idler sprockets slidably received thereon. All components can be easily and quickly disassembled for cleaning and reassembled without the use of special tools.

U.S. Pat. No. 7,681,719 to Hosch et al. is titled Sanitary Conveyor Transfer Tail Assembly. It shows a transfer tail assembly for use with a conveyor assembly that creates a reduced radius transition from the upper run to the lower run of a continuous conveyor belt used with the conveyor assembly. The transfer tail assembly includes a stationary nose bar over which the continuous conveyor belt passes at the end of the conveyor assembly. The nose bar is supported at the end of the conveyor assembly by a series of support brackets mounted to a cross support. Each of the support brackets is formed from a wear resistant material and contacts the conveyor belt as the conveyor belt passes around the transfer tail assembly. The nose bar, support brackets and cross support are mounted within the tail assembly without the use of any external connectors and thus require no tooling to assemble and disassemble.

U.S. Pat. No. 7,757,840 to Rogers et al. is titled Conveyor Wear Bar Assembly. It shows an improved conveyor assembly includes a conveyor belt for conveying a product to one or more product operations is disclosed. Such conveyor assembly includes a pair of spaced apart side frames that support the conveyor belt and between which the conveyor belt rotates. The side frames are formed from an upstanding member and an inwardly extending horizontal member. Both the frame upstanding member and the frame horizontal member carry a series of elongated slots. One or more L-shaped brackets are formed from a generally upstanding member and an inwardly extending member. Both the bracket upstanding member and the bracket horizontal member carry a series of elongated slots. The bracket horizontal member slots are configured to overlay the frame elongate horizontal member slots, and the bracket upstanding member slots are configured to overlay the frame upstanding member slots for attaching components to the frames.

None of these references show the present invention. Thus, there exists a need for a wear strip for a conveyor that solves these and other problems.

SUMMARY OF THE INVENTION

A wear strip for a conveyor having a frame with frame spacers is provided. There are two frame spacers at one end of the frame, each having at least one lock. The lock has a riser and a head, wherein the head is wider than the riser forming a generally but not limited to T-shaped profile. A wear strip having a hole with an upper cavity and a lower passage having a wide gap and narrow gap is provided. The wear strip can be secured by the lock. This is accomplished by mounting the wear strip on the frame spacers so that the head of the lock projects into the upper cavity of the wear strip. Then, the wear strip is longitudinally moved so that the riser enters the narrow gap in the wear strip. Longitudinal wear strips can be inserted that longitudinally lock the wear strips in place.

According to one advantage of the present invention, the wear strip can be easily removed without any tools. This is accomplished by the locking features of the present invention that secure the wear strips in place (vertically and longitudinally). The wear strips can be movable parallel to the frame longitudinal axis for removal. Longitudinal wear strips can be inserted which abut the wear strips preventing them from being longitudinally moved for removal.

According to another advantage of the present invention, the frame spacer has locks that have a riser and a head so that the lock has a T-shaped profile. The wear strip has a hole that mates with the lock. The hole has an upper cavity and a lower passage. The lower passage has a wide gap and a narrow gap. The head of the lock can be passed through the wide passage so that it enters the upper cavity. Then, when the wear strip is slid relative to the frame, the head vertically locks the wear strip in place as the head cannot pass the narrow passage.

In another embodiment, a dynamic noser assembly is provided having a noser and a bearing shaft with bearings to increase the usefulness of the noser assembly. The noser assembly is easily removed from a locked relationship to pegs on frame spacers.

According to another advantage of the present invention, the dynamic noser assembly is a dynamic sanitary noser. The nose can be made of a solid one-piece design.

According to a further advantage of the present invention, the dynamic noser is a sanitary dynamic noser assembly.

According to a further advantage of aspects of the present invention, wear strips with symmetrical lips are provided so that locking spacers can be used to prevent vertical movement of the wear strips relative to the spacers.

In on embodiment, the spacers have arms with inwardly oriented upper portions creating a channel with a narrow top portion and a wide bottom portion. In another embodiment, the spacers have inwardly oriented arms creating a channel that is widest at the bottom.

According to another advantage of the present invention, a wear strip with a protrusion is provided for use with a spiral frame that can be locked in place preventing vertical movement of the wear strip relative to the frame (and also horizontal movement in one protrusion embodiment having a vertical section and a horizontal section.

Other advantages, benefits, and features of the present invention will become apparent to those skilled in the art upon reading the detailed description of the invention and studying the drawings.

DETAILED DESCRIPTION OF PREFERRED EMBODIMENTS

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

Figure 1:
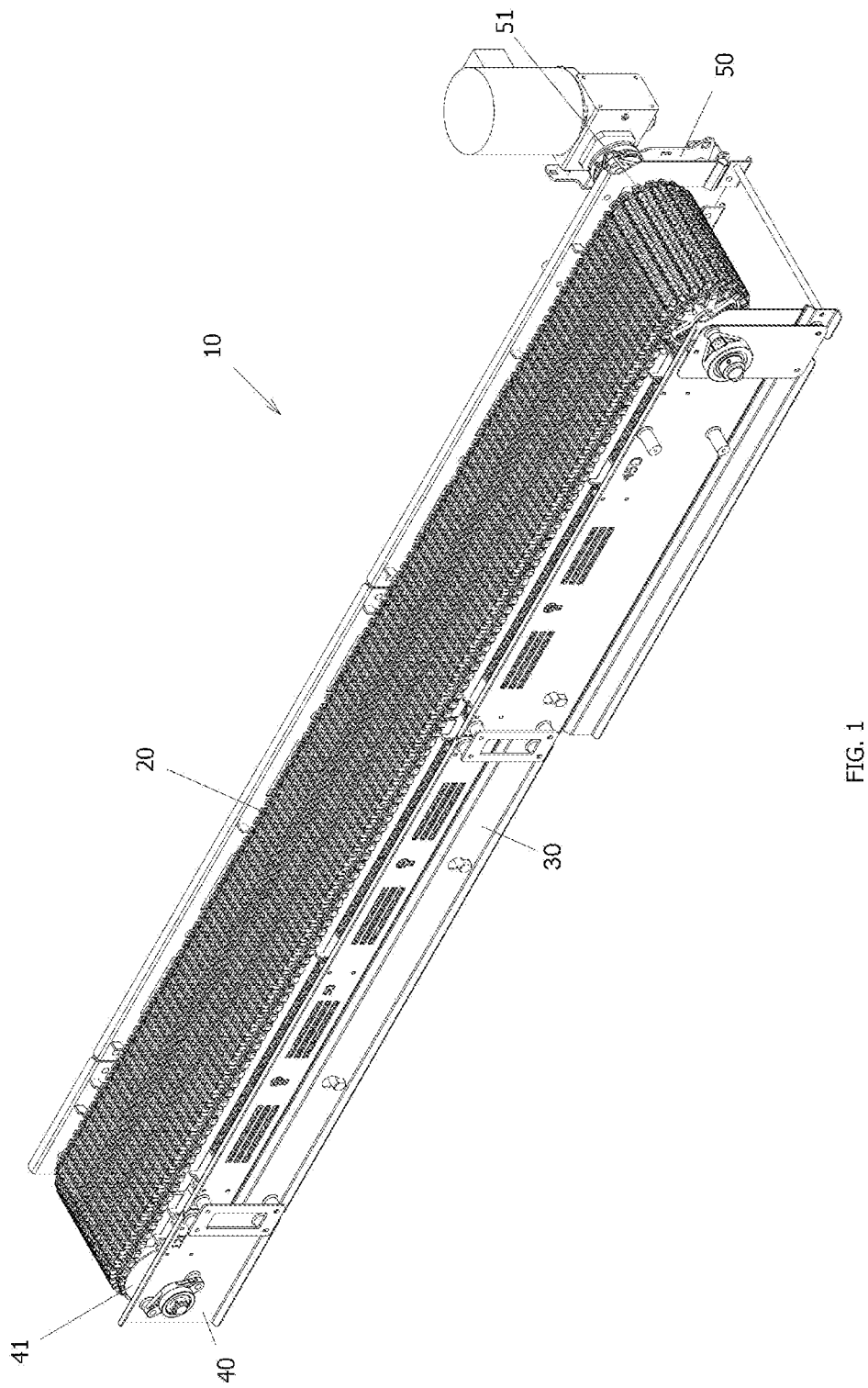
FIG. 1 is a perspective view of a conveyor.
Figure 2:
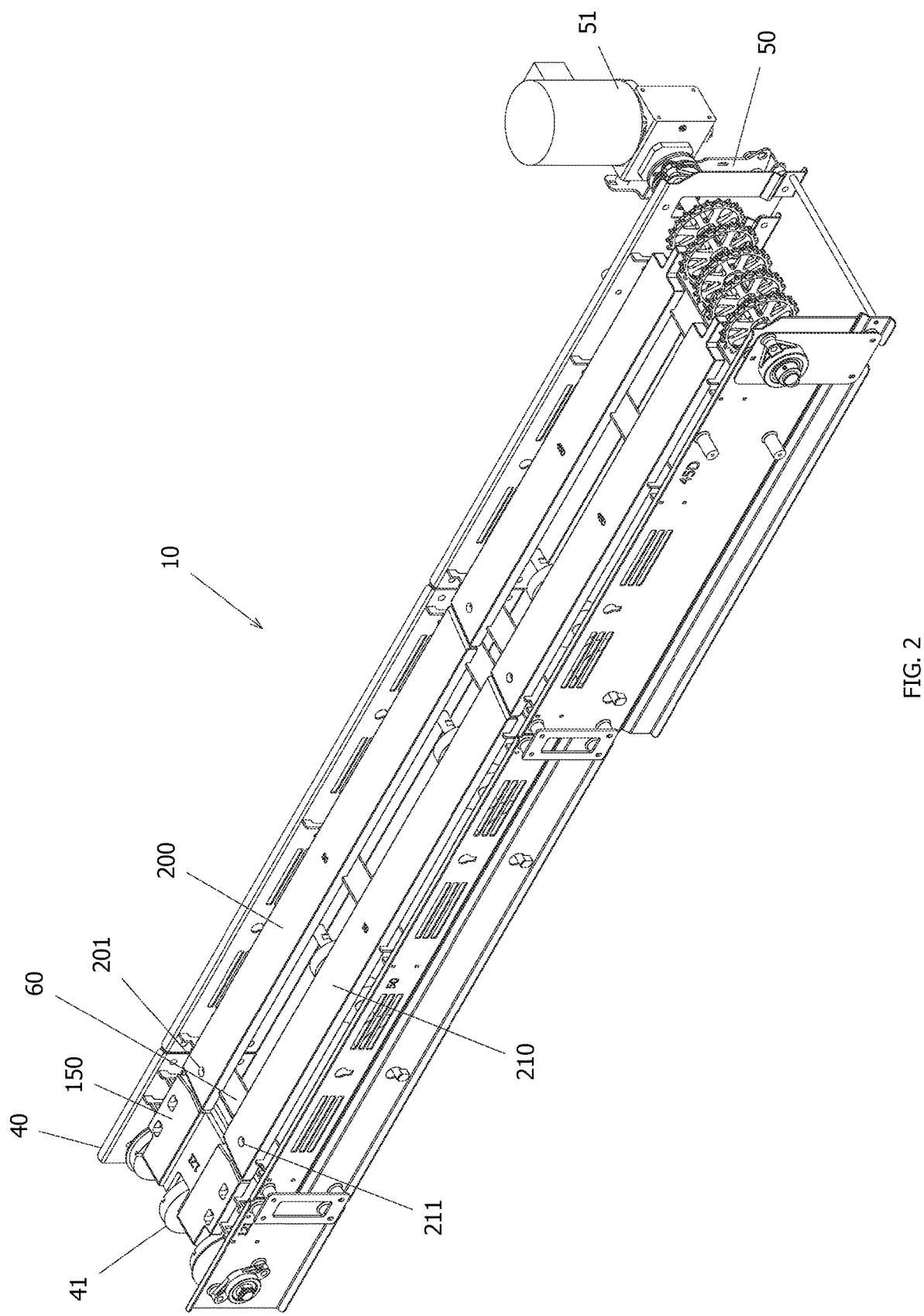
FIG. 2 is similar to FIG. 1 but shows the belt removed.
Figure 3:
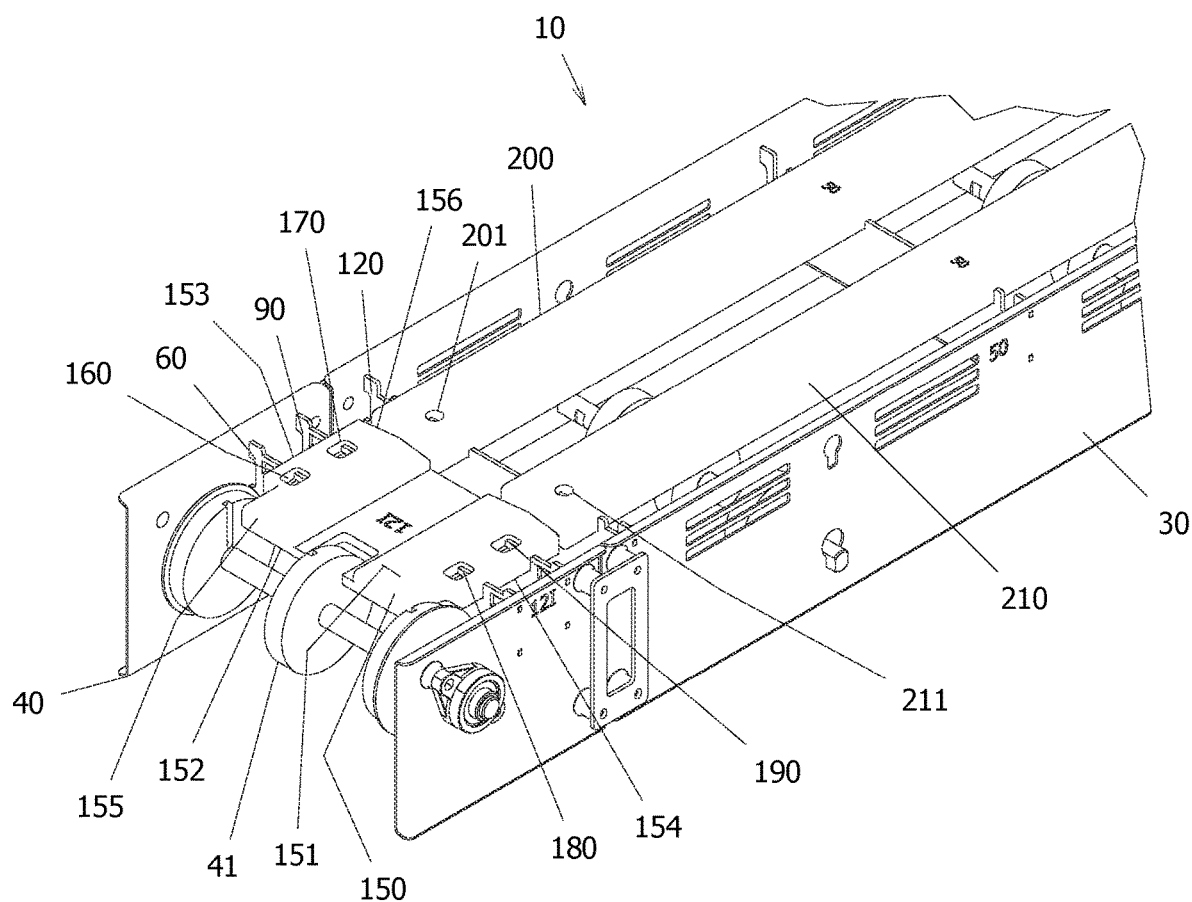
FIG. 3 is a perspective view of an end of a conveyor with the belt removed to expose idler wears strips that are vertically and longitudinally locked relative to the frame.
Figure 4:
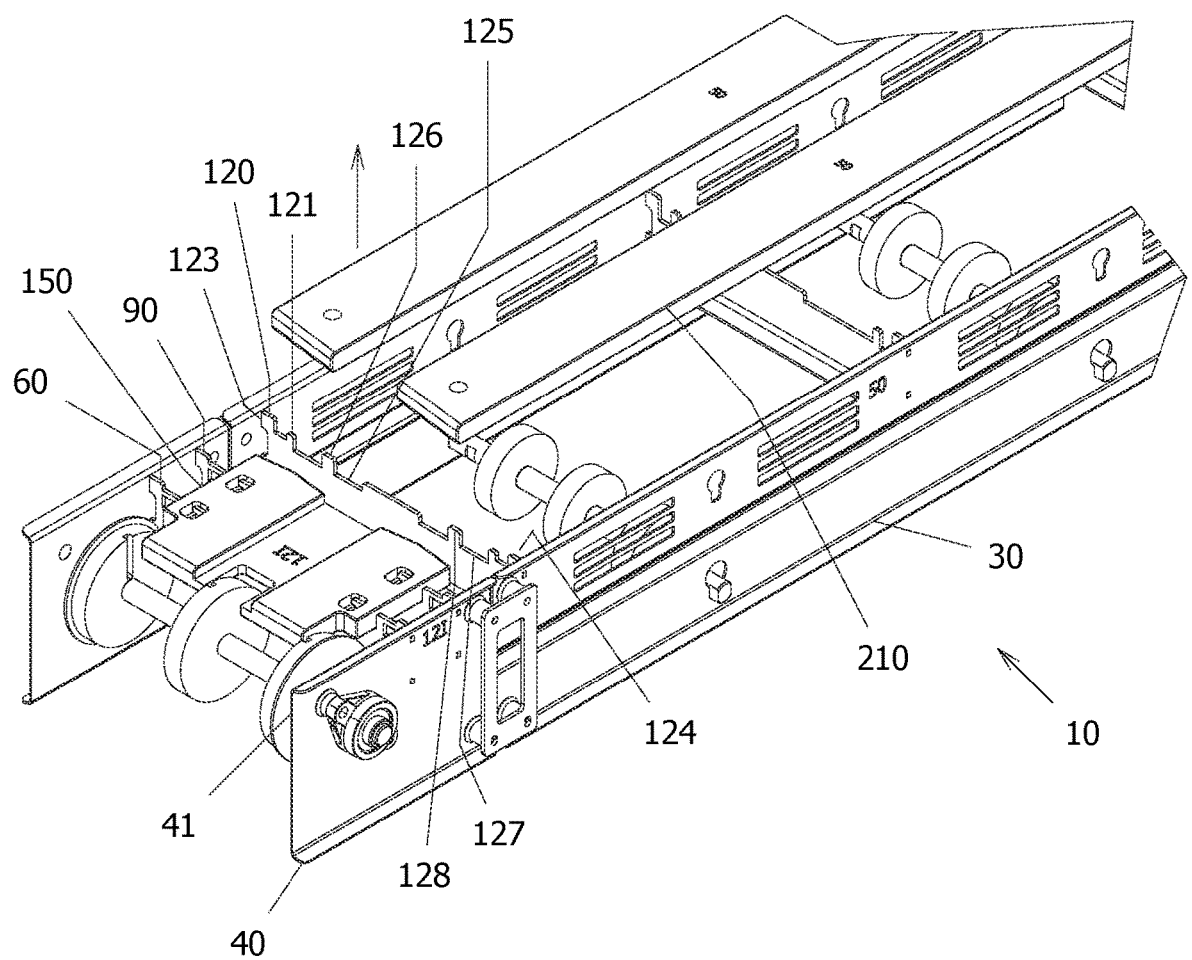
FIG. 4 is similar to FIG. 3 but shows longitudinal wear strips being removed.
Figure 5:
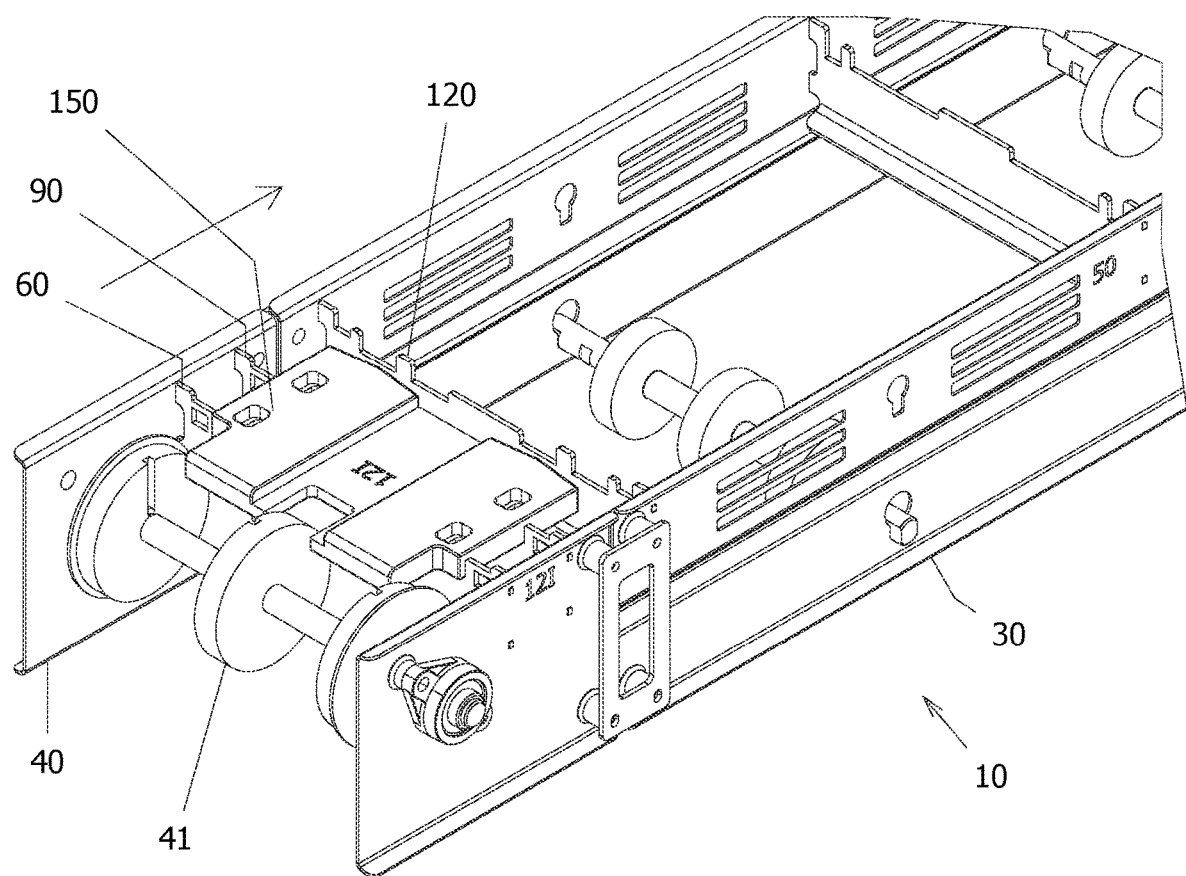
FIG. 5 is a similar to FIG. 4 but shows wear strips being longitudinally moved to an unlocked position.
Figure 6:
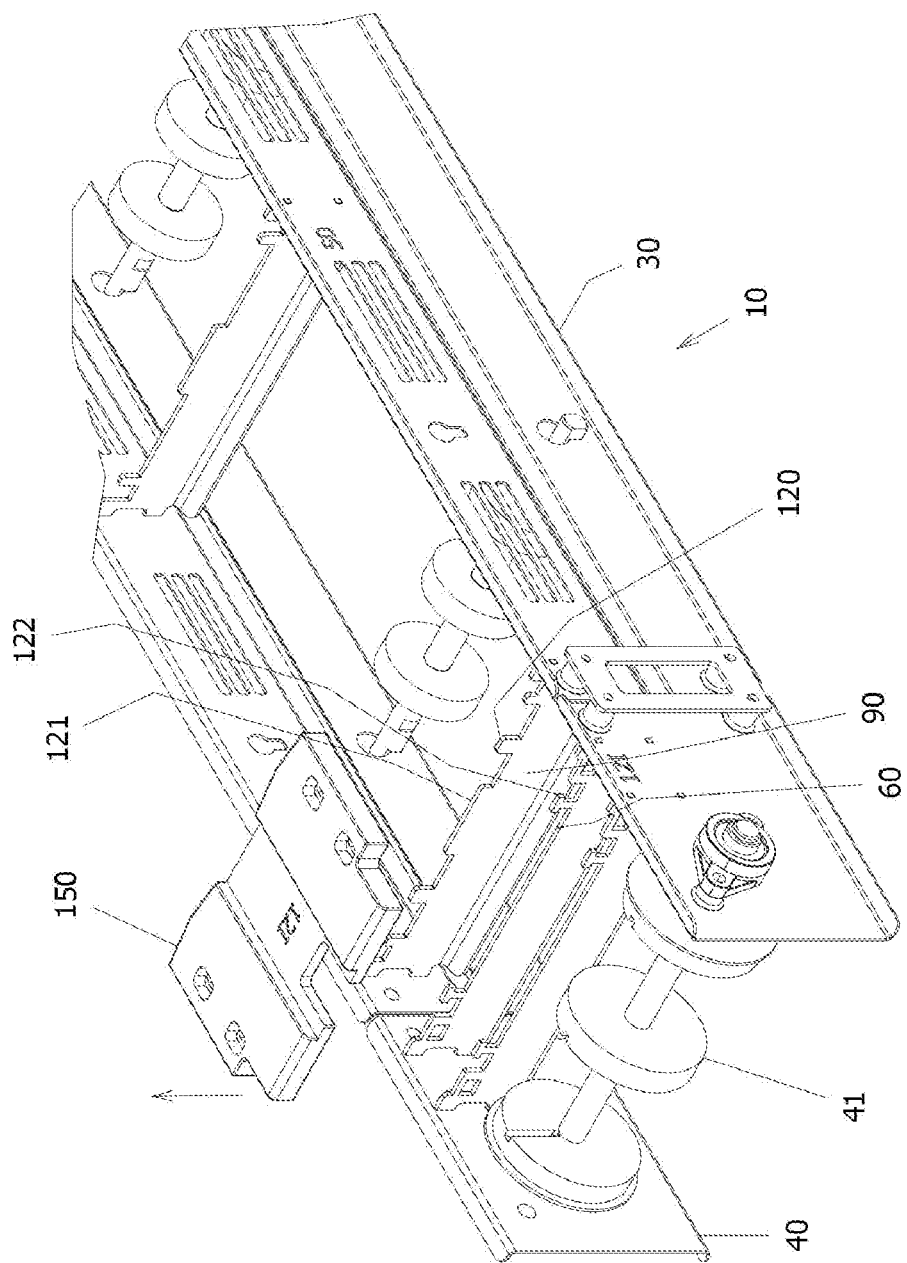
FIG. 6 is similar to FIG. 5 but shows the wear strips being removed.
Figure 7:
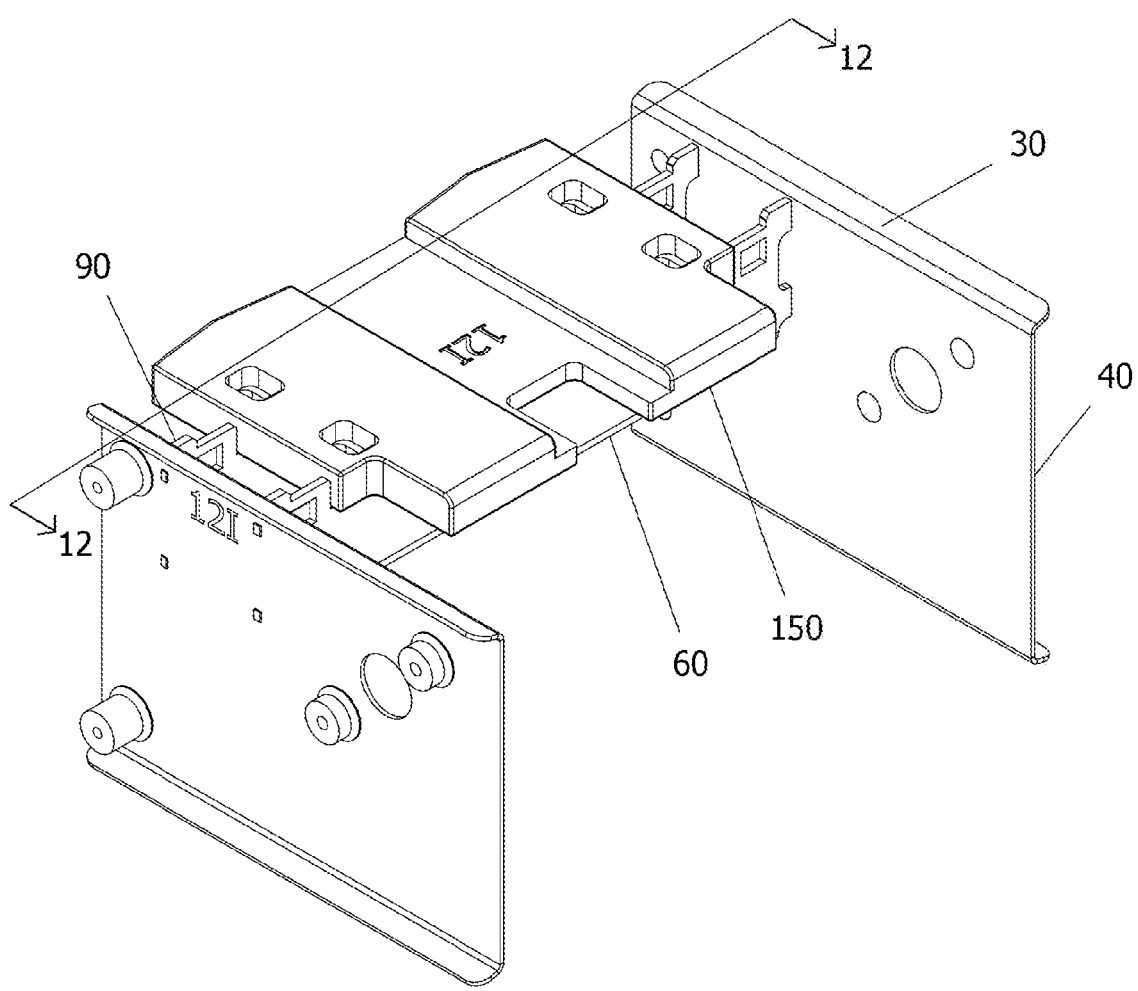
FIG. 7 is a perspective view showing the wear strips in a locked position.
Figure 8:
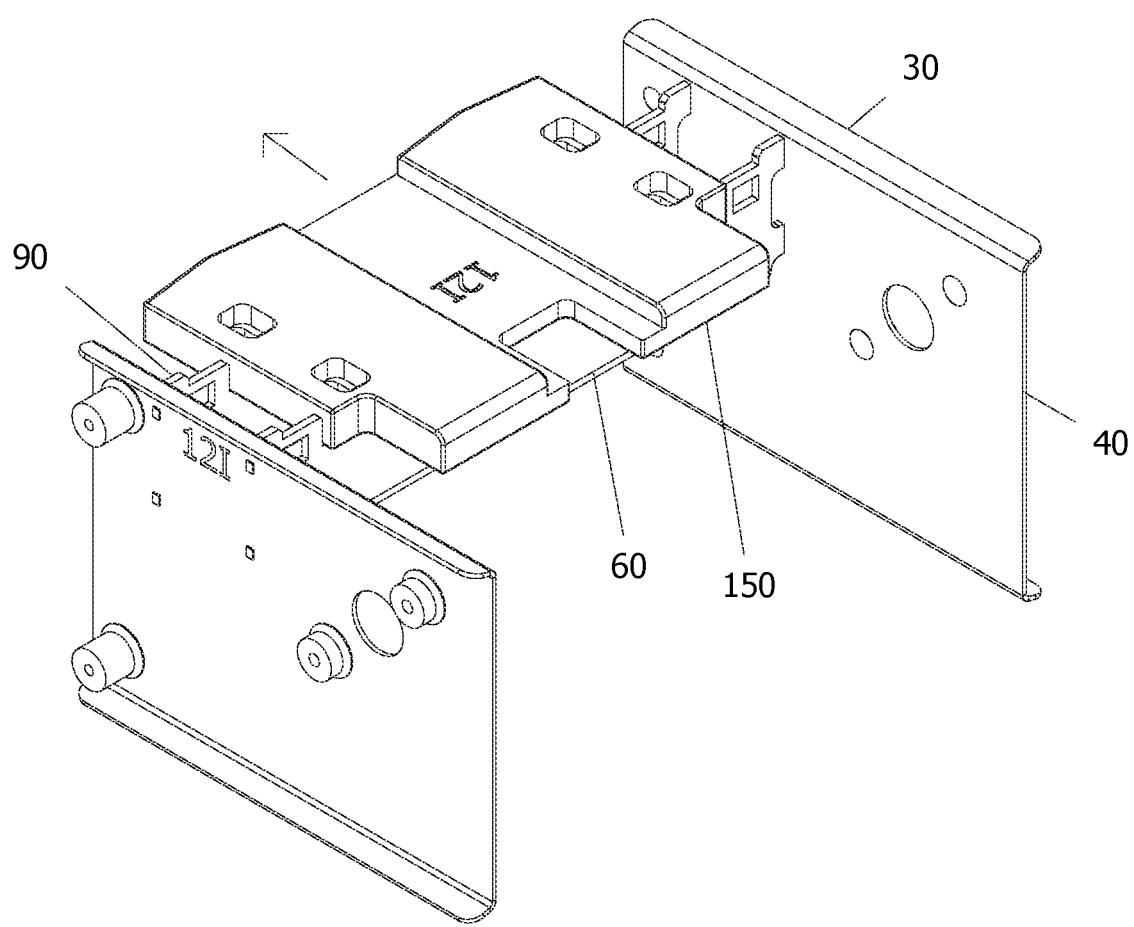
FIG. 8 is a perspective view showing the wear strip moved relative to the locks so that the wear strip can be removed.
Figure 9:
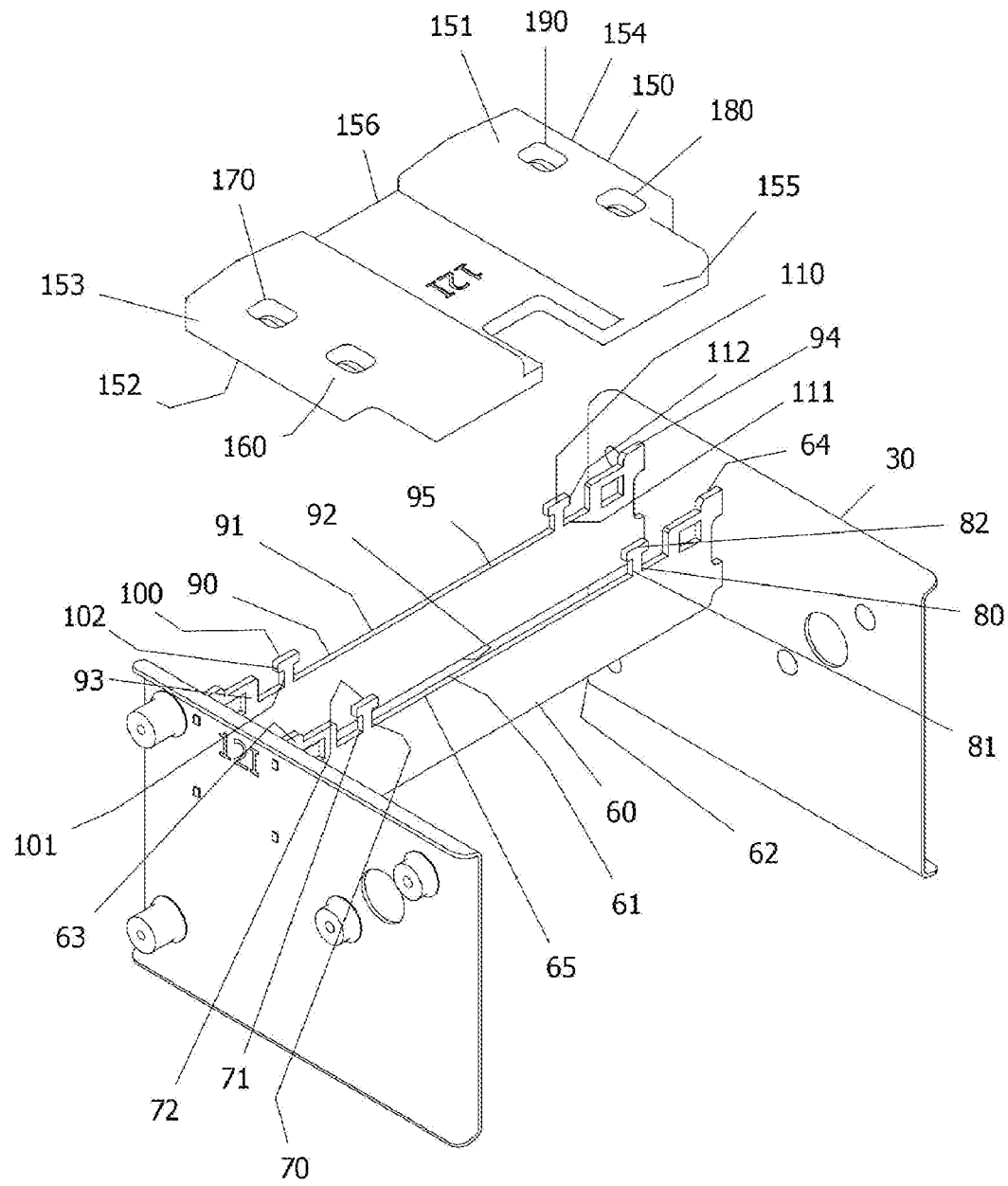
FIG. 9 is an exploded view showing the wear strip and frame spacers.
Figure 10:
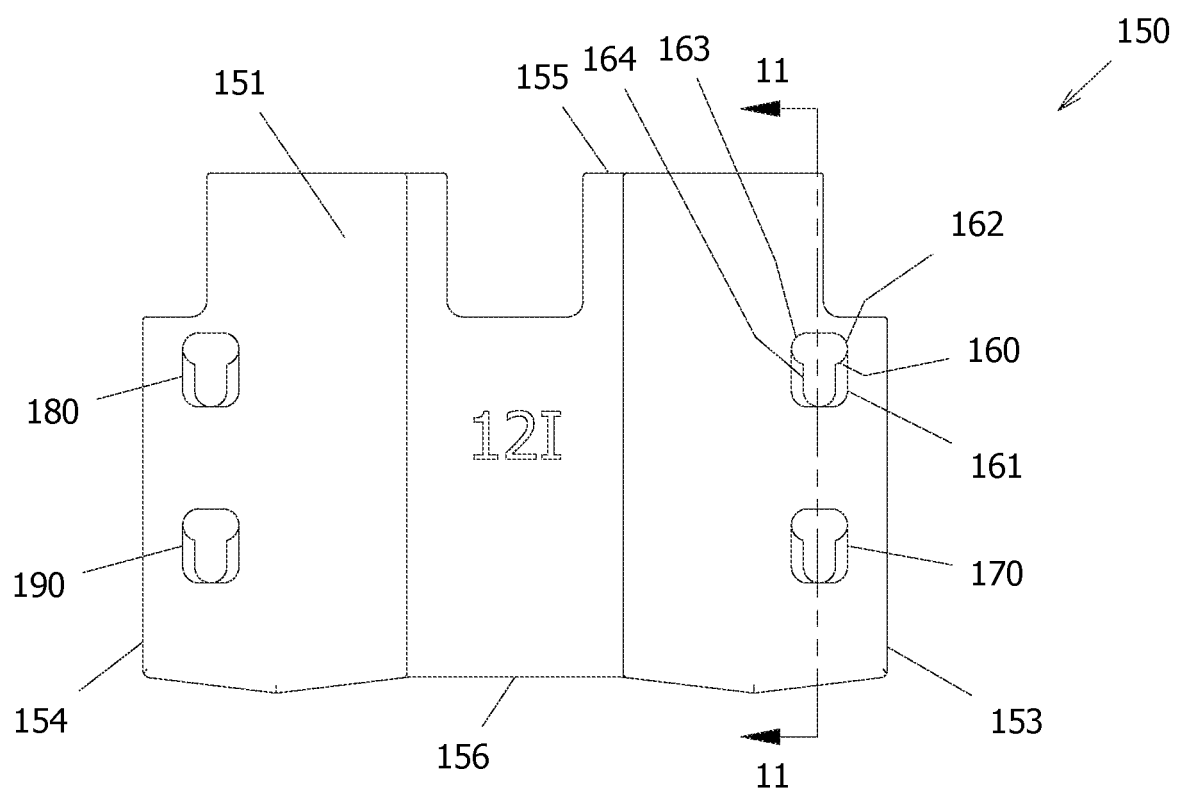
FIG. 10 is a bottom view of a wear strip.
Figure 11:
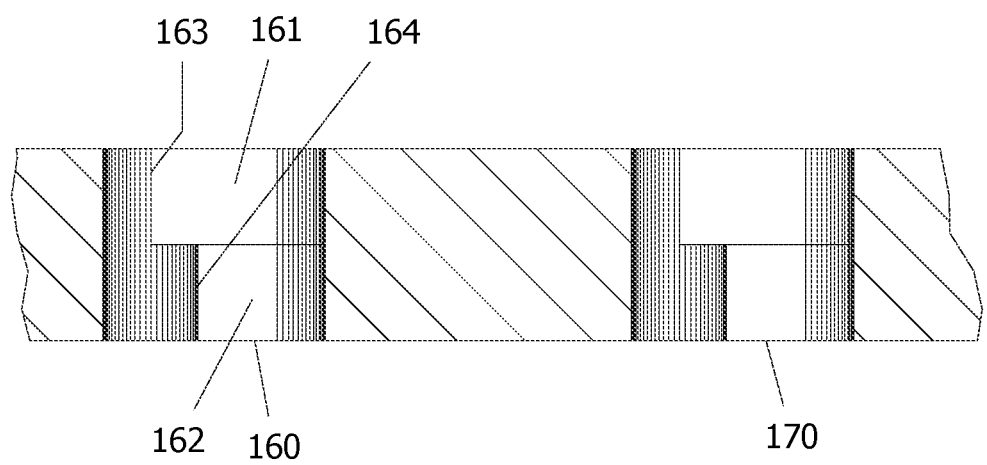
FIG. 11 is a cross-sectional view taken along line 11-11 in FIG. 10.
Figure 12:
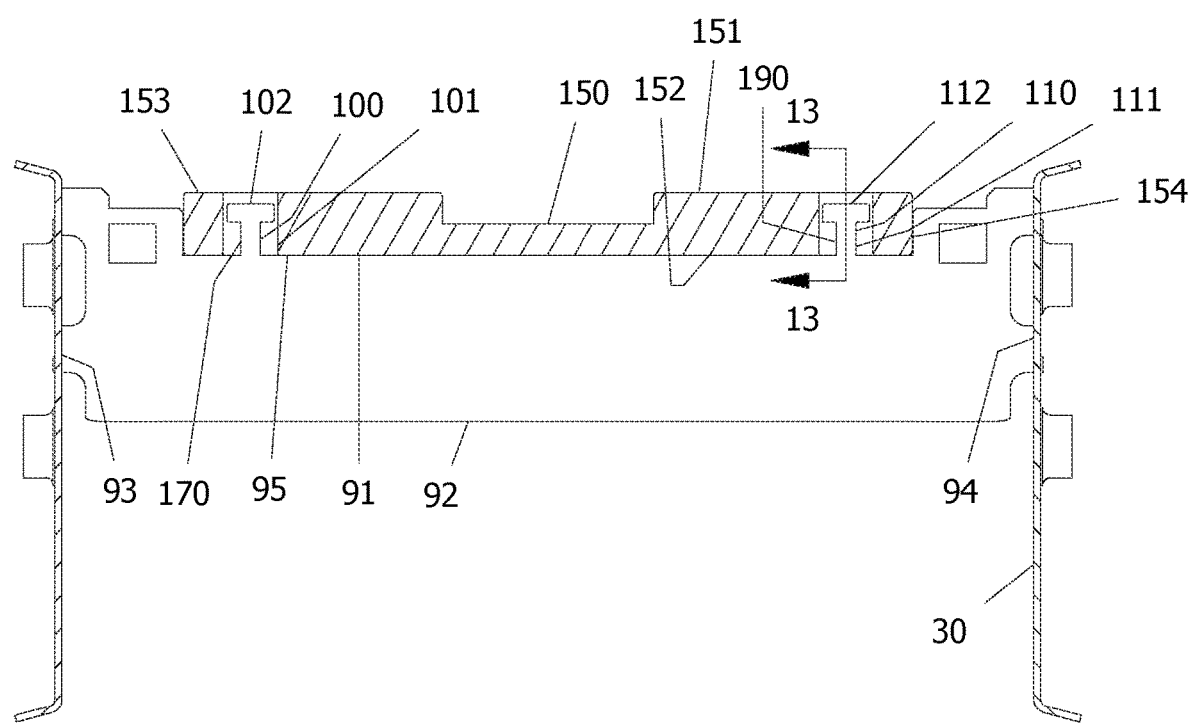
FIG. 12 is a cross-sectional view taken along line 12-12 in FIG. 7.
Figure 13:
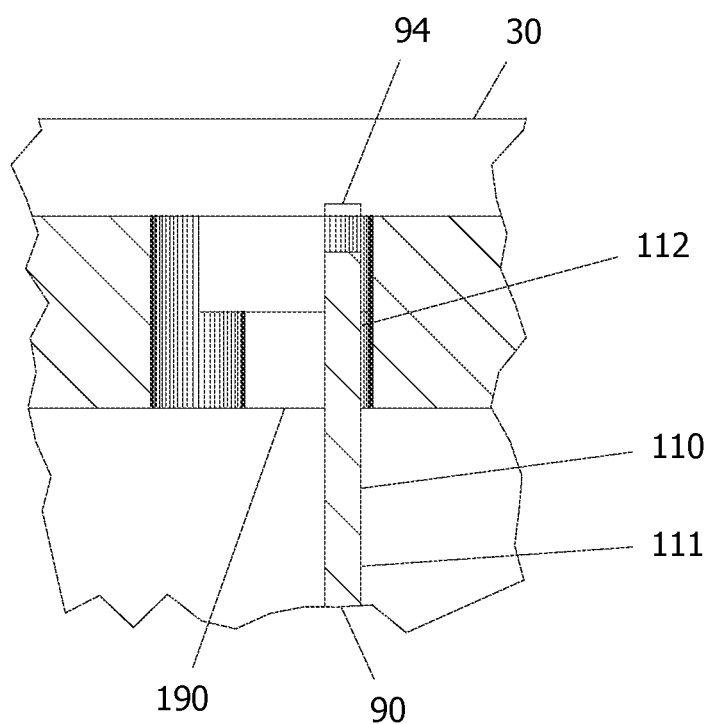
FIG. 13 is a cross-sectional view taken along line 13-13 in FIG. 12.
Figure 14:
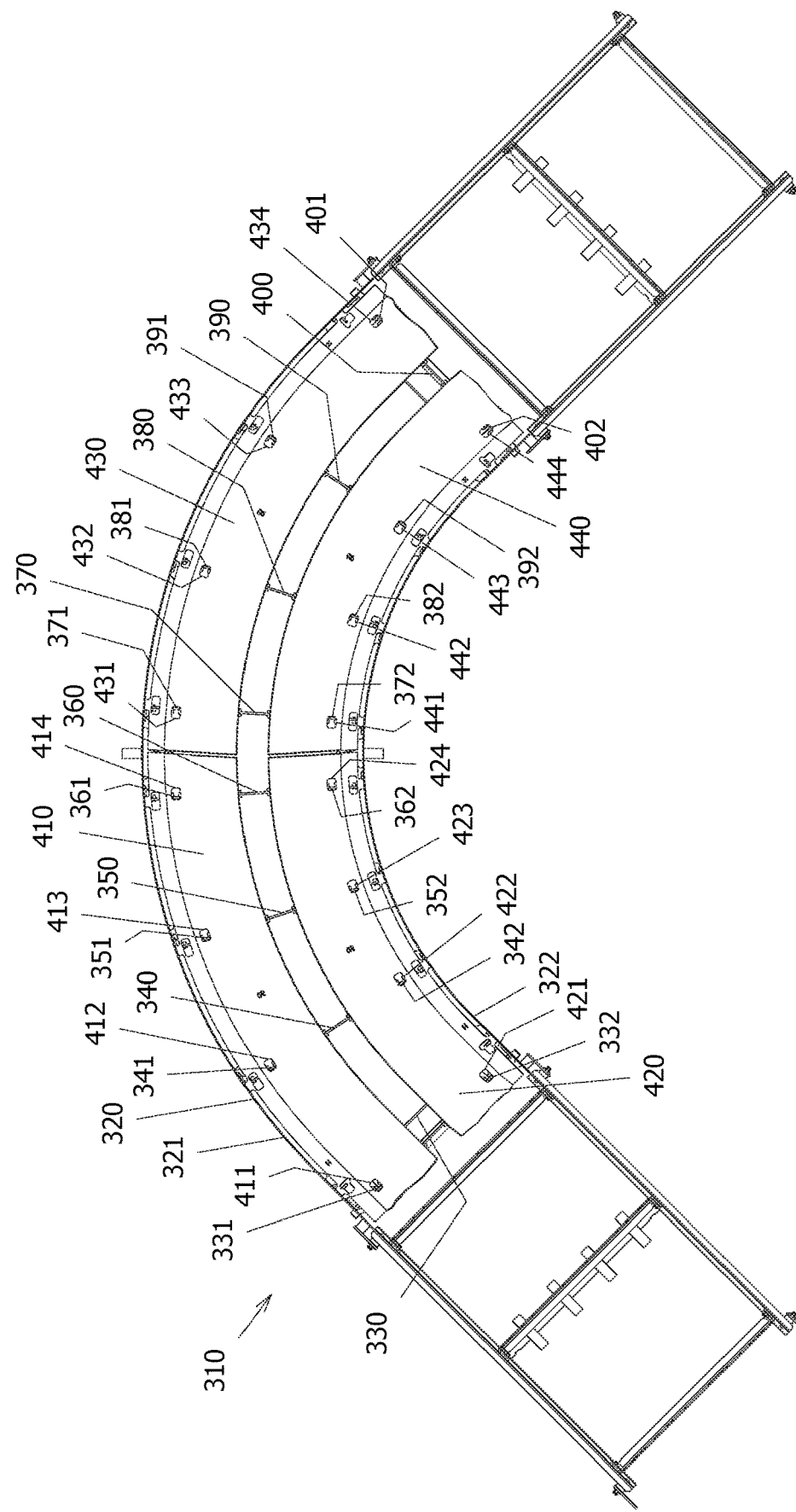
FIG. 14 is a top view of an additional embodiment of the present invention with wear strips shown in a locked position.
Figure 15:
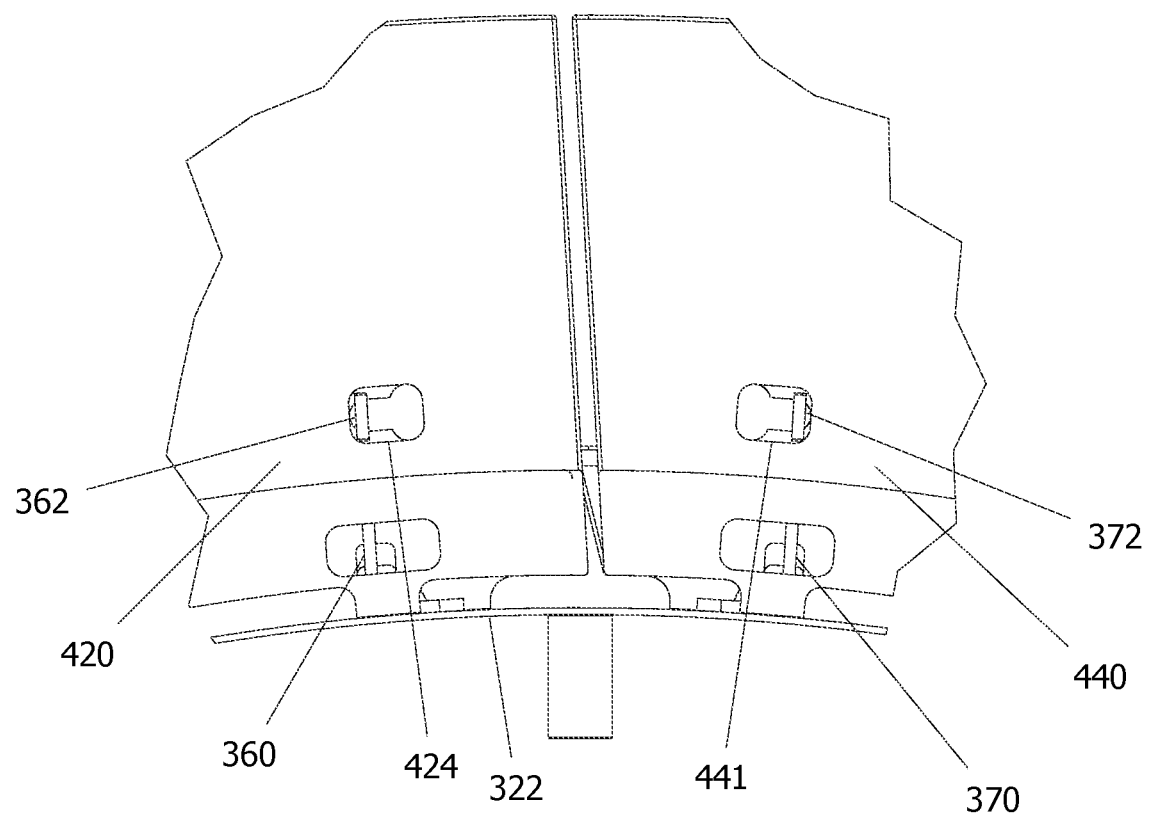
FIG. 15 is a close-up view of a portion of the embodiment illustrated in FIG. 14.
Figure 16:
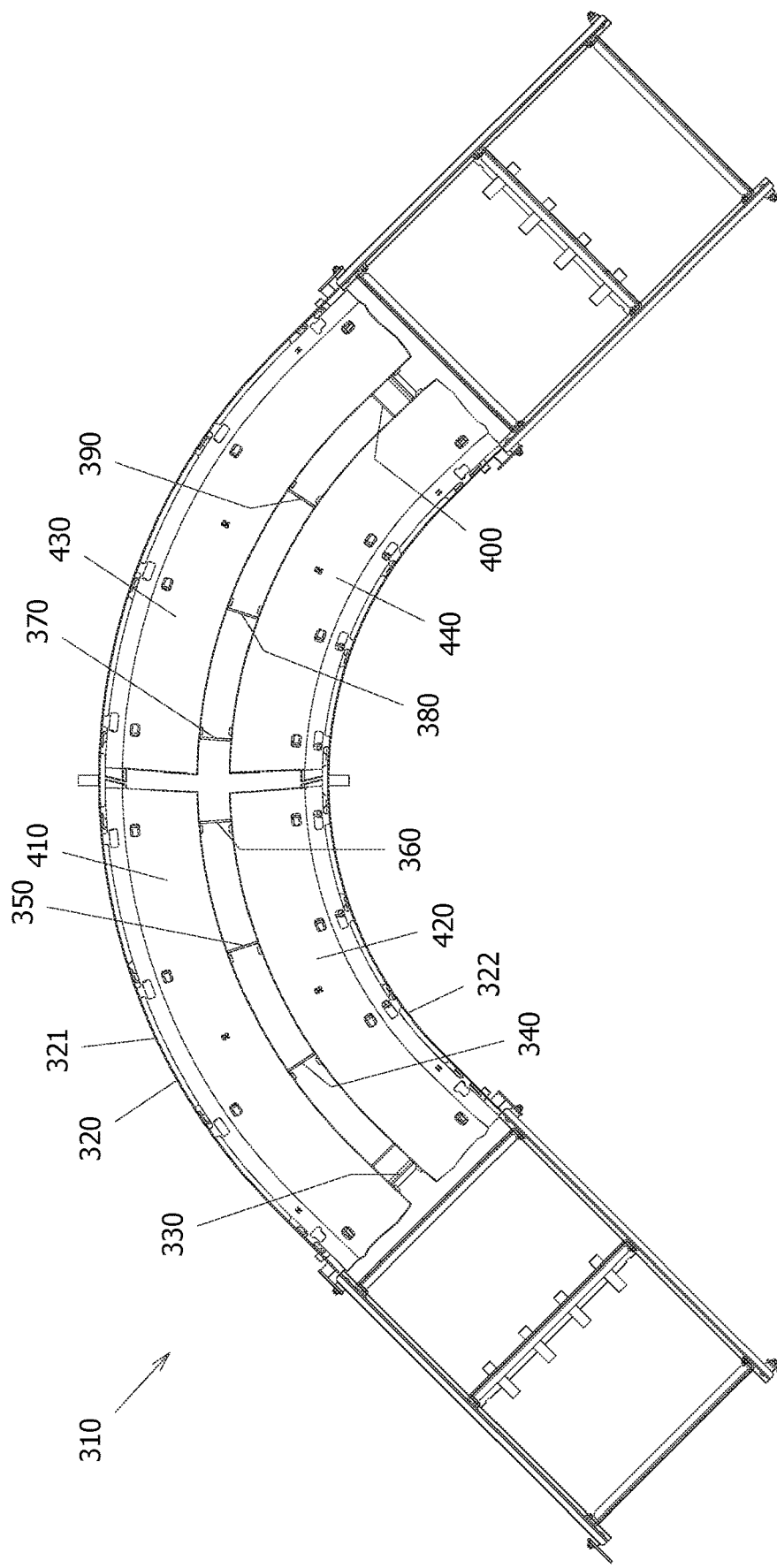
FIG. 16 is similar to FIG. 14 but shows the wear strips in an unlocked position.
Figure 17:
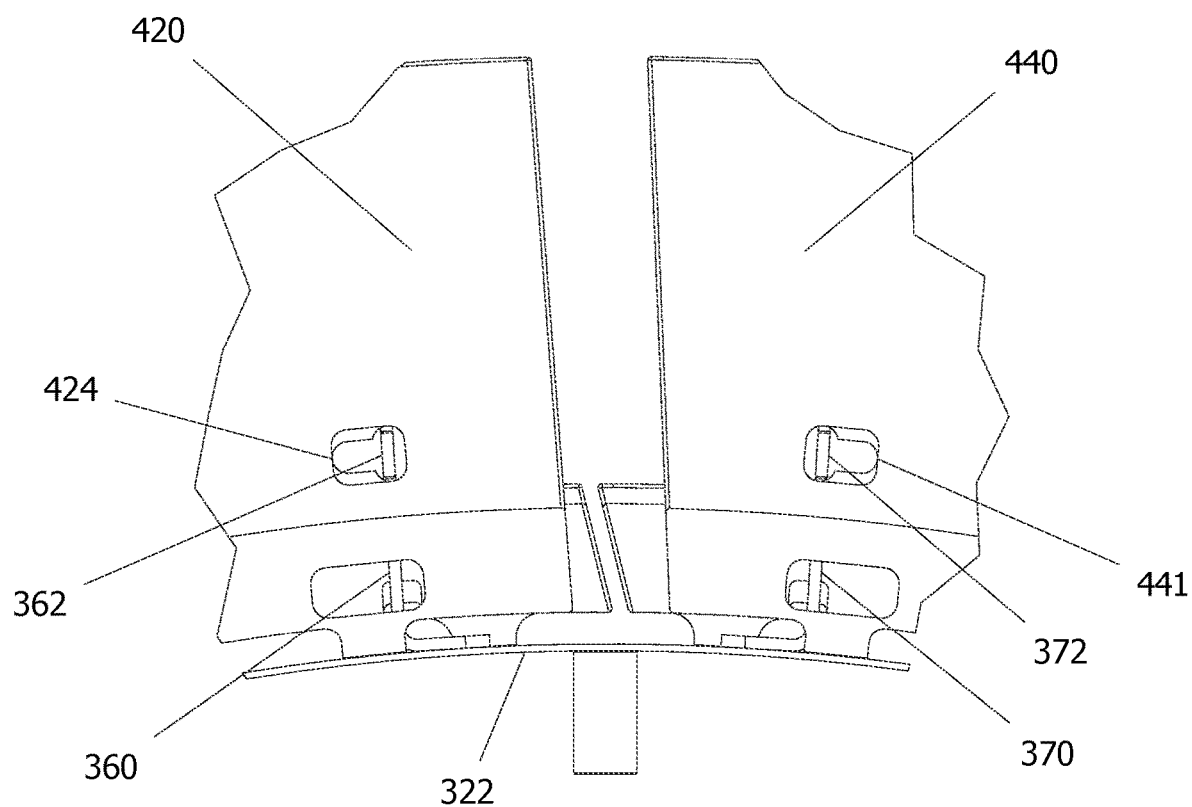
FIG. 17 is a close-up view of a portion of the embodiment illustrated in FIG. 16.
Figure 18:
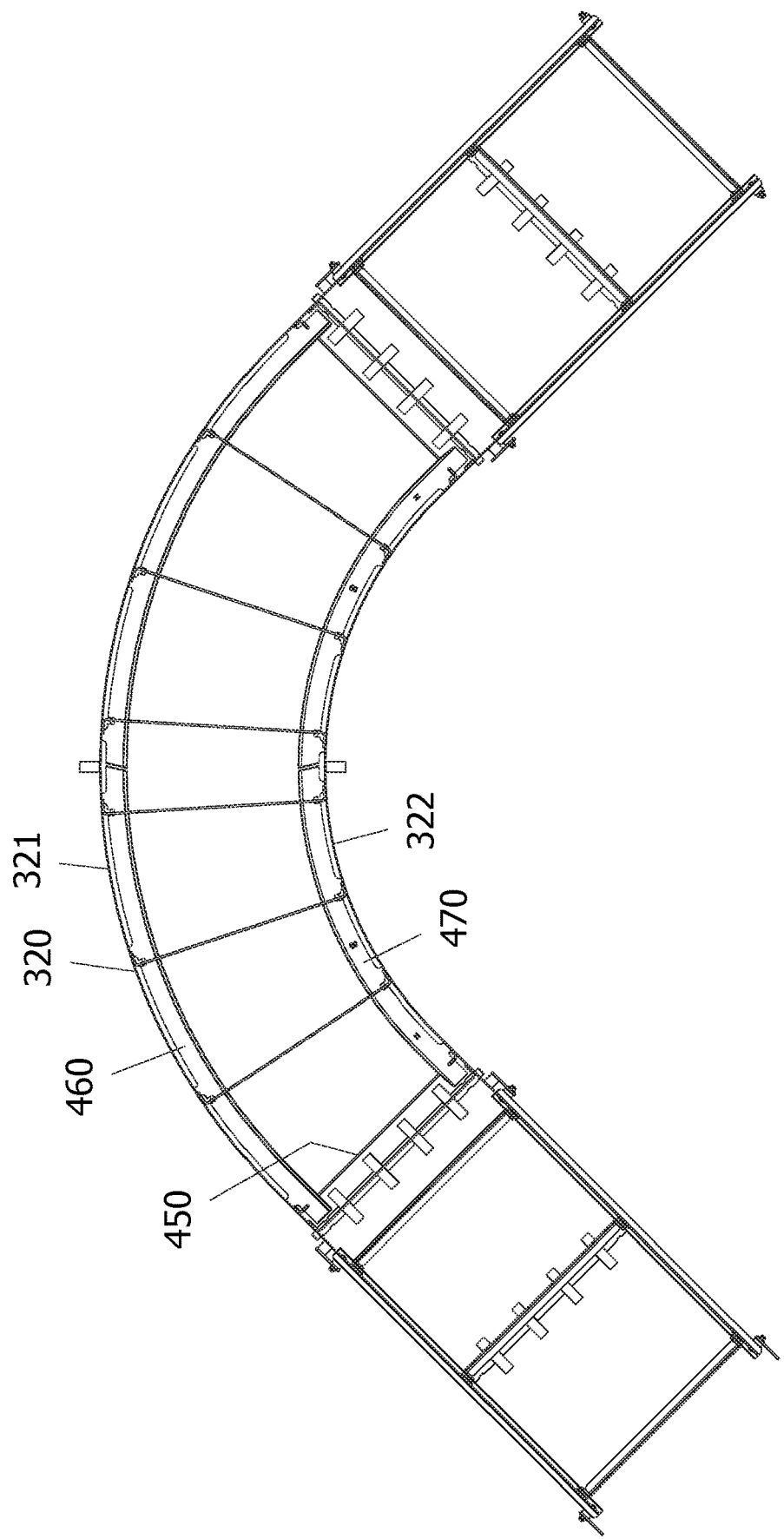
FIG. 18 is a bottom view of the embodiment illustrated in FIG. 14 showing lower guides in locked positions.
Figure 19:
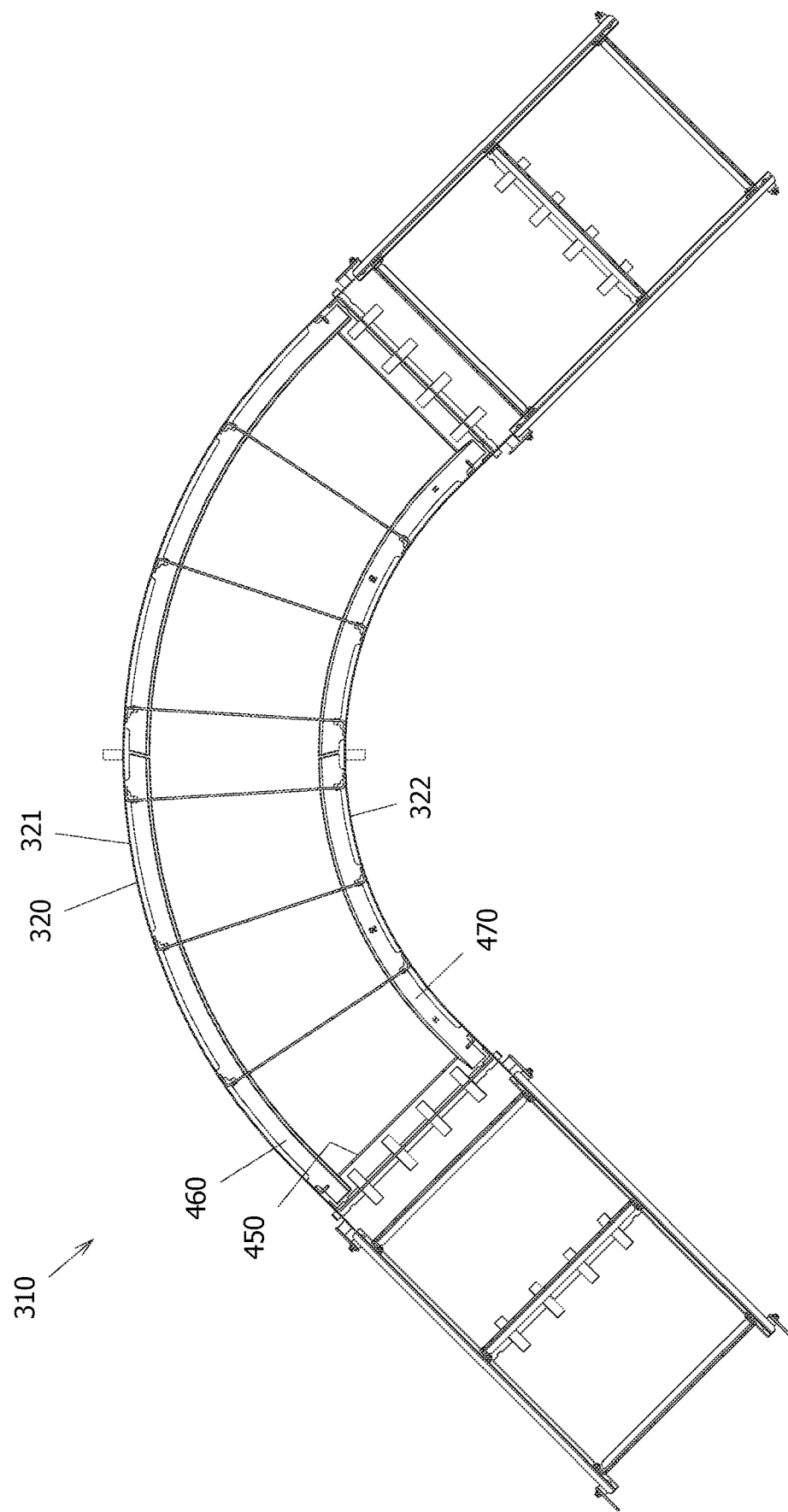
FIG. 19 is similar to FIG. 18 but shows the lower guides in unlocked positions.
Figure 20:
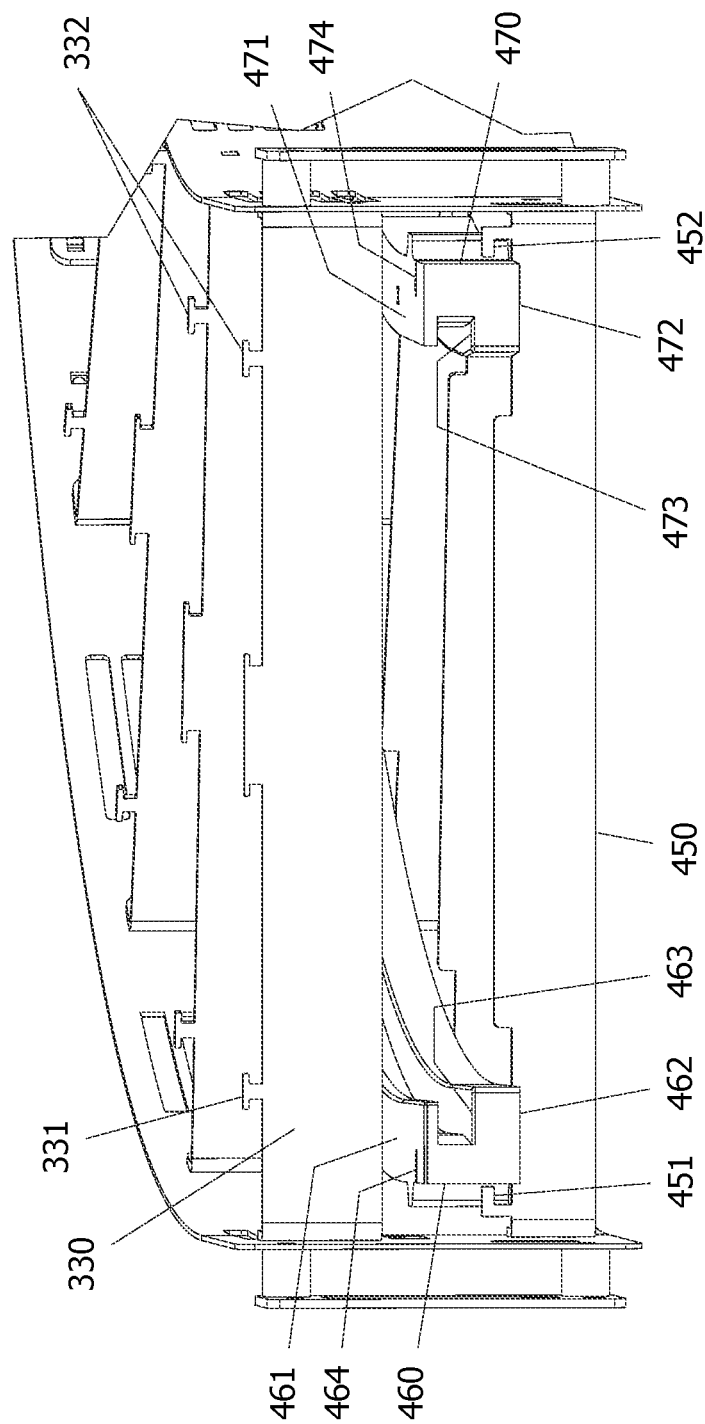
FIG. 20 is a perspective view showing the lower guides in unlocked positions.
Figure 21:
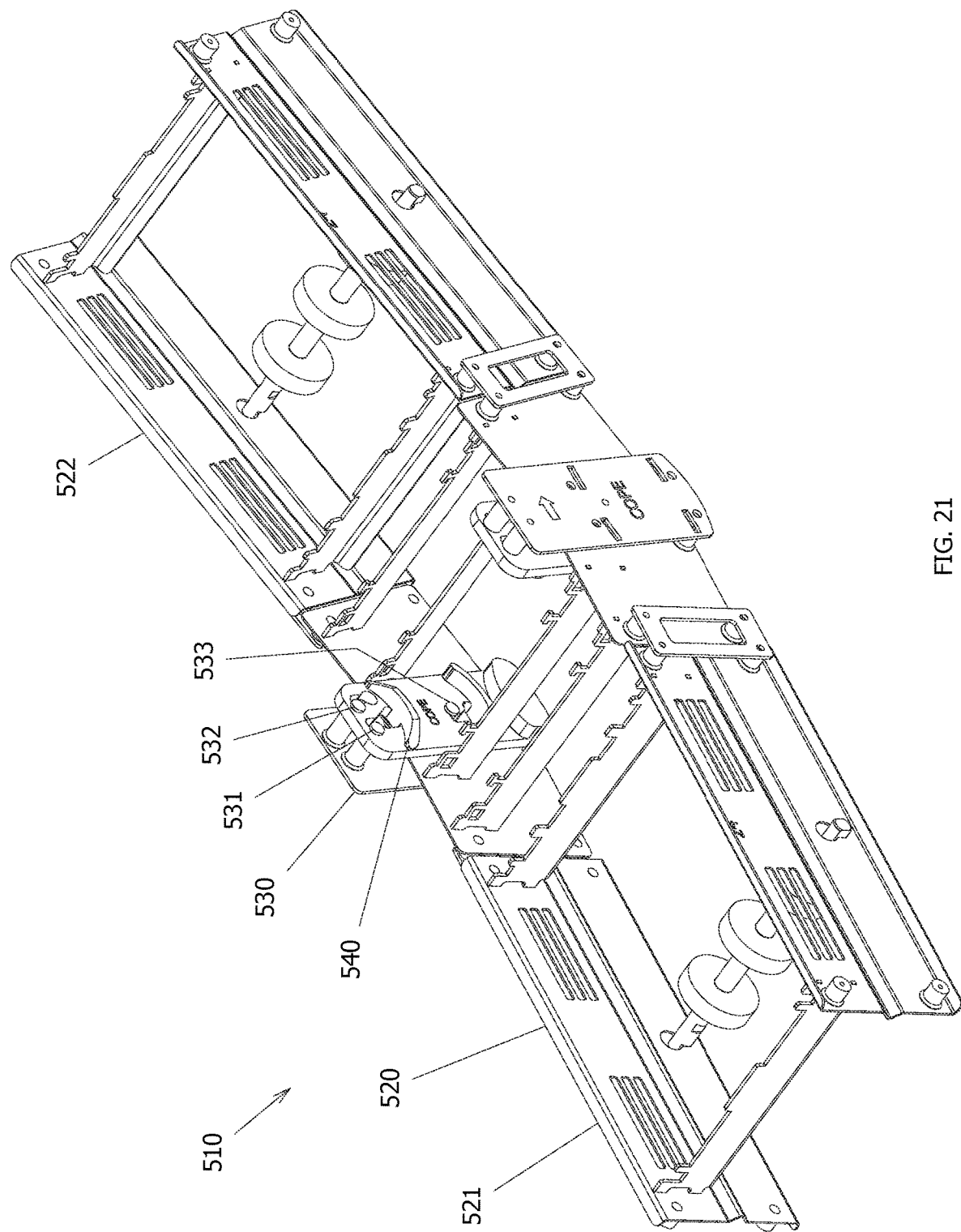
FIG. 21 is a perspective view of an additional embodiment of the present invention showing a cope in a locked position.
Figure 22:
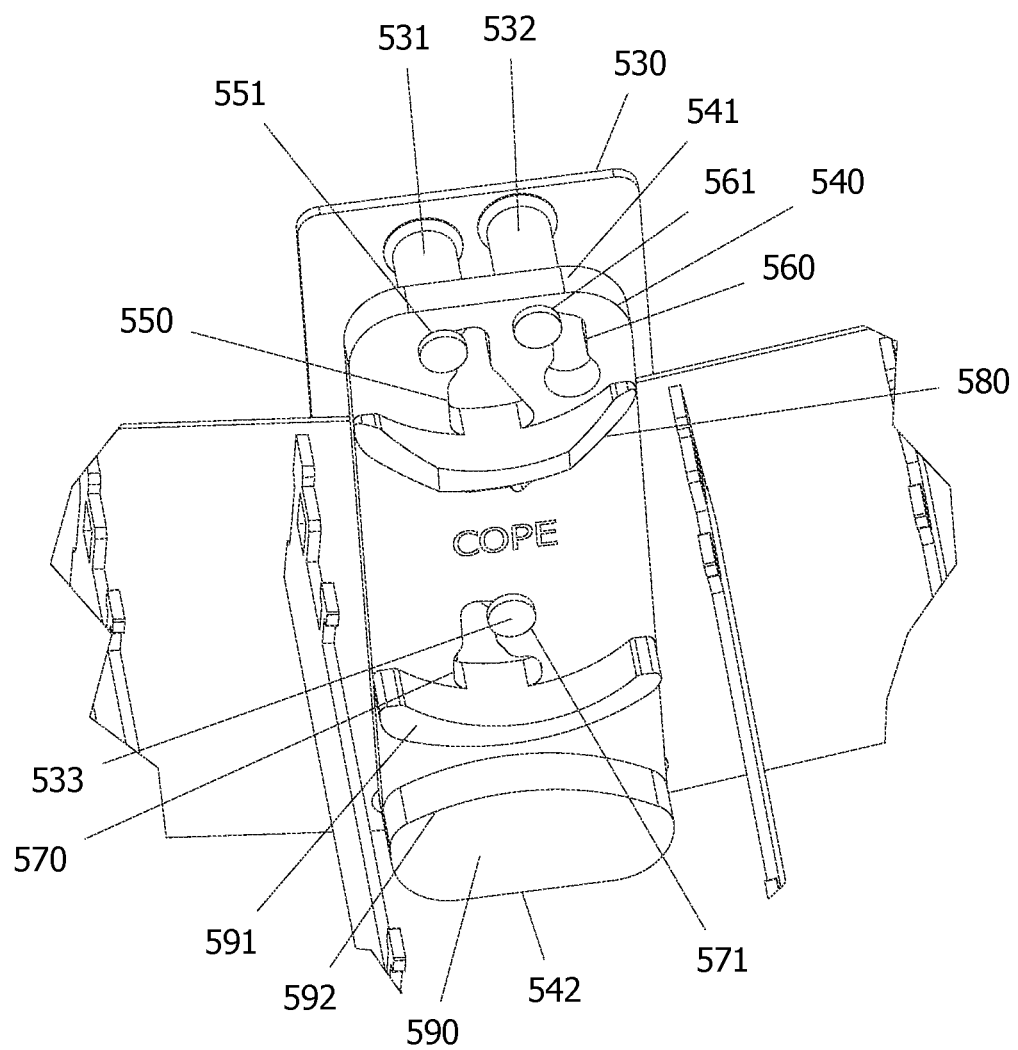
FIG. 22 is an isolation perspective view of the cope shown in FIG. 21.
Figure 23:
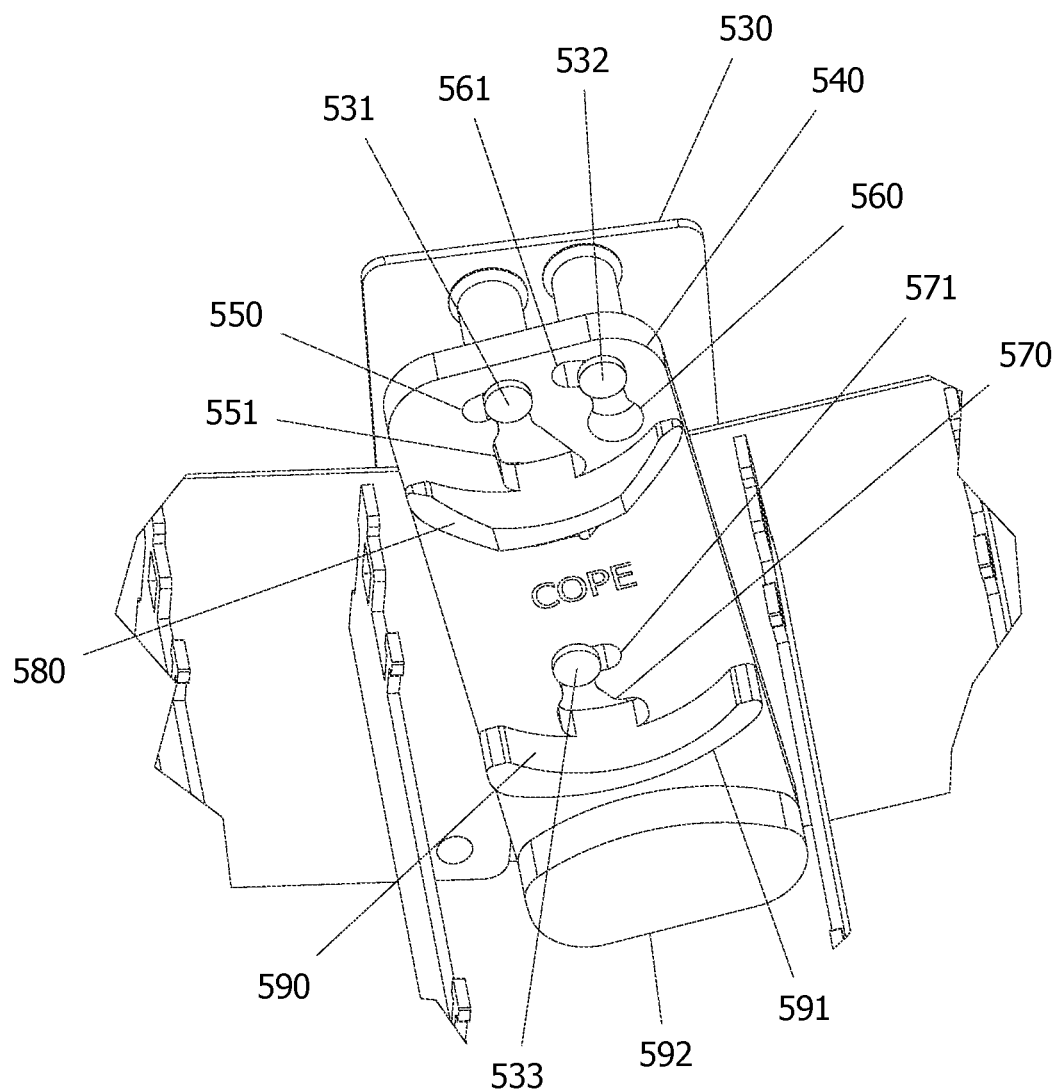
FIG. 23 is similar to FIG. 22, but shows the cope being unlocked by rotation.
Figure 24:
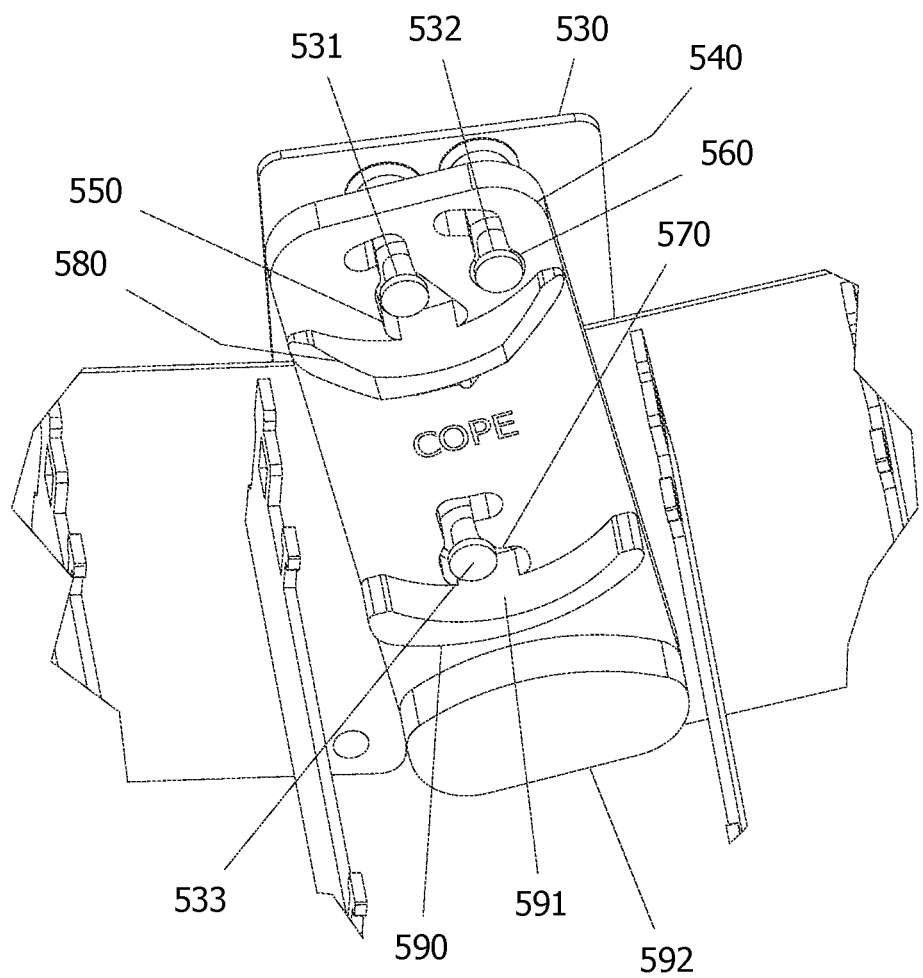
FIG. 24 is similar to FIG. 22 but shows the cope in an unlocked position.
Figure 25:
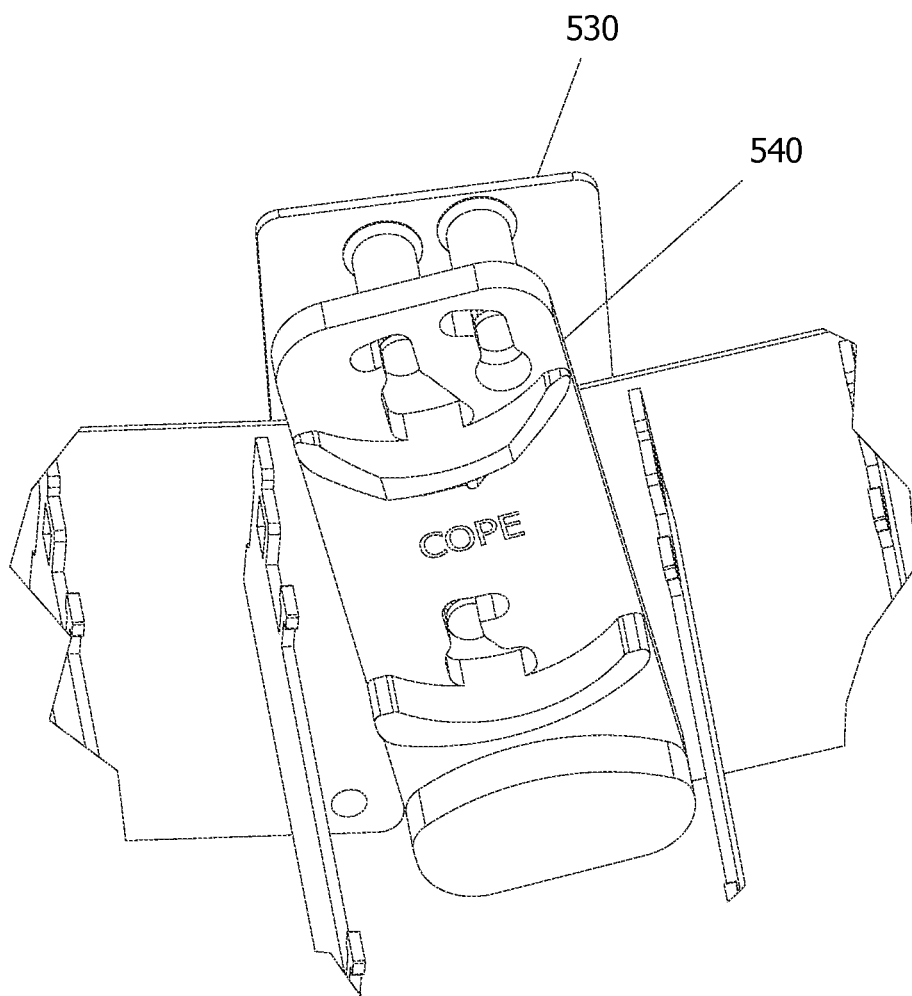
FIG. 25 is similar to FIG. 24, but shows the cope removed from the pegs of the joint.
Figure 26:
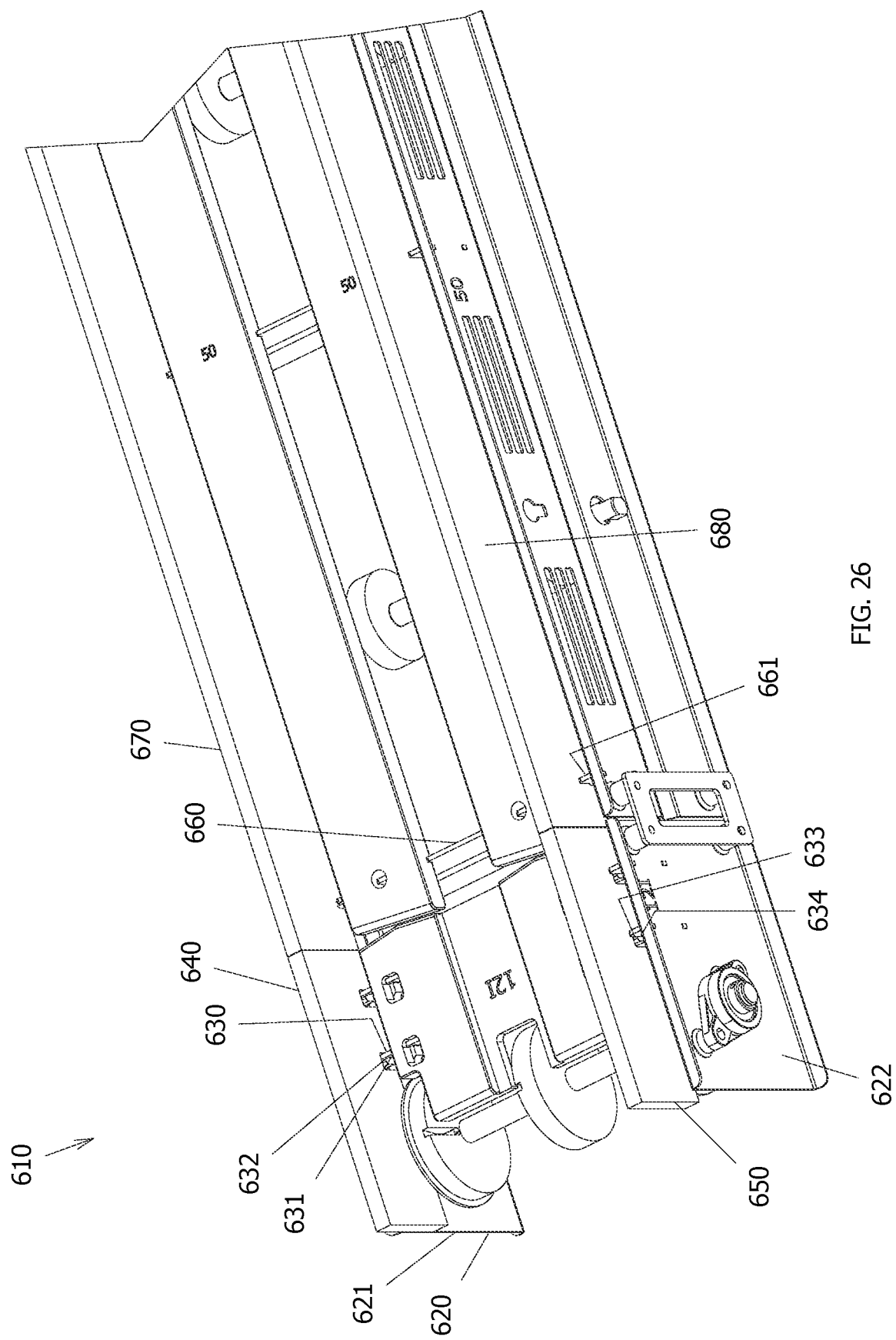
FIG. 26 is a perspective view showing an additional embodiment of the present invention.
Figure 27:
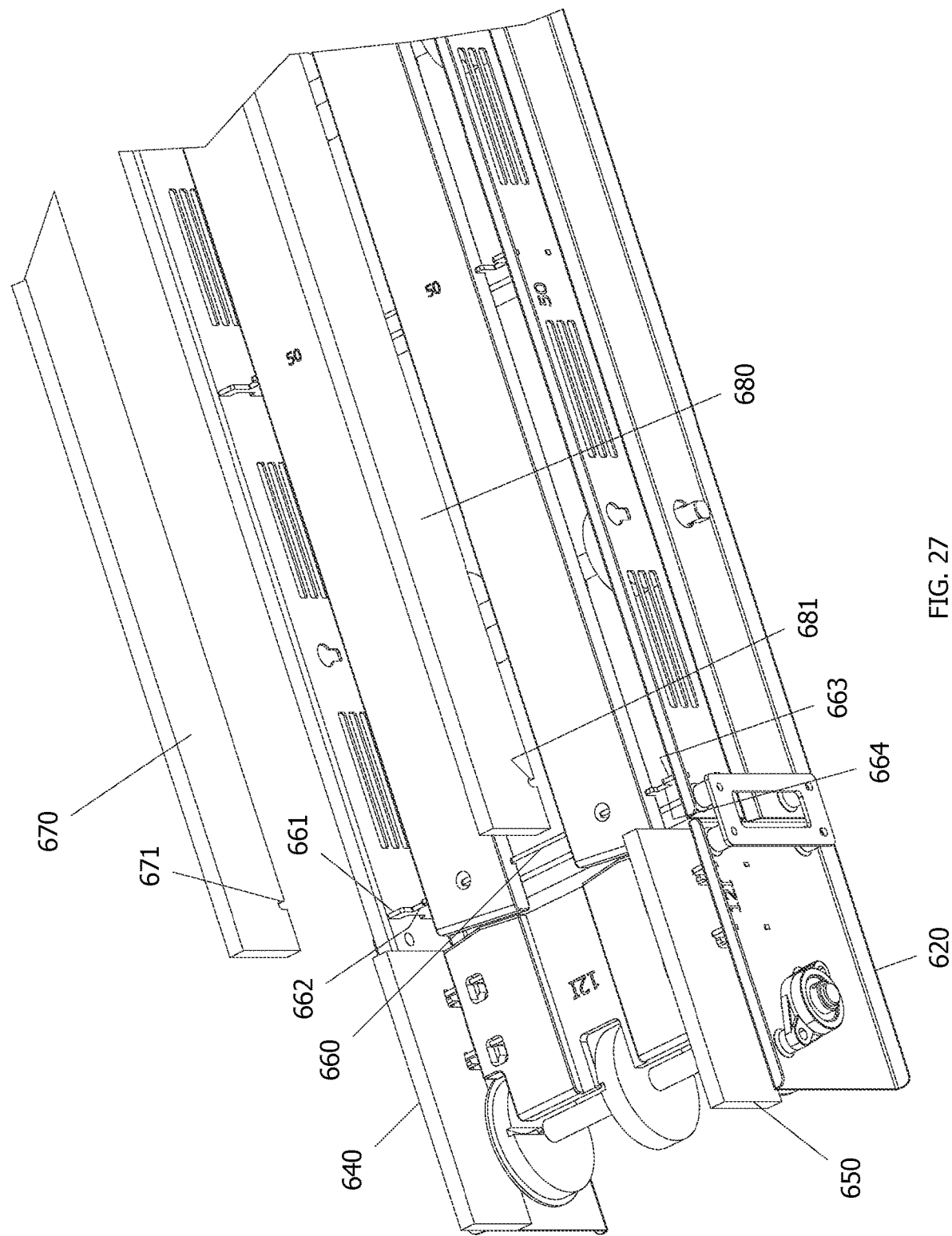
FIG. 27 is similar to FIG. 26 but shows the side strips in an exploded view.
Figure 28:
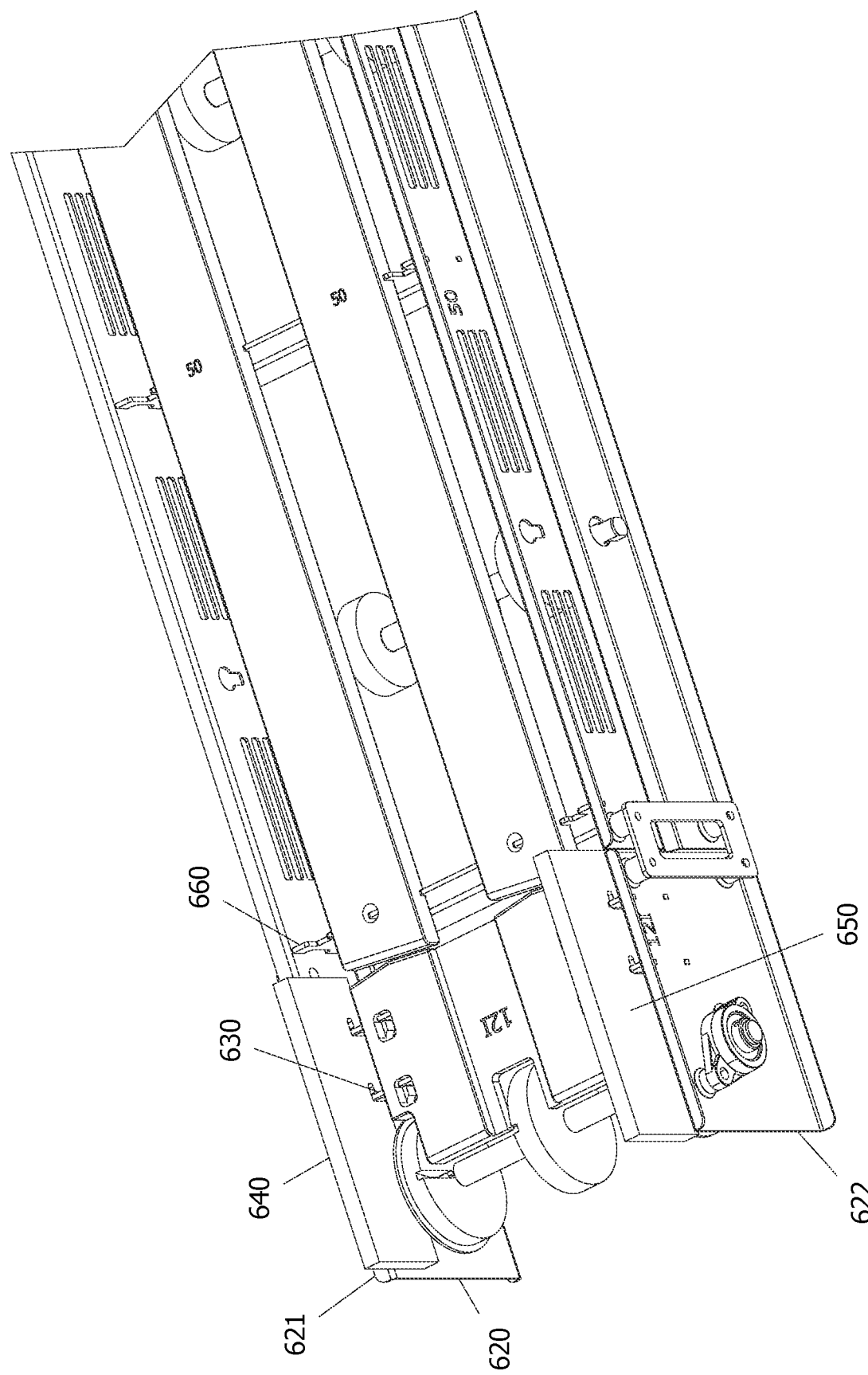
FIG. 28 is similar to FIG. 27 but shows the side strips removed.
Figure 29:
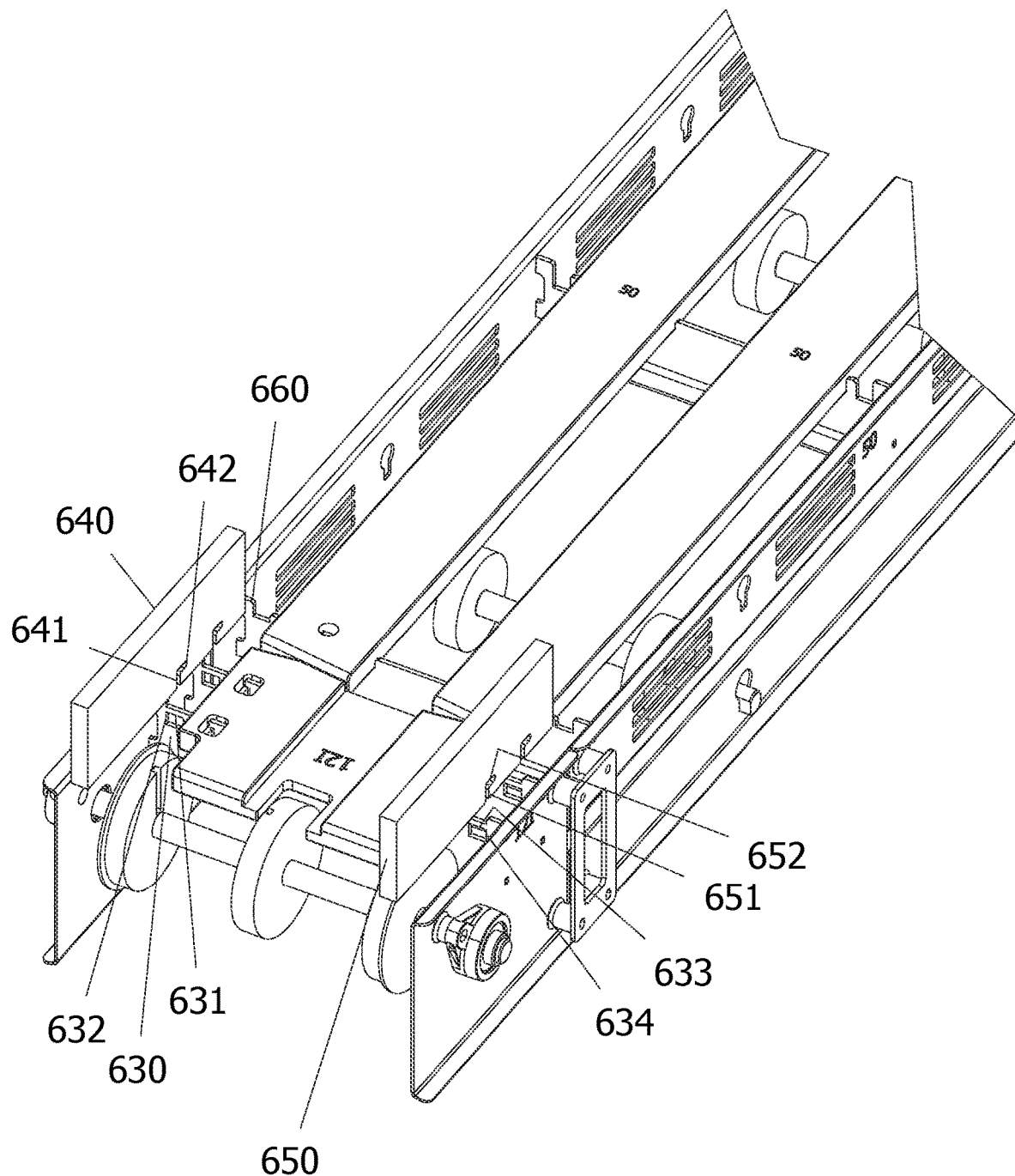
FIG. 29 is similar to FIG. 28 but shows the end strips in an exploded view.
Figure 30:
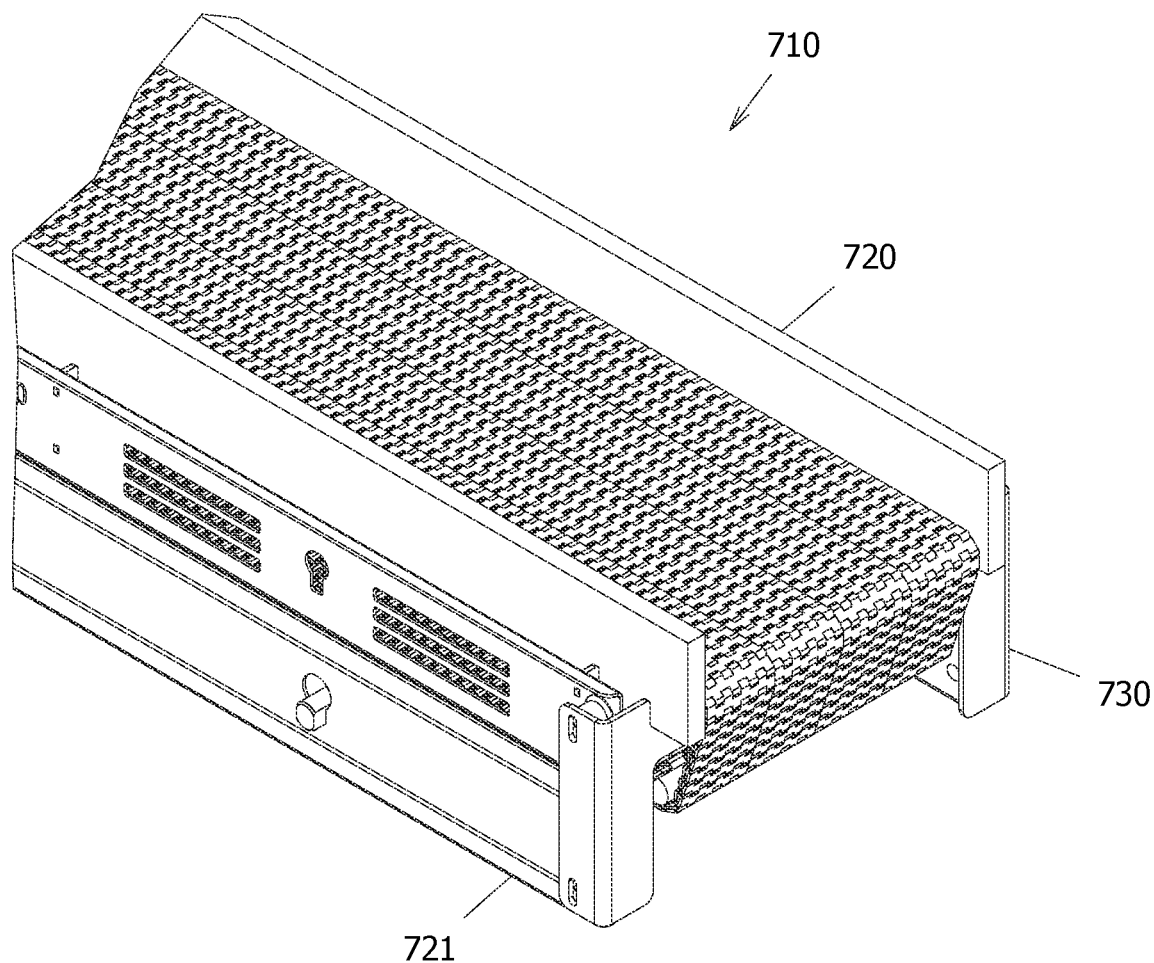
FIG. 30 is a perspective view of an alternative embodiment of the present invention.
Figure 31:
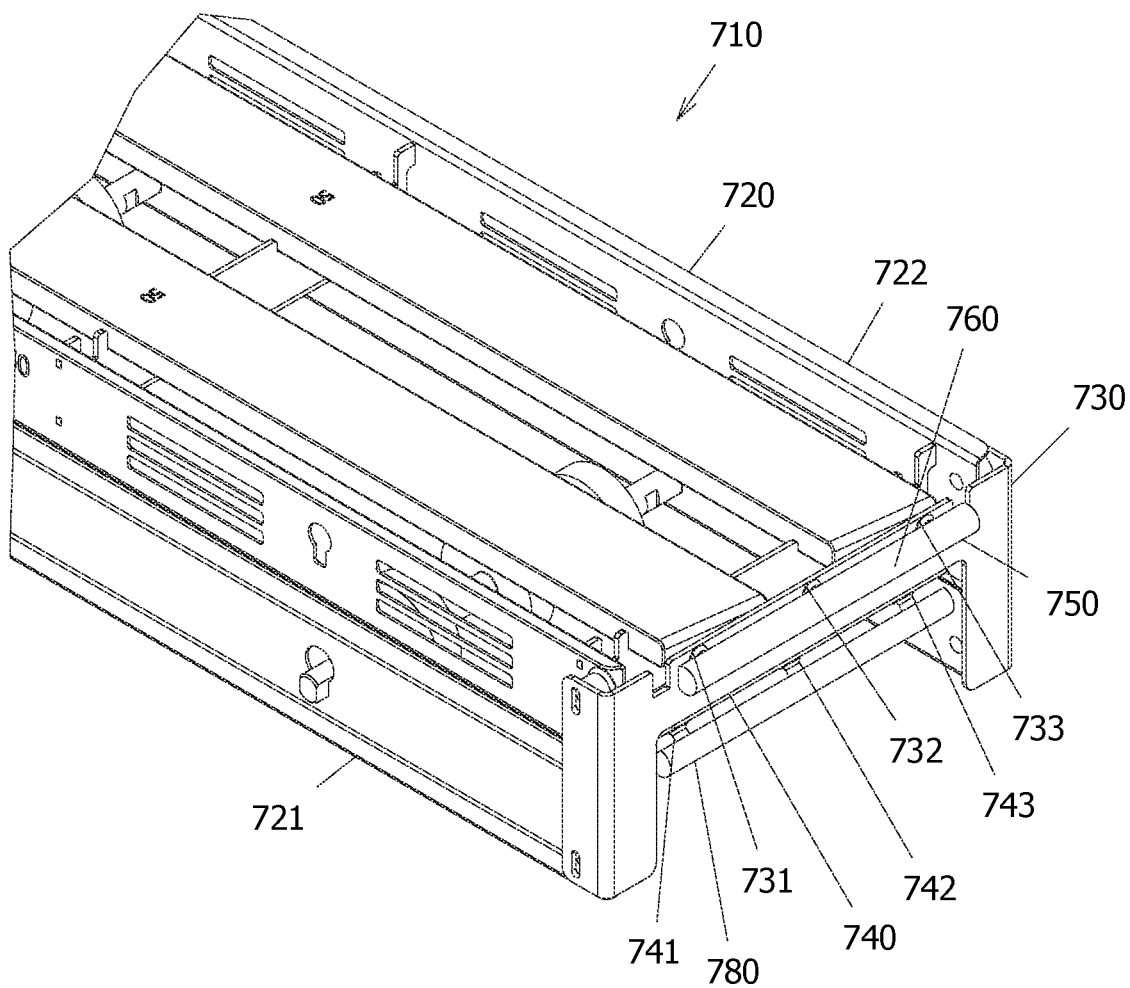
FIG. 31 is similar to FIG. 30, but shows the belt removed to reveal two nosers.
Figure 32:
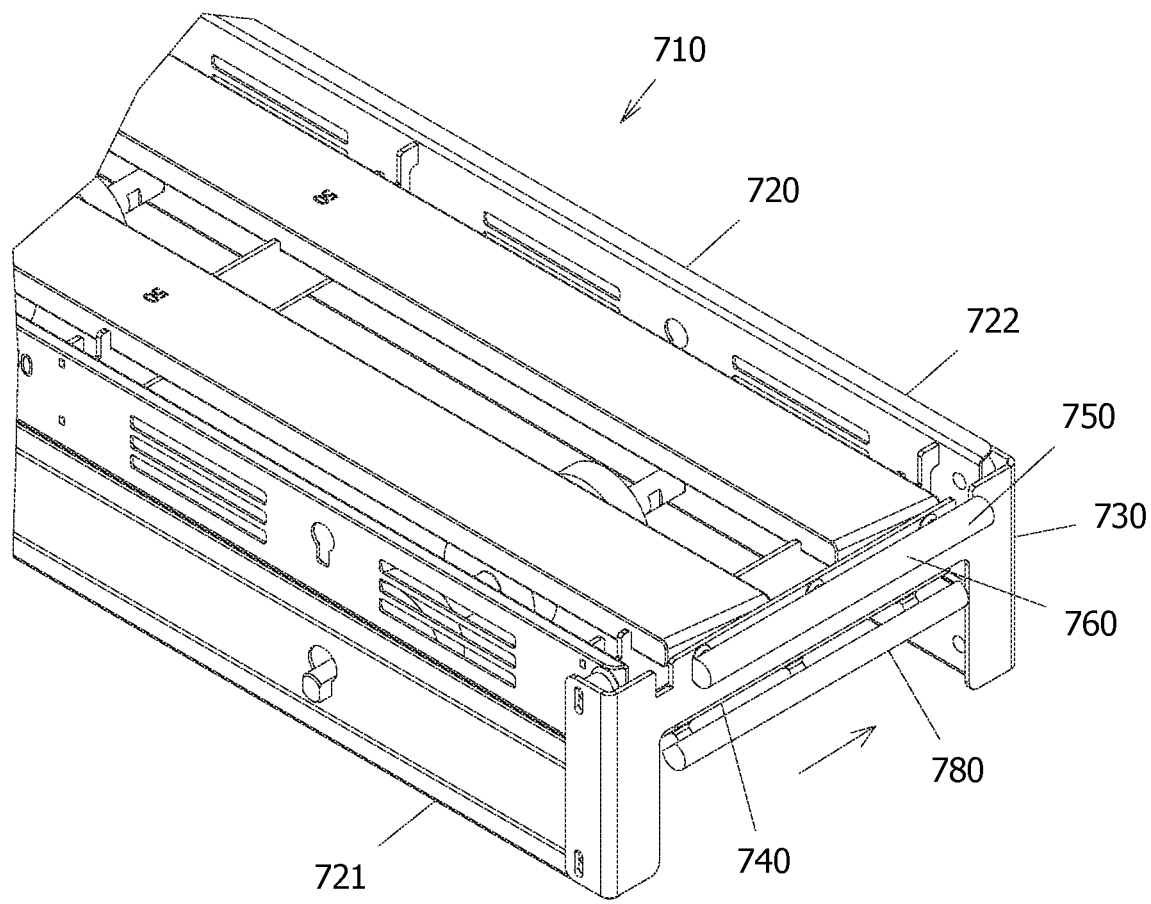
FIG. 32 is similar to FIG. 31 but shows the top noser slid in one direction relative to an end frame spacer.
Figure 33:
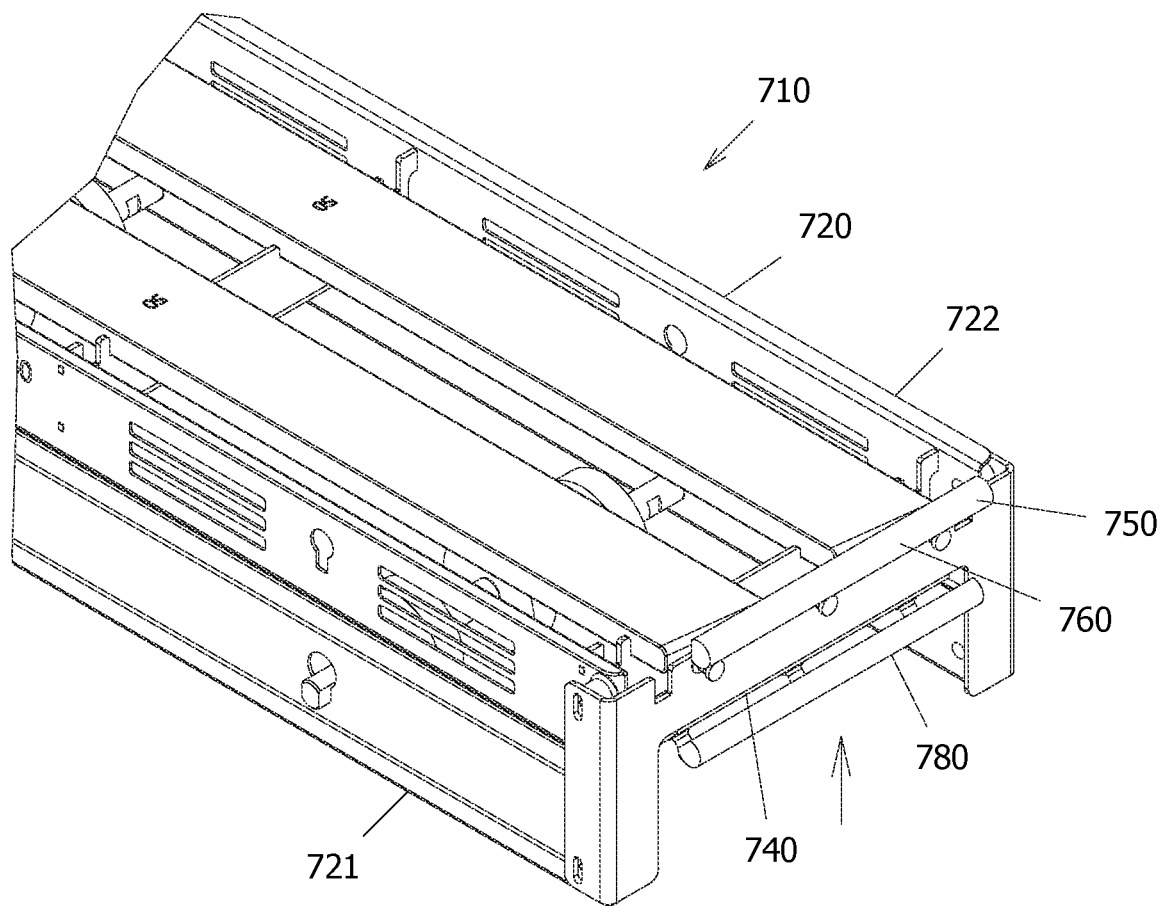
FIG. 33 is similar to FIG. 32 but shows the top noser slid vertically relative to the end frame spacer.
Figure 34:
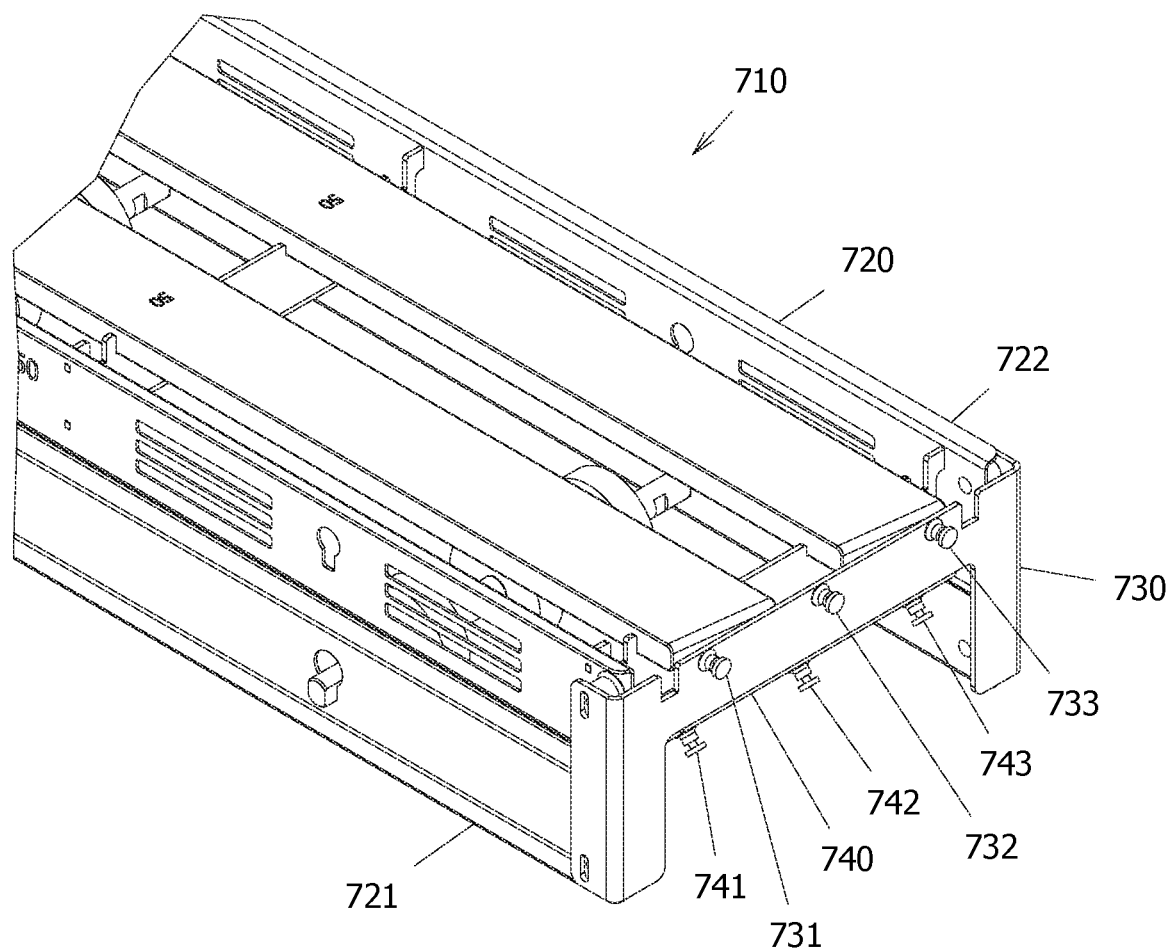
FIG. 34 is similar to FIG. 33 but shows the frame spacer without a noser.
Figure 35:
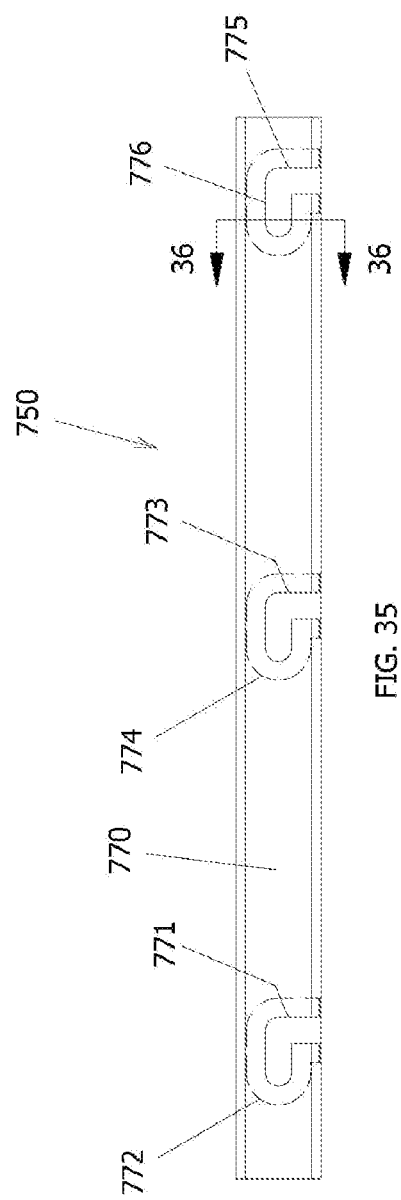
FIG. 35 is an isolation rear view of a noser.
Figure 36:
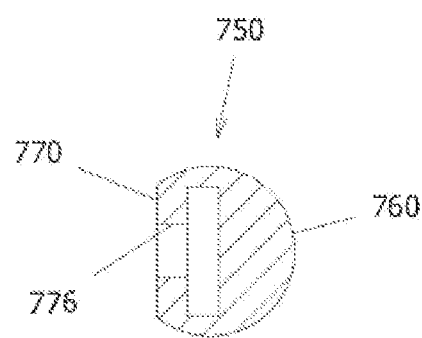
FIG. 36 is a cross-sectional view taken along line 36-36 in FIG. 35.
Figure 37:
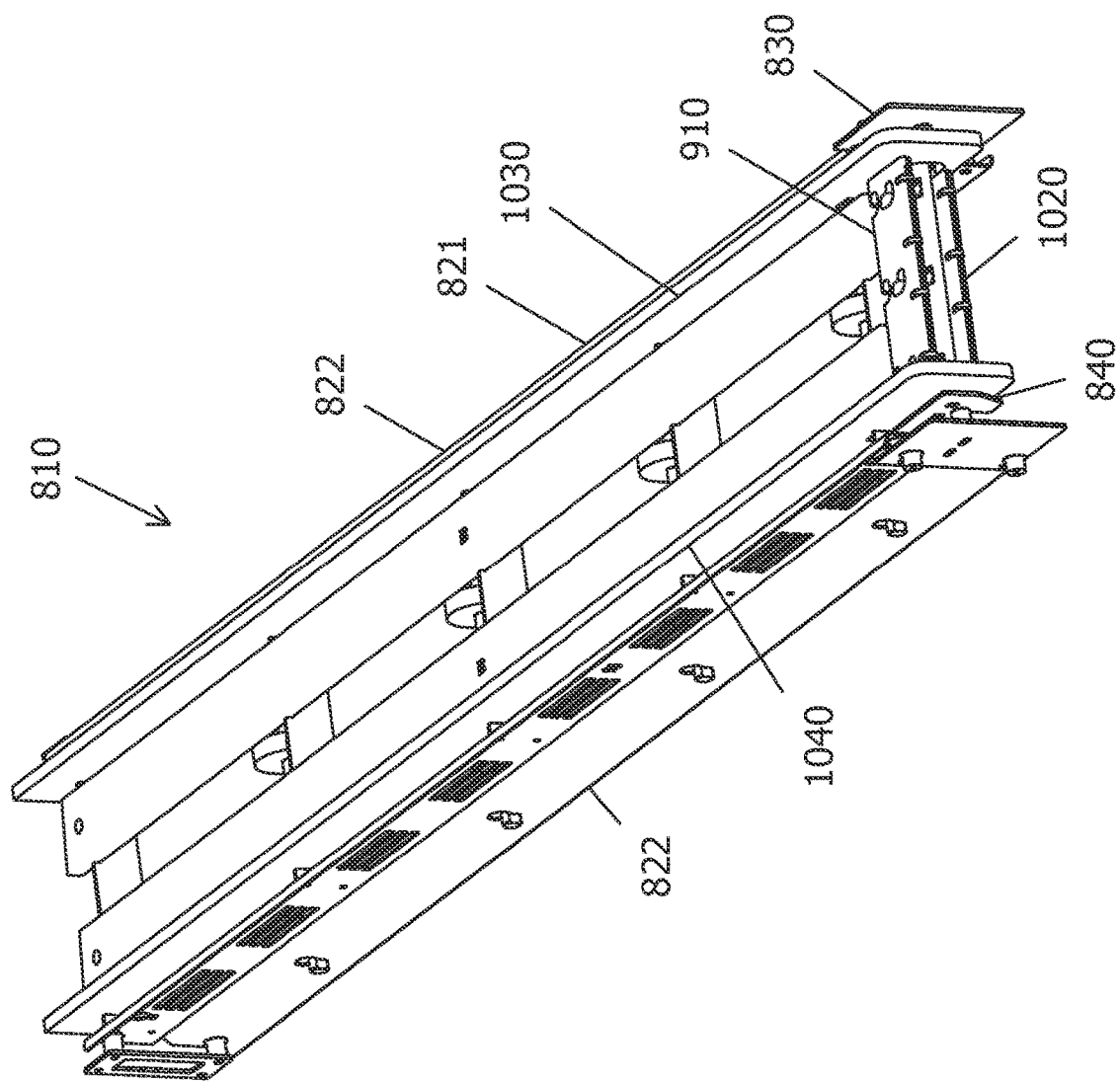
FIG. 37 is a perspective view of an alternative embodiment of the present invention containing a dynamic noser assembly.

A preferred embodiment of the present invention is illustrated in FIGS. 1-13. Turning now to FIG. 1, it is seen that a conveyor 10 is illustrated with a belt 20. A frame 30 is provided having ends 40 and 50. An idler 41 is at end 40. A drive 51 is at end 50. Any items on the belt 20 move relative to the frame 30 as the belt spins in a continuous loop about idlers at 41 and 51. The frame 30 has a frame longitudinal axis.

A frame spacer 60 is shown in FIGS. 2-9. Frame spacer 60 has a top 61, a bottom 62, a first side 63 and a second side 64. The top 61 has an edge with a relief 65, which is a cut away section of the top. The relief 65 preferably has side edges that are generally perpendicular to a relief bottom edge. A lock 70, having a riser 71 and a head 72, upstands from the bottom edge. The riser 71 and head 72 lie in the same plane as the front and rear faces of the frame spacer. The riser has a relatively narrow width, and the head had a relatively wide width. In the regard, the lock 70 has a generally T-shaped profile. A second lock 80 is also provided and has a riser 81 and a head 82. Lock 80 is preferably similar or the same as lock 70 in respect to size and function.

It is appreciated that while two locks are illustrated, that there could be more or fewer locks or locks of varying shapes without departing from the broad aspects of the present invention.

The frame spacer 60 generally lies in a plane that is perpendicular to the frame longitudinal axis. A second frame spacer 90 can be provided. Frame spacer 90 lies in a plane that is parallel to the plane of frame spacer 60.

Frame spacer 90 has a top 91, a bottom 92, a first side 93 and a second side 94. The top 91 has an edge with a relief 95, which is a cut away section of the top. The relief 95 has side edges that are generally perpendicular to a relief bottom edge. A lock 100, having a riser 101 and a head 102, upstands from the relief bottom edge. The riser 101 and head 102 lie in the same plane as the front and rear faces of the frame spacer. The riser has a relatively narrow width, and the head had a relatively wide width. In the regard, the lock 100 has a generally T-shaped profile. A second lock 110 is also provided and has a riser 111 and a head 112. Lock 110 is preferably similar or the same as lock 100 in respect to size and function. It is appreciated that while two locks are illustrated, that there could be more or fewer locks without departing from the broad aspects of the present invention.

It is appreciated that while two frame spacers 60 and 90 of this type are illustrated, there could be more or fewer without departing from the broad aspects of the present invention.

A third frame spacer 120 is further provided. Frame spacer 120 has a top 121, a bottom 122 and two sides 123 and 124, respectively. A relief 125 is provided. The relief has side edges that are generally perpendicular to a relief bottom edge. A tab 126 preferably upstands from the relief bottom edge. A relief 127 is provided. The relief has side edges that are generally perpendicular to a relief bottom edge. A tab 128 preferably upstands from the relief bottom edge.

Frame spacer 120 is farther interior on the frame 30 relative to the idler 41 as compared to frame spacers 60 and 90.

A wear strip 150 is provided. Wear strip 150 can also be called an idler wear strip, as it is positioned near an idler during use. Wear strip 150 has a top 151, a bottom 152, a first side 153, a second side 154, a first end 155 and a second end 156. Tabs can project from end 155 and span between idler rollers. Four holes 160, 170, 180 and 190 are formed through the wear strip 150. Holes 160 and 170 are preferably longitudinally aligned adjacent side 153. Holes 180 and 190 are preferably aligned adjacent side 154. Each of the holes 160, 170, 180 and 190 is preferably structurally similar or identical (although there is no requirement that each hole be so similarly or identically structured). Hole 160 has an upper cavity 161 on about the top half of the wear strip. The cavity 161 can be square or rectangular in profile when viewed from above. A lower passage 162 is also provided. The lower passage 162 has a wide gap 163 and a narrow gap 164. The wide gap 163 is preferably as wide as the upper cavity 161. The narrow gap 164 is narrower than the upper cavity 161. The upper cavity 161 is open to the top 151 of the wear strip 150. The lower passage 162 is open to the upper cavity 161 and to the bottom 152 of the wear strip 150.

The wear strip 150 is removably secured to frame spacers 60 and 90. Specifically, the locks can be received within holes on the wear strip. In the illustrated embodiment, there are four locks and four holes. There could be more or fewer locks and holes, or the locks may be shaped differently, and more than one wear strip as conveyor requirements dictate. Yet, a preferred operation can be the same. In order to secure the wear strip 150 to the frame 30, the head 72 of lock 70 is inserted through the wide gap 163 in the lower passage 162 until it reaches the upper cavity 161. Then, the wear strip 150 is moved longitudinally towards the idler 41 so that the riser 71 is received in the narrow gap 164 of the lower passage 162. The riser 71 contacts an end of the narrow gap 164 forming a travel stop of the wear strip 150. That is, further longitudinal travel is prohibited. Further, the head 72 is wider than the narrow gap 164 whereby the wear strip 150 cannot be vertically moved relative to the frame spacer 60. Still further, the relieve side edges engage the sides 153 and 154 of the wear strip 150 preventing lateral movement of the wear strip 150 relative to the frame spacer 60. Similar engagement is made between lock 80 and hole 180. Further similar engagement is made between locks 100 and 110 of frame spacer 90 and holes 170 and 190, respectively.

A longitudinal wear strip 200 having opposed ends is provided. A hole 201 is adjacent one or both ends of the strip 200. A second longitudinal wear strip 210 is also provided and has opposed ends. A hole 211 is adjacent one or both ends of the strip 210. Longitudinal wear strip can be supported at one end by frame spacer 120. In this regard, the hole 201 can be aligned with tab 126 whereby lowering of the longitudinal wear strip 200 fixes the strip in place. This is accomplished longitudinally by tab 126 and hole 201, and laterally by the side edges of relief 125 engaging the sides of the longitudinal wear strip 200. Similarly, longitudinal wear strip can be supported at one end by frame spacer 120. In this regard, the hole 211 can be aligned with tab 128 whereby lowering of the longitudinal strip 210 fixes the strip in place. This accomplished longitudinally by tab 128 and hole 211, and laterally by side edges of relief 127 engaging the sides of the longitudinal wear strip 210.

It is noted that when the longitudinal wear strips 200 and 210 are in place, that they abut the wear strip 150 thereby preventing it from moving longitudinally relative to the frame 30. In this regard, the longitudinal wear strips 200 and 210 complete the locking of the wear strip 150.

While not shown, it is appreciated that a second wear strip, oppositely oriented, can be at the other end 50 of the frame wherein the wear strip tabs extend towards the drive 51. The same longitudinal wear strips can simultaneously abut the second wear strip locking in into place as well.

Turning now to FIGS. 14-20, it is seen that an additional embodiment of the present invention is illustrated. A conveyor 310 is provided having a frame 320 with opposed sides 321 and 322, respectively. The frame 320 has a top and a bottom. Eight frame spacers are illustrated. It is appreciated that while eight frame spacers are illustrated, that there could be more or fewer without departing from the broad aspects of the present invention. Frame spacer 330 has two locks, namely lock 331 and lock 332. Frame spacer 340 has two locks, namely lock 341 and lock 342. Frame spacer 350 has two locks, namely lock 351 and lock 352. Frame spacer 360 has two locks, namely lock 361 and lock 362. Frame spacer 370 has two locks, namely lock 371 and lock 372. Frame spacer 380 has two locks, namely lock 381 and lock 382. Frame spacer 390 has two locks, namely lock 391 and lock 392. Frame spacer 400 has two locks, namely lock 401 and lock 402. Each lock preferably has a riser and a head, wherein the head had a head width that is wider than riser width. In this regard, each lock preferably is generally T-shaped.

A wear strip 410 having holes 411, 412, 413 and 414 are provided. Each hole has an upper cavity and a lower passage with a wide gap and a narrow gap. In this regard, each hole can interface with a lock. Specifically, the hole 411 can be secured by lock 331. Hole 412 can be secured by lock 341. Hole 413 can be secured by lock 351. Hole 414 can be secured by lock 361. The wear strip is shown locked in FIG. 14 and unlocked in FIG. 16. The wear strip can be pivoted about the radius of the corner section of the frame to lock and unlock the wear strip.

A wear strip 420 having holes 421, 422, 423 and 424 are provided. Each hole has an upper cavity and a lower passage with a wide gap and a narrow gap. In this regard, each hole can interface with a lock. Specifically, the hole 421 can be secured by lock 332. Hole 422 can be secured by lock 342. Hole 423 can be secured by lock 352. Hole 424 can be secured by lock 362. The wear strip is shown locked in FIG. 14 and unlocked in FIG. 16. The wear strip can be pivoted about the radius of the corner section of the frame to lock and unlock the wear strip.

It is appreciated that wear strips 410 and 420 are an outer and inner pair of wear strips that approach one side of a corner. The wear strips are unlocked by moving them away from the corner relative to the frame 320.

A wear strip 430 having holes 431, 432, 433 and 434 are provided. Each hole has an upper cavity and a lower passage with a wide gap and a narrow gap. In this regard, each hole can interface with a lock. Specifically, the hole 431 can be secured by lock 371. Hole 432 can be secured by lock 381. Hole 433 can be secured by lock 391. Hole 434 can be secured by lock 401. The wear strip is shown locked in FIG. 14 and unlocked in FIG. 16. The wear strip can be pivoted about the radius of the corner section of the frame to lock and unlock the wear strip.

A wear strip 440 having holes 441, 442, 443 and 444 are provided. Each hole has an upper cavity and a lower passage with a wide gap and a narrow gap. In this regard, each hole can interface with a lock. Specifically, the hole 441 can be secured by lock 372. Hole 442 can be secured by lock 382. Hole 443 can be secured by lock 392. Hole 444 can be secured by lock 402. The wear strip is shown locked in FIG. 14 and unlocked in FIG. 16. The wear strip can be pivoted about the radius of the corner section of the frame to lock and unlock the wear strip.

It is appreciated that wear strips 430 and 440 are an outer and inner pair of wear strips that approach one side of a corner. The wear strips are unlocked by moving them away from the corner relative to the frame 320.

A lower spacer 450 having locks 451 and 452 is also provided. The locks are formed of inwardly oriented arms.

An outer guide 460 is shown. The outer guide 460 has a top lip 461 and a bottom lip 462. The top and bottom lips 461 and 462 define a channel 463 for receiving a belt. A slot 464 is formed in the outer side of the guide 460 (opposite side as channel 463). The lock 451 can lock the guide in place by securing to the slot 464. The guide is unlocked by pivoting the guide inwards so that the lock is no longer engaged within the slot. The guide cannot become unlocked when a belt is in place.

An inner guide 470 is shown. The inner guide 470 has a top lip 471 and a bottom lip 472. The top and bottom lips 471 and 472 define a channel 473 for receiving a belt. A slot 474 is formed in the outer side of the guide 470 (opposite side as channel 473). The lock 452 can lock the guide in place by securing to the slot 474. The guide is unlocked by pivoting the guide inwards so that the lock is no longer engaged within the slot. The guide cannot become unlocked when a belt is in place.

Turning now to FIGS. 21-25, it is seen that a conveyor 510 with a frame 520 is provided. The frame 520 has a first section 521 separated from a second section 522 with a joint 530. The frame changes pitch, or elevation, at the joint 530.

Three pegs 531, 532 and 533 are inwardly facing from the joint. A cope 540 is illustrated having a top 541 and a bottom 542. A slot 550 having a notch 551 is provided. A slot 560 having a notch 561 is provided. A slot 570 having a notch 571 is provided. The cope 540 is secured to the joint 530 by aligning the slots with the pegs, pressing the cope onto the pegs, and then twisting the cope 540 so that the pegs are securely received within the respective notches of the slots. Disassembly occurs in the opposite manner.

An upper guide 580 is provided. A lower guide 590 having a first piece 591 and a second piece 592 is also provided. The belt can pass between the first and second pieces of the lower guide. The guides maintain the belt is position relative to the frame when a change in pitch of the frame occurs to prevent separation of the belt from the frame.

Turning now to FIGS. 26-29, it is seen that another embodiment of the present invention is illustrated. A conveyor 610 with a frame 620 is illustrated. The frame 620 has sides 621 and 622. A frame spacer 630 is shown. The frame spacer 630 has a first side 631 with a lock 632, and a second side 633 with a lock 634. An end guide rail 640 is shown. Guide rail 640 has a vertical slot 641 and a horizontal slot 642. The rail is locked when the lock 632 is received within the horizontal slot 642. A second guide rail 650 is shown. Guide rail 650 has a vertical slot 651 and a horizontal slot 652. The second guide is locked when lock 634 is received within the horizontal slot 652.

A frame spacer 660 is also shown. The frame spacer 660 has a first side 661 with a lock 662, and a second side 663 with a lock 664. A side guide rail 670 is shown. Guide rail 670 has a vertical slot 671. The guide rail is locked when the lock 662 is received within the vertical slot 671. A second guide rail 680 is shown. Guide rail 680 has a vertical slot 681. The second guide rail is locked when lock 664 is received within the vertical slot 681.

Guide rails 670 and 680, when installed, prevent the unlocking of end guide rails 640 and 650 by preventing longitudinal movement of the end guide rails.

Turning now to FIGS. 30-36, it is seen that an additional embodiment of the present invention is illustrated. A conveyor 710 is shown with a belt in FIG. 30. The conveyor has a frame 720 with opposed sides 721 and 722. An end frame spacer 730 is provided. The frame spacer 730 has three pegs 731, 732 and 733, respectively. Each peg has a post and a head that is wider than the post. A return face 740 with three pegs 741, 742 and 743, respectively, is also shown.

A noser 750 is removably supported by the end frame spacer 730. The noser 750 has a face 760 that is preferably rounded. The noser 750 also has a back 770 that is generally flat. A slot 771 with a notch 772 is provided. A slot 773 with a notch 774 is also provided. A slot 775 with a notch 776 is also provided. The slots are formed into the back 770 of the noser 750 and are open to one side. The slots and notches are preferably offset 90 degrees but could be angled differently without departing from the broad aspect of the present invention. The slots and notches are undercut wherein they have inner portions that are wider than outer portions, thereby providing wide areas to accommodate the peg heads in the slot and notch.

The noser 750 is secured to the spacer 730 by vertically aligning the slots with the pegs. The heads will fit into the wide inner portions of the slot as the noser is vertically moved into the slots. Then, the noser is slid horizontally so that the pegs are moved into the notches, respectively. In this position, with a belt in place, the noser 750 will not move as the belt moves. The noser 750 is removed from the end frame spacer 730 in the opposite manner.

Noser 780 is connected to, and disconnected from, the return face 740 in a similar manner as noser 750 is with end frame spacer 730.

Turning now to FIGS. 37-48, it is seen that an additional embodiment of the present invention is illustrated. A conveyor 810 is provided and is shown without a belt in FIG. 37. The conveyor 810 has a frame 820 with opposed sides 821 and 822. A noser frame assembly 830 is provided. The noser frame assembly 830 has a bracket 835 on side 821 and a bracket 840 on side 822. The brackets 835 and 840 collectively support three frame spacers 850, 870 and 890, respectively. While three frame spacers are illustrated in the preferred embodiment, it is appreciated that there could be more or fewer (even a single integrated piece) without departing from the broad aspects of the present invention.

End frame spacer 850 has a top 860 and a bottom 865. Three pegs 861, 862 and 863, respectively, upstand from the top 860. Each peg has a shaft and a head, wherein the head is wider than the shaft. Each head is at the distal end of the respective peg separated from the respective spacer by the respective shaft.

End frame spacer 870 has a top 880 and a bottom 885. Three pegs 881, 882 and 883, respectively, upstand from the top 880. Three pegs 886, 887 and 888, respectively, depend or extend down from the bottom 885. Each peg has a shaft and a head, wherein the head is wider than the shaft. Each head is at the distal end of the respective peg separated from the respective spacer by the respective shaft.

End frame spacer 890 has a top 900 and a bottom 905. Three pegs 906, 907 and 908, respectively, depend or extend down from the bottom 905. Each peg has a shaft and a head, wherein the head is wider than the shaft. Each head is at the distal end of the respective peg separated from the respective spacer by the respective shaft.

Figure 39:
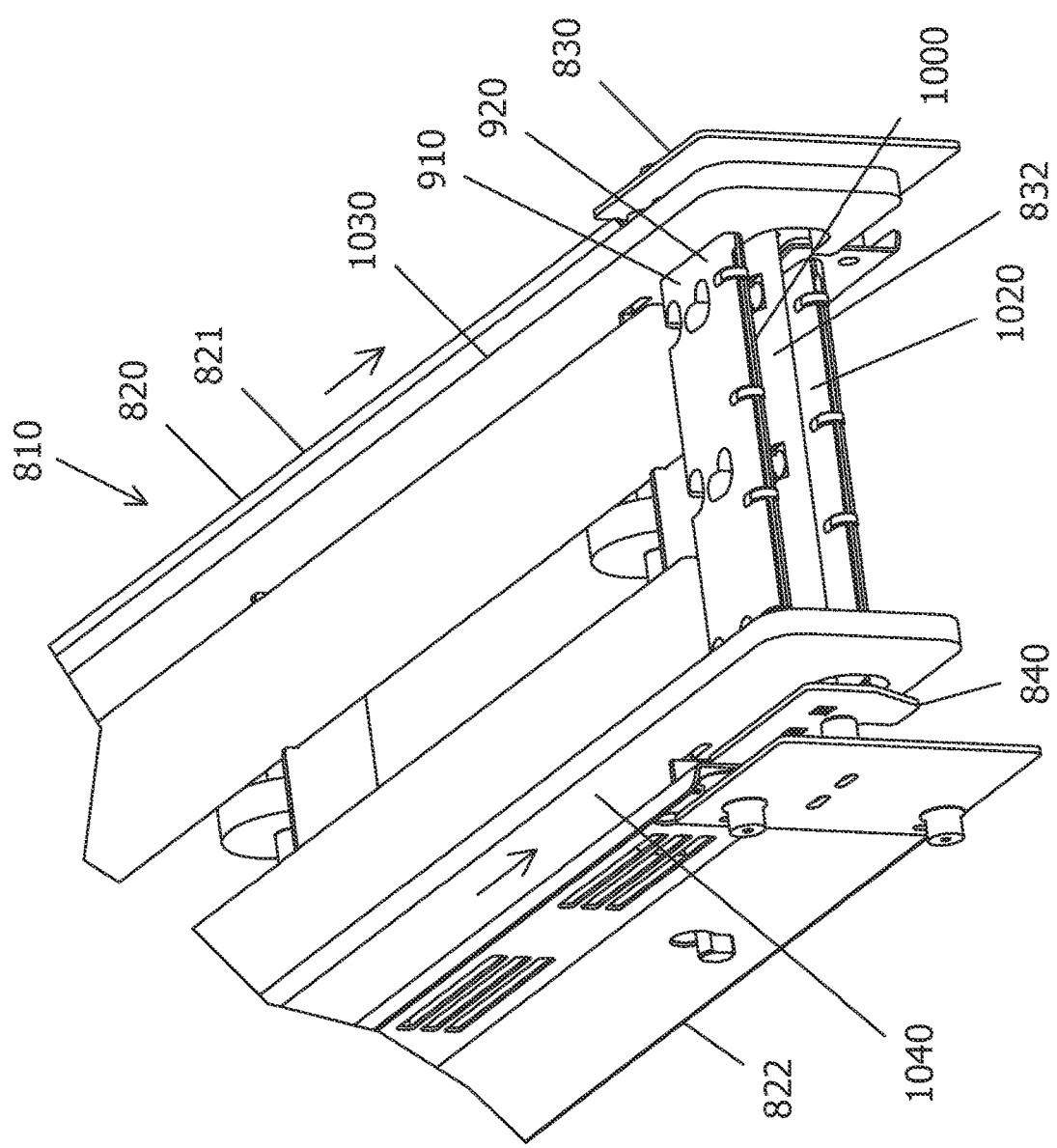
FIG. 39 is similar to FIG. 38 but shows a partial disassembly of the assembly.
Figure 40:
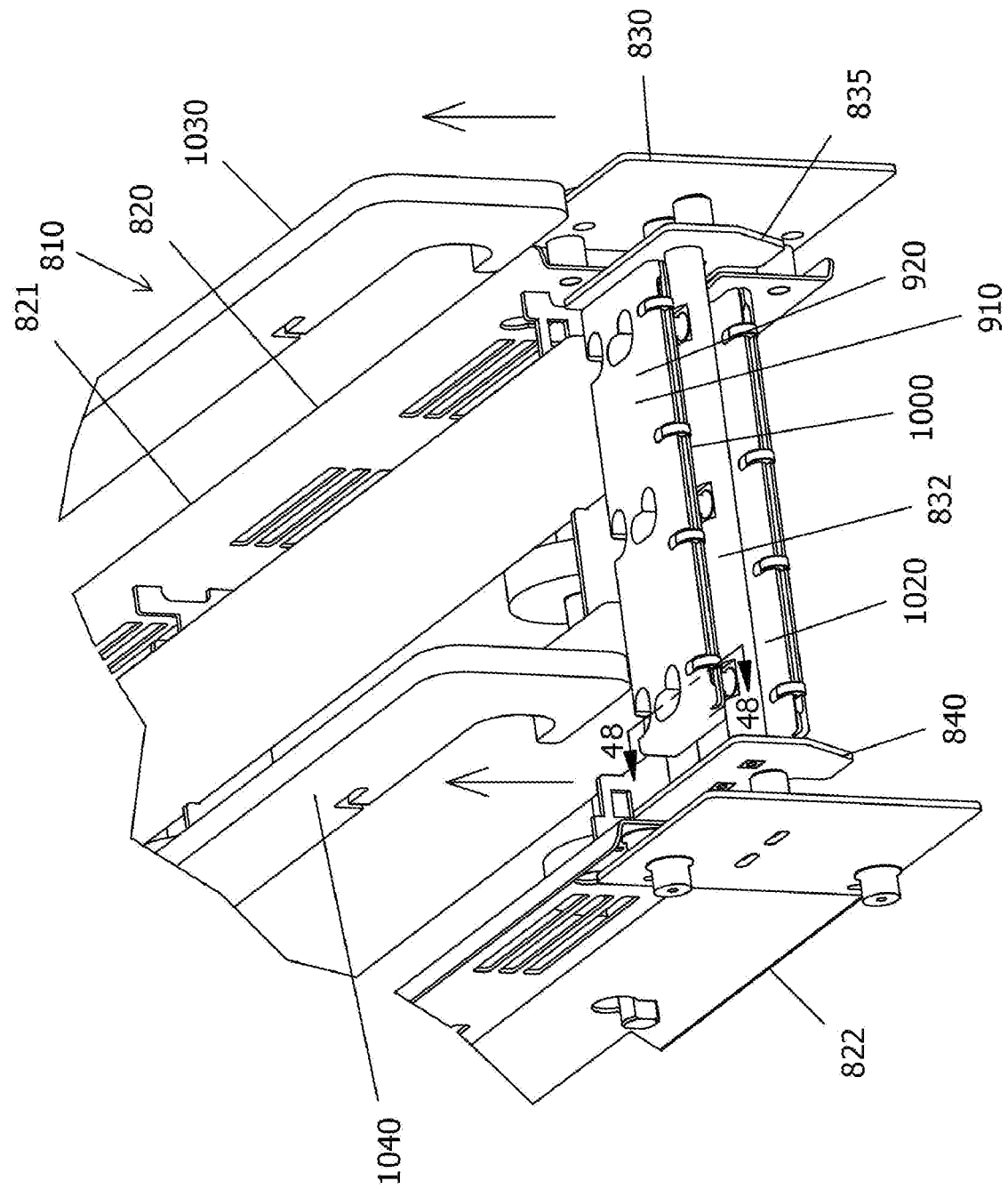
FIG. 40 is similar to FIG. 39 but shows a further step in disassembly of the assembly.

The pegs on the three end frame spacers 850, 870 and 890 are laterally aligned (three wide) and longitudinally aligned (two deep) with respect to the conveyor longitudinal axis as seen in FIGS. 39 and 40.

The noser frame assembly 830 removably supports dynamic noser assemblies 910 and 1020. Dynamic noser assembly 1020 is preferably identical to dynamic noser assembly 910. The dynamic noser assembly 910 has a noser 920 and a bearing shaft 1000 supporting at least one bearing 1010. The noser is preferably made of a solid material such as a virgin UHMW material. Yet, it is appreciated that other materials may be used without departing from the broad aspects of the present invention.

The noser 920 has an inner side 921 (bottom side), an outer side 922 (top side), opposed lateral sides 923 and 924, respectively, a rear side 925 and a front side 926 (at end of conveyor). The noser front side 926 lies in a noser front plane.

Figure 45:
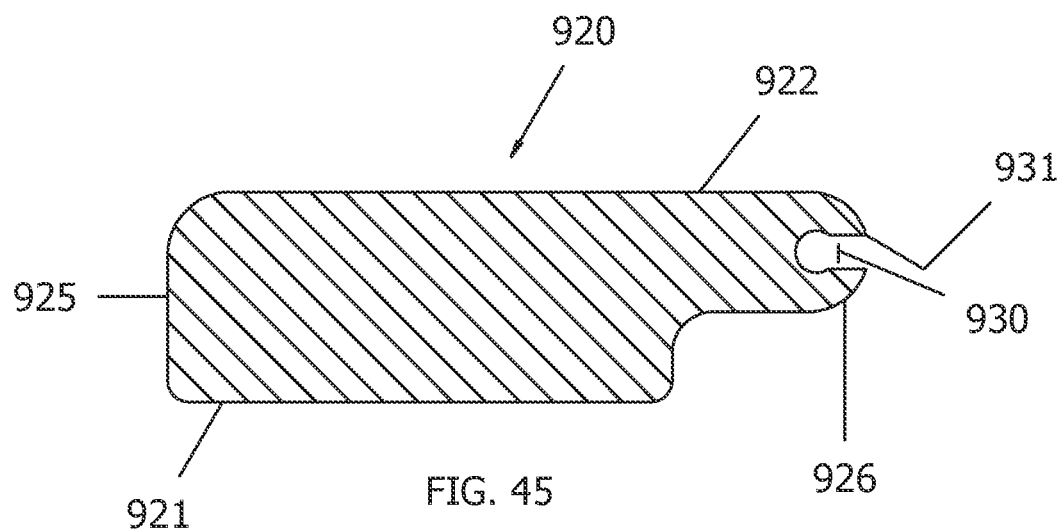
FIG. 45 is a cross-sectional view taken along line 45-45 in FIG. 44.
Figure 46:
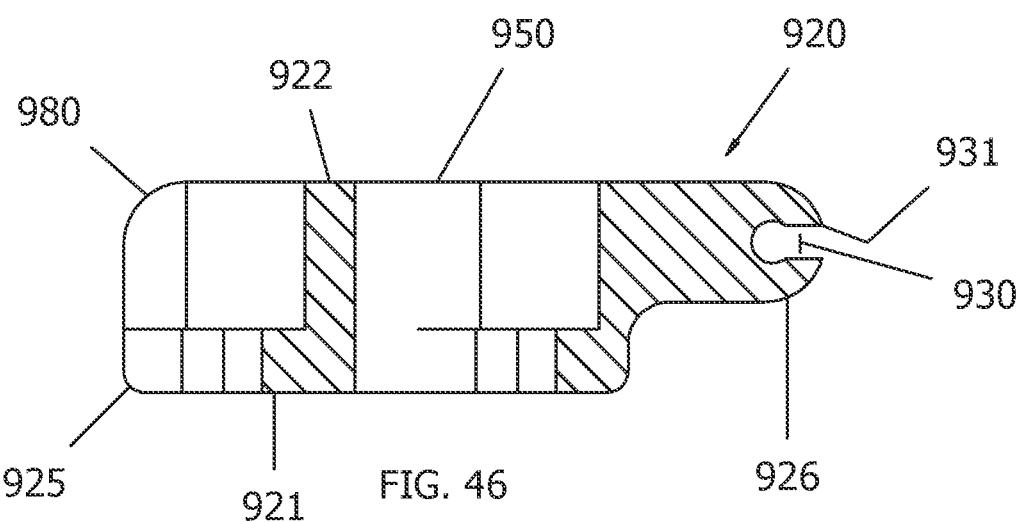
FIG. 46 is a cross-sectional view taken along line 46-46 in FIG. 44.
Figure 47:
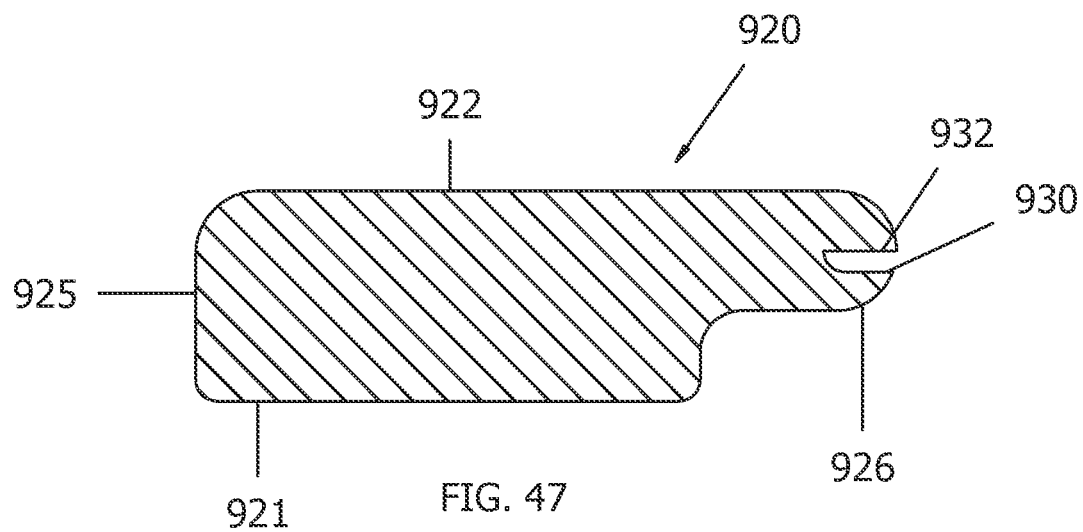
FIG. 47 is a cross-sectional view taken along line 47-47 in FIG. 44.
Figure 48:
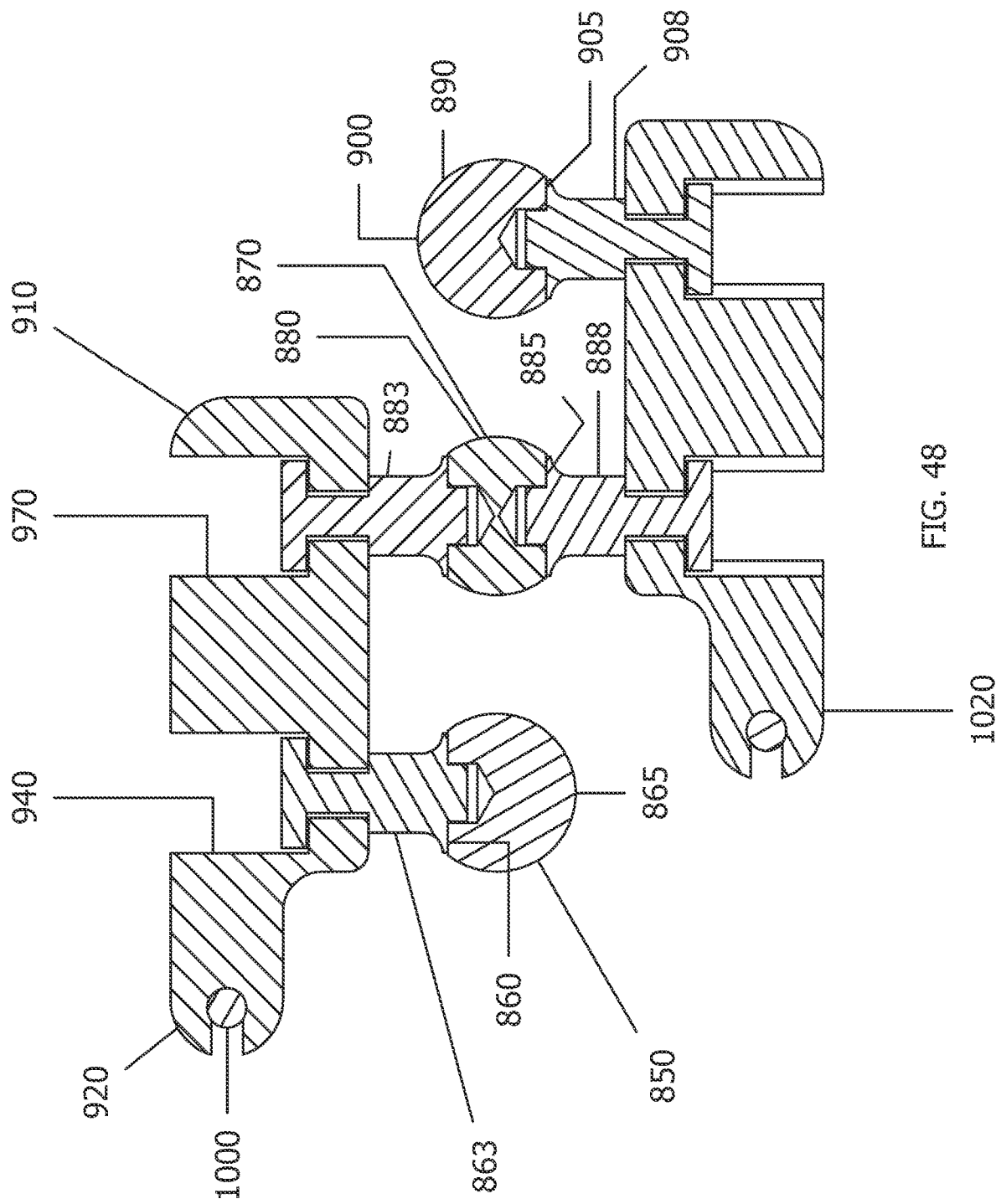
FIG. 48 is a cross-sectional view taken along line 48-48 in FIG. 41.

A channel 930 is formed into the front side 926 of the noser 920. The channel 930 has an interior 931 with opposed ends 932 and 933. The interior 931 of the channel 930 is open at one side between ends 932 and 933. Opposite the open side of the channel is an innermost side. The innermost side is preferably generally rounded and sized to receive the bearing shaft 1000. The rounded portion is preferably wider in diameter than the open side of the interior 931 of the channel 930 is tall. Thus, the smaller entry side of the interior 931 secures the bearing shaft 1000 within the channel 930. As seen in FIGS. 45, 46 and 47, the channel depth is decreased at the ends 932 and 933 so that the ends of the bearing shaft 1000 can be frictionally held by the channel 930 and also to prevent the bearing shaft 1000 from rotating relative to the channel 930.

Figure 44:
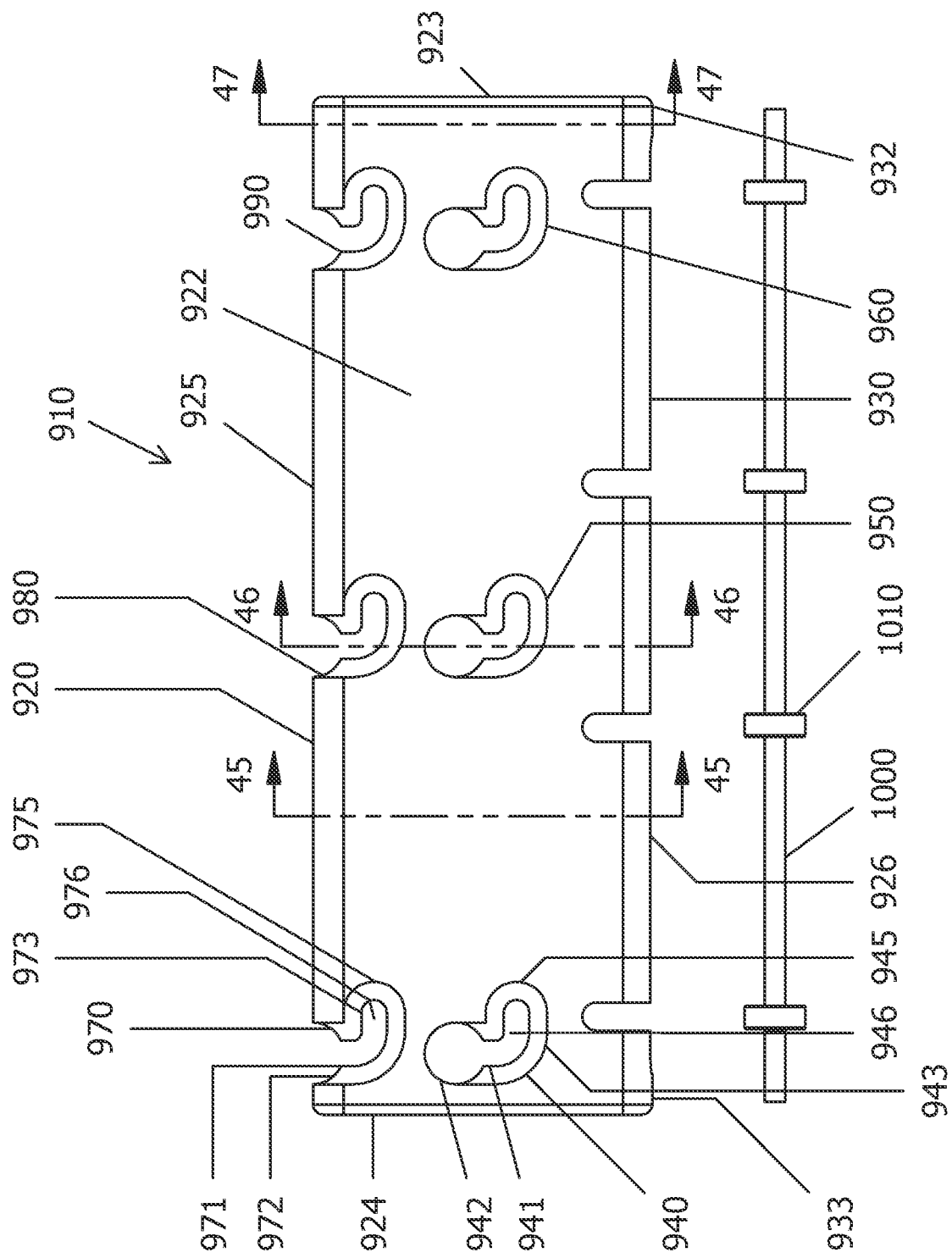
FIG. 44 is an exploded top view of the dynamic noser assembly.

Several holes 940, 950, 960, 970, 980 and 990 are formed through the noser. Holes 940, 950 and 960 are aligned between ends 923 and 924 of the noser as seen in FIG. 44. These three holes 940, 950 and 960 preferably have the same structure. Hole 940 will be described for brevity with the understanding that the other two holes are preferably identical.

Hole 940 has a slot 941 with a bottom entry 942 (through noser bottom) with a circular shape that is wide enough to allow a peg head to pass through it. The slot is aligned in a direction spanning between the noser front and rear sides. The hole 940 also has a notch 943. The notch 943 is preferably offset from the slot 941 by 90 degrees but could be angled differently without departing from the broad aspect of the present invention. The notch 943 is preferably aligned in a direction parallel with the noser front plane. The slots and notches are undercut wherein they have outer portions 945 (preferably open to the noser outer side 922) that are wider than inner portions 946 (preferably open to the noser inner side 921), thereby providing wide areas to accommodate the peg heads in the slot and notch. The peg head wide wider than the inner portion so that the head cannot pass vertically through it.

Holes 970, 980 and 990 are aligned between ends 923 and 924 of the noser as seen in FIG. 44. These three holes 970, 980 and 990 preferably have the same structure. Hole 970 will be described for brevity with the understanding that the other two holes are preferably identical.

Hole 970 has a slot 971 with a rear side entry 972 (through noser rear side 925). The slot 971 is aligned in a direction spanning between the noser front and rear sides. The hole 970 also has a notch 973. The notch 973 is preferably offset from the slot 971 by 90 degrees but could be angled differently without departing from the broad aspect of the present invention. The notch 973 is preferably aligned in a direction parallel with the noser front plane. The slots and notches are undercut wherein they have outer portions 975 (preferably open to the noser outer side 922) that are wider than inner portions 976 (preferably open to the noser inner side 921), thereby providing wide areas to accommodate the peg heads in the slot and notch. The peg head wide wider than the inner portion so that the head cannot pass vertically through it wherein the pegs can vertically lock the noser when the pegs are in the respective notches.

Holes 940 and 970 are longitudinally aligned relative to the conveyor longitudinal axis. Holes 950 and 980 are longitudinally aligned relative to the conveyor longitudinal axis. Holes 960 and 990 are longitudinally aligned relative to the conveyor longitudinal axis.

Guide rails 1030 and 1040 are provided. Each guide rail has a front end with a lower hook. The hooks can wrap around frame spacer 850. In this regard, when the hooks engage the frame spacer 850, the guide rails are vertically locked in place. The guide rails are moved longitudinally a sufficient distance so that the hooks do not engage the frame spacer before they can be removed from the frame 820.

The noser 920 is insertable onto and removable from the conveyor without tools. Insertion is accomplished by aligning the six holes of the noser 920 with the six upper pegs on the noser frame assembly. The pegs are inserted either through the bottom or rear entries and the noser 920 is moved longitudinally (relative to the conveyor) through the respective slots and then moved laterally within the respective notches. In this position, the noser cannot move longitudinally relative to the frame (shaft of pegs contacts notches) and cannot be moved vertically (peg heads bound in outer portions and are wider than inner portions). Guide rails 1030 and 1040 are inserted to lock the noser 920 in place with the pegs received within the notches. In this regard, the guide rails 1030 prevent the noser 920 from moving laterally relative to the frame. The noser 920 cannot be removed from the pegs when the pegs are received within the notches of the holes.

Figure 38:
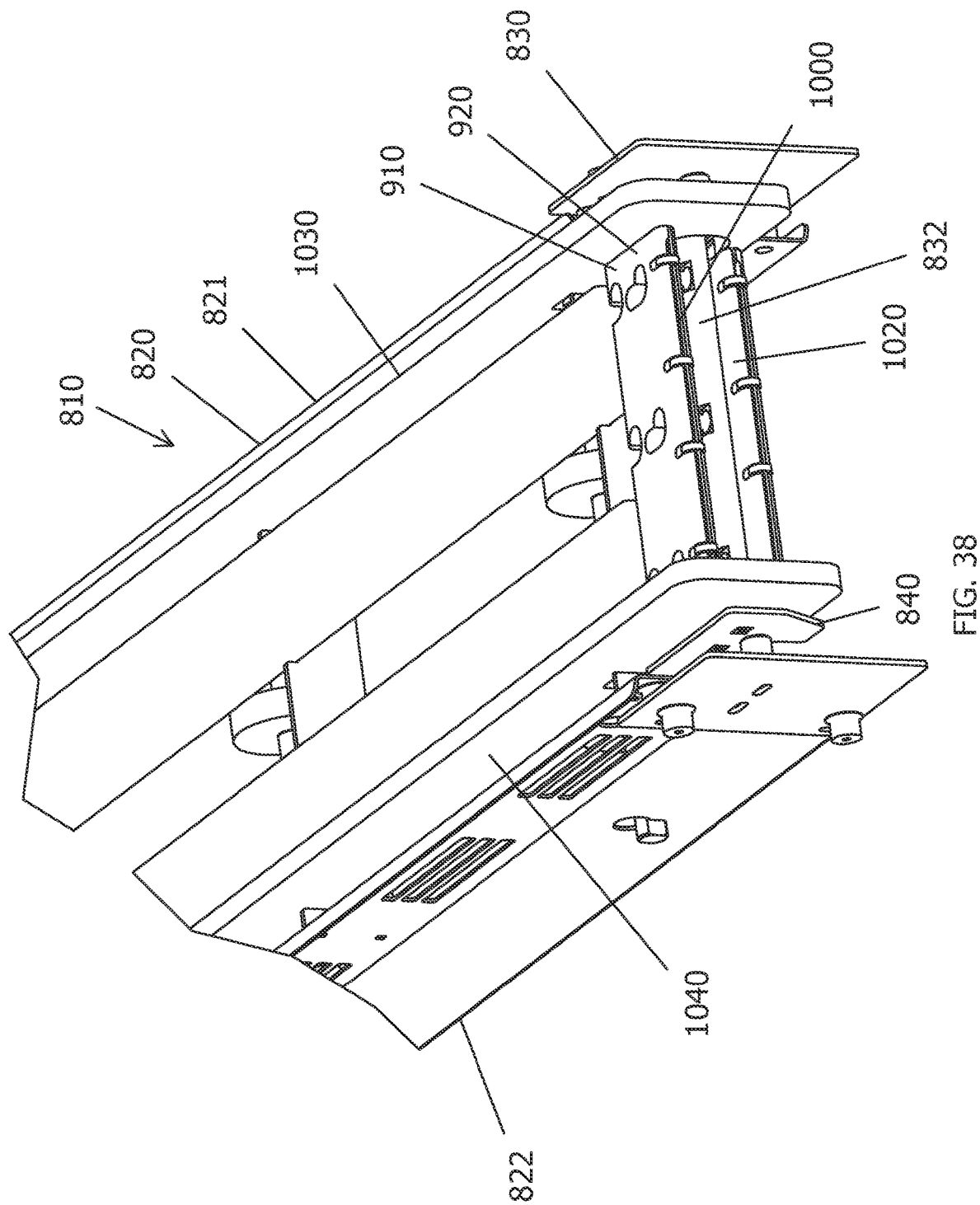
FIG. 38 is a close-up perspective view of the dynamic noser assembly shown in FIG. 37.
Figure 41:
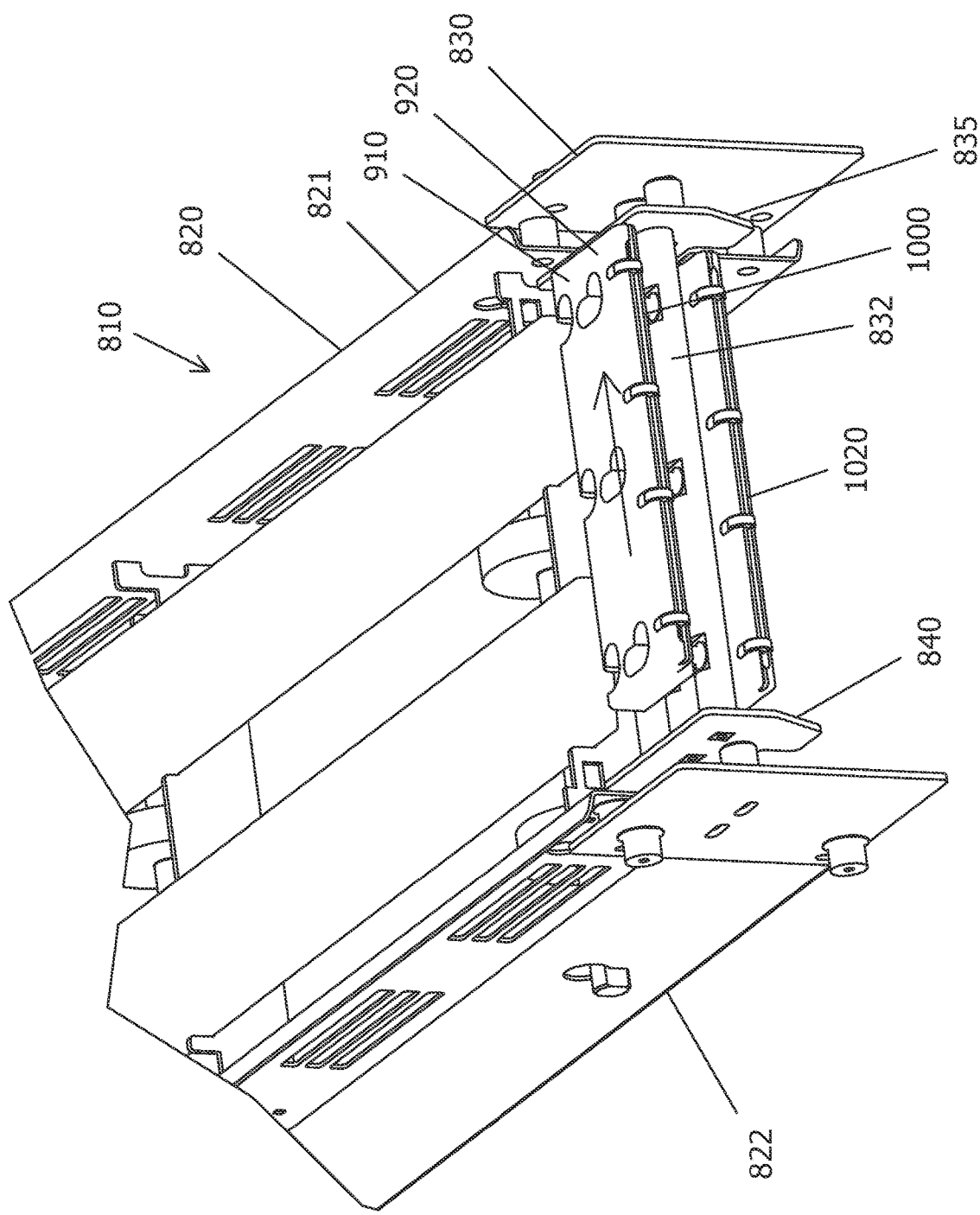
FIG. 41 is similar to FIG. 40 but shows a further step in disassembly of the assembly.
Figure 42:
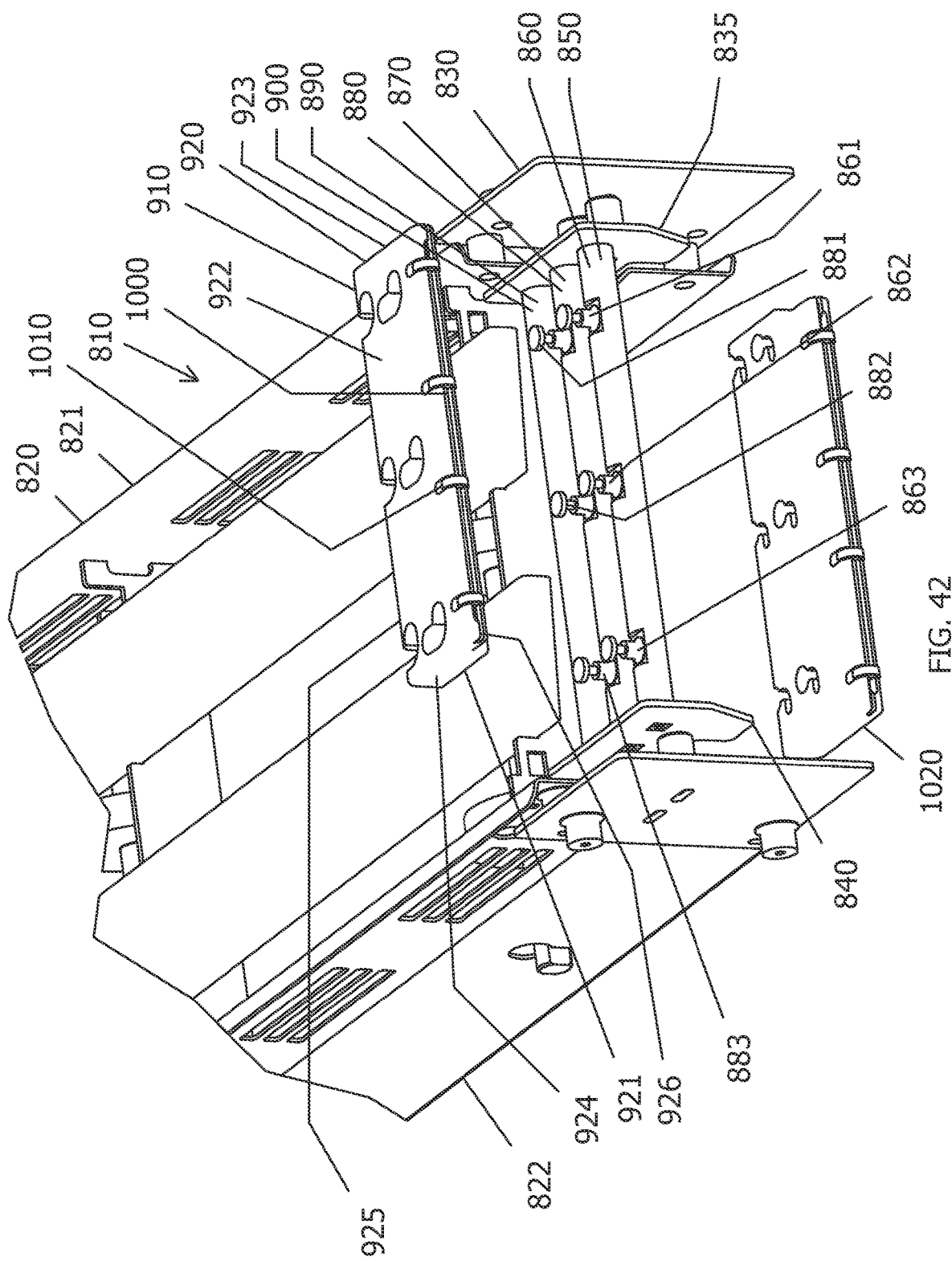
FIG. 42 is an exploded view of the components in FIG. 38.
Figure 43:
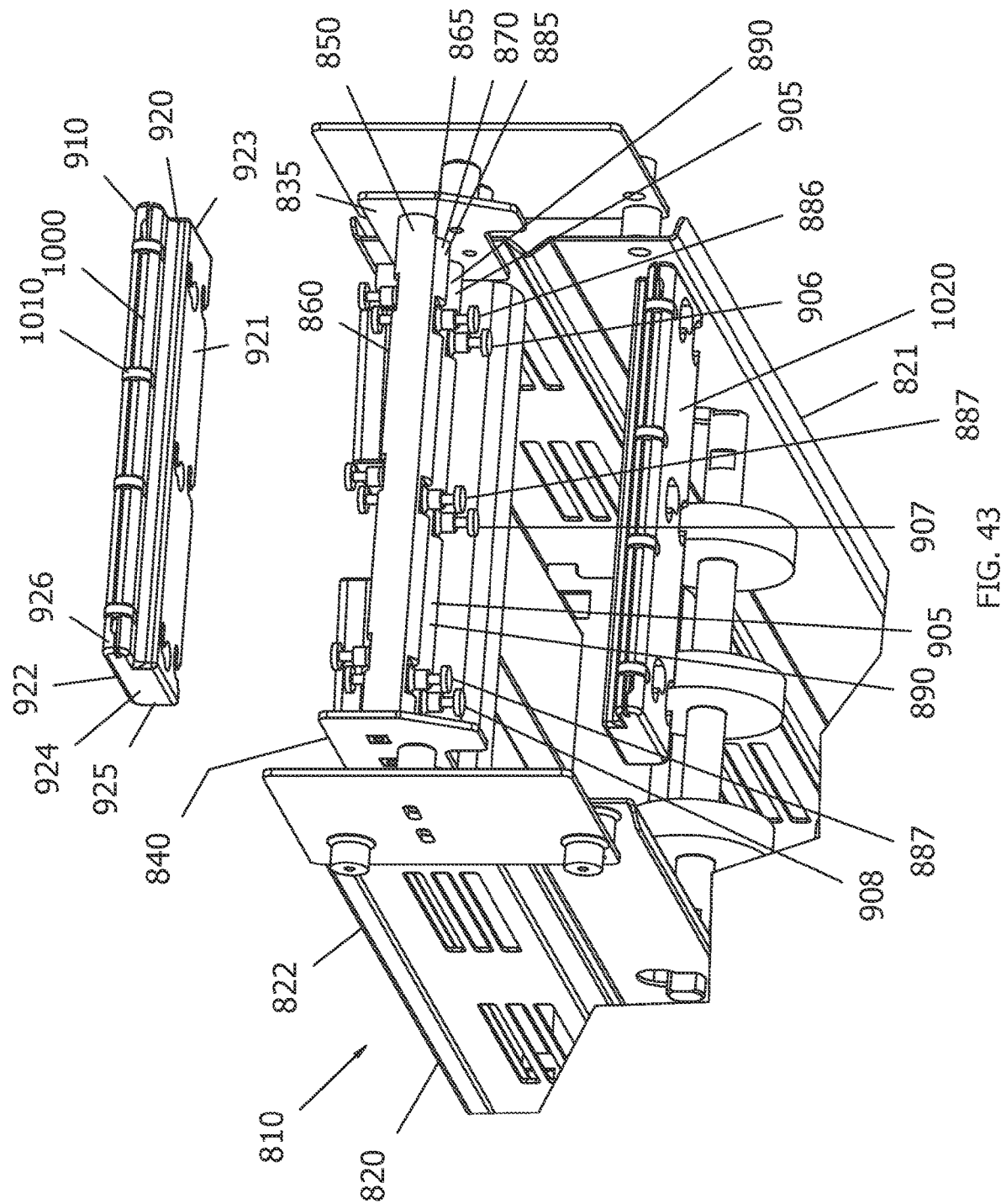
FIG. 43 is similar to FIG. 42 but shows the exploded view from an alternative viewing angle.

Removal of the noser 920 is illustrated in FIGS. 38-42. In FIG. 38, the guide rails 1030 and 1040 are in place in the noser 920 is locked. In FIG. 39, the guide rails 1030 and 1040 are moved longitudinally so that the hooks are fully disengaged from the frame spacer 850. The guide rails are illustrated being vertically removed in FIG. 40. Doing this laterally unlocks the noser 920. In FIG. 41, the noser 920 is moved laterally relative to the frame spacers 850, 870 and 890 to abut bracket 835. Doing this moves the noser so that the peg shafts are moved out of the respective notches. In FIG. 42, after the noser has been moved forward relative to the frame 820, the noser 920 is lifted from the pegs (stationary) at the bottom or rear entry of the respective holes as the noser is vertically moved.

The bearing shaft 1000 preferably has four bearings 1010. The bearings 1010 rotate about the shaft 1000. The shaft can have a generally circular profile along its longitudinal axis. The shaft 1000 is preferably stationarily held by the noser within the preferably rounded innermost portion of the interior 931 of the channel 930. It is appreciated that there could be more or fewer bearings without departing from the broad aspects of the present invention. The quantity of bearings can depend on conveyor width or other factors.

Dynamic noser assembly 910 is preferably supported by the upstanding pegs at the distal end of the carry way. Dynamic noser assembly 1020 is preferably supported by the depending or downward extending pegs at the beginning or proximal end of the return path.

Figure 49:
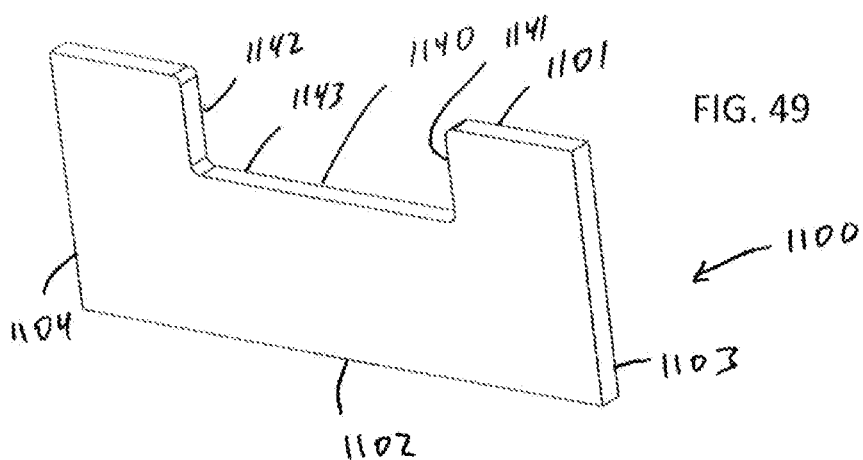
FIG. 49 is a perspective view of an embodiment of a spacer.

An embodiment of a spacer 1100 is illustrated in FIG. 49. Spacer 1100 has a top 1101, a bottom 1102, a side 1103 and a side 1104. A channel 1140 is formed in the spacer 1100. The channel 1140 is preferably open to the top 1101 of the spacer 1100 and is equally spaced between sides 1103 and 1104. The channel 1140 has side wall 1141, side wall 1142 and lower wall 1143. Side walls 1141 and 1142 are preferably parallel to each other and perpendicular to floor or lower wall 1143. The channel 1140 has a channel width.

Figure 50:
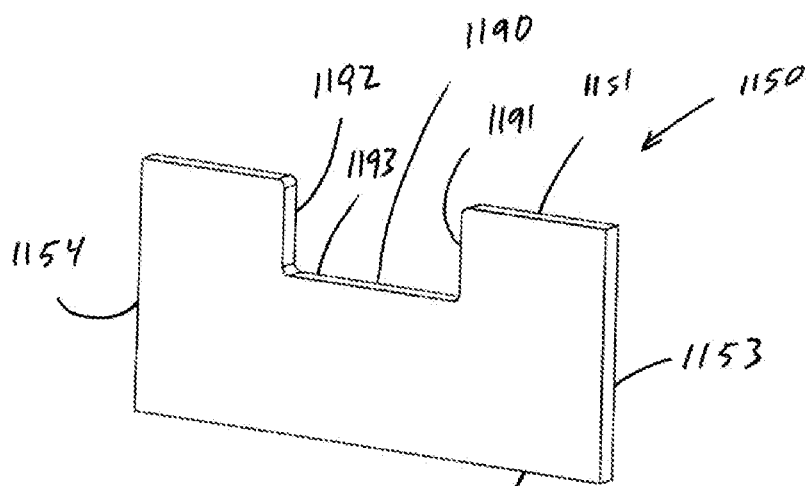
FIG. 50 is a perspective view of an embodiment of a spacer.

An embodiment of a spacer 1150 is illustrated in FIG. 50. Spacer 1150 has a top 1151, a bottom 1152, a side 1153 and a side 1154. A channel 1190 is formed in the spacer 1150. The channel 1190 is preferably open to the top 1151 of the spacer 1150 and is equally spaced between sides 1153 and 1154. The channel 1190 has side wall 1191, side wall 1192 and lower wall 1193. Side walls 1191 and 1192 are preferably parallel to each other and perpendicular to floor or lower wall 1193. The channel 1190 has a channel width.

Figure 51:
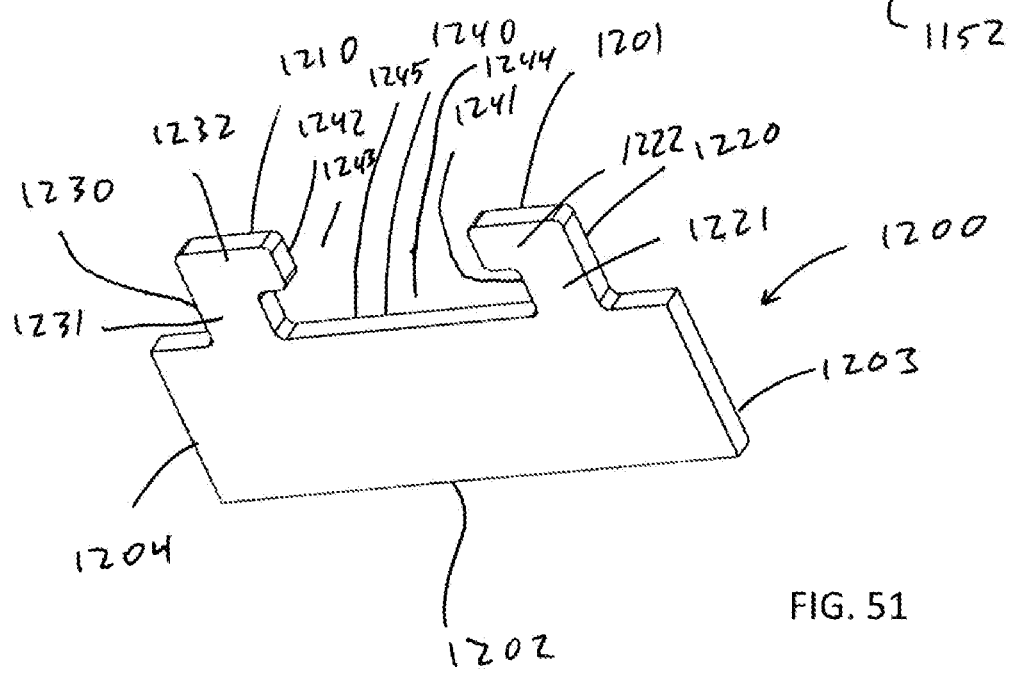
FIG. 51 is a perspective view of an embodiment of a spacer with a lock.

An embodiment of a spacer 1200 is illustrated in FIG. 51. Spacer 1200 has a top 1201, a bottom 1202, a side 1203 and a side 1204. A lock 1210 is provided on the top 1201 of the spacer 1200. The lock 1210 has an arm 1220 with a lower portion 1221 and an upper portion 1222. Arm 1220 is located inward of side 1203 and the upper portion 1222 extends further towards the center of the spacer 1200 than the lower portion 1221. The lock 1210 also has an arm 1230 with a lower portion 1231 and an upper portion 1232. Arm 1230 is located inward of side 1204 and the upper portion 1232 extends further towards the center of the spacer 1200 than the lower portion 1231. Arms 1220 and 1230 are preferably symmetrical about a central vertical axis of the spacer 1200. A channel 1240 is formed in the spacer 1200. The channel 1240 is preferably open to the top 1201 of the spacer 1200 and is equally spaced between sides 1203 and 1204. The channel 1240 has side wall 1241 (defined by arm 1220), side wall 1242 (defined by arm 1230) and lower wall 1243. The channel 1240 has a narrow top portion and a wide lower or bottom portion. It is appreciated how the upper portions 1222 and 1232 of arms 1220 and 1230 of the lock 1210 create a channel that can lock (vertically retain) an item within the wide lower portion of the channel 1240.

Figure 52:
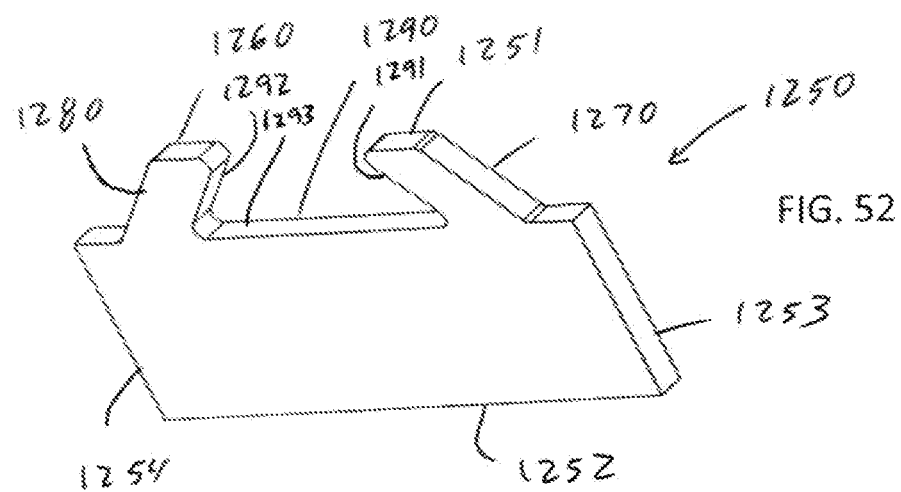
FIG. 52 is a perspective view of an embodiment of a spacer with a lock.
Figure 53:
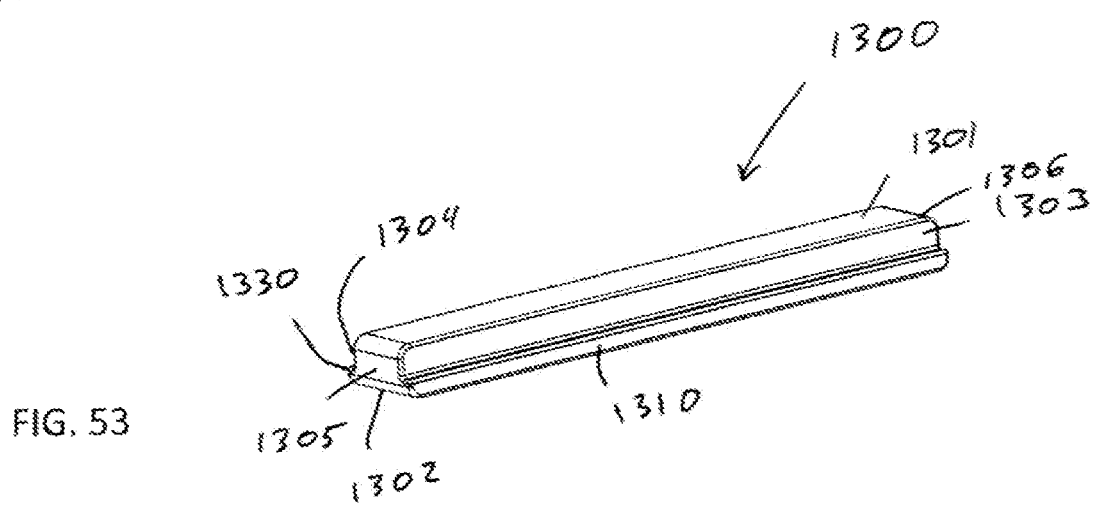
FIG. 53 is a perspective view of an embodiment of a wear strip.
Figure 54:
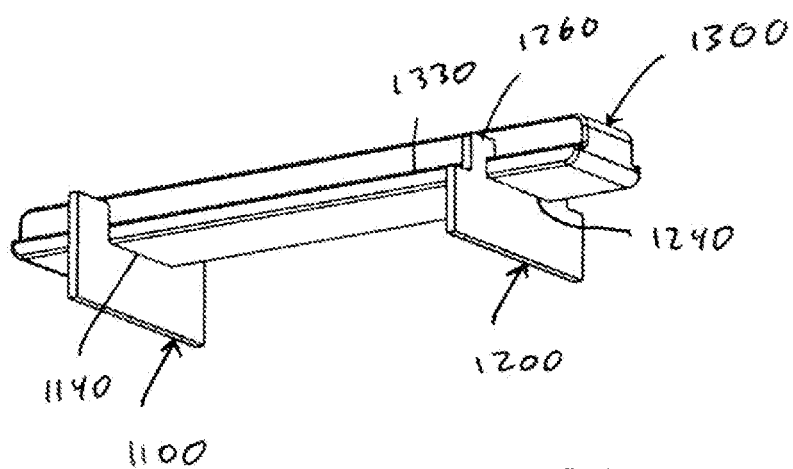
FIG. 54 is an isolation view of the wear strip of FIG. 53 shown with spacers in a locked position.
Figure 55:
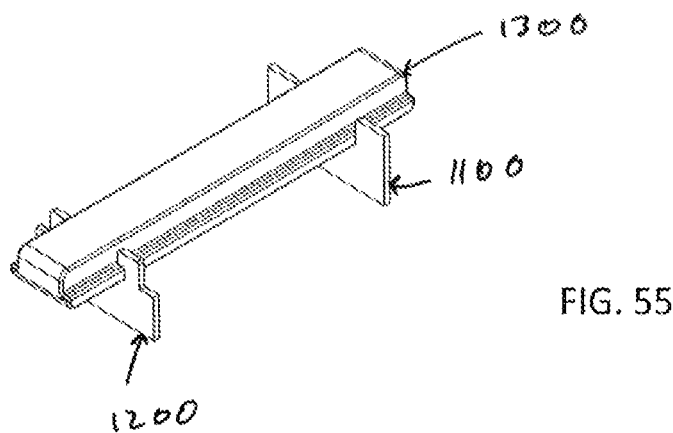
FIG. 55 is a reverse perspective view of the embodiment shown in FIG. 54.
Figure 56:
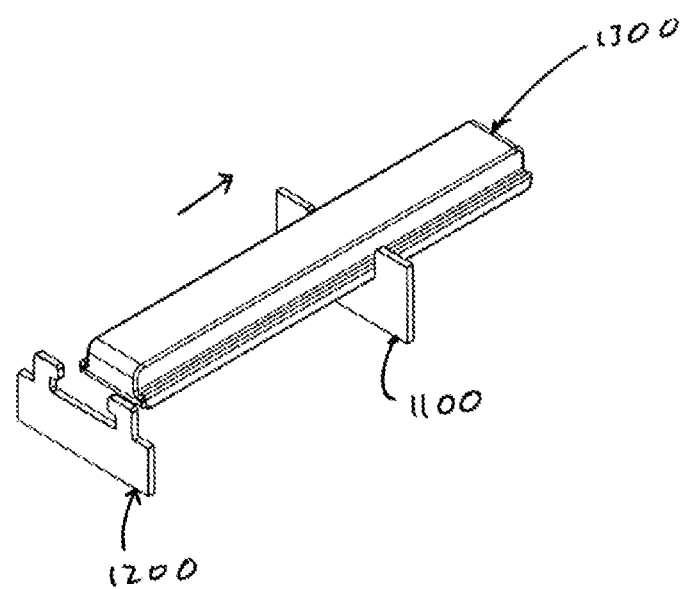
FIG. 56 is similar to FIG. 55 but shows the wear strip laterally moved relative to the spacers wherein the wear strip is in an unlocked position.
Figure 57:
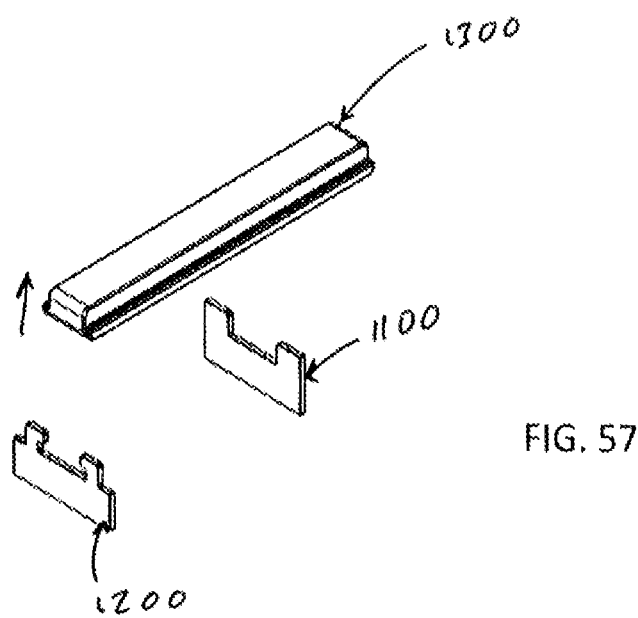
FIG. 57 is similar to FIG. 56 but shows the wear strip disengaged from the spacers.
Figure 58:
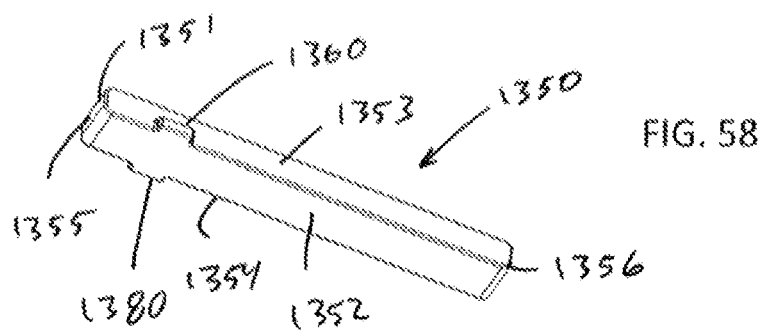
FIG. 58 is a perspective view of an embodiment of a wear strip.
Figure 59:
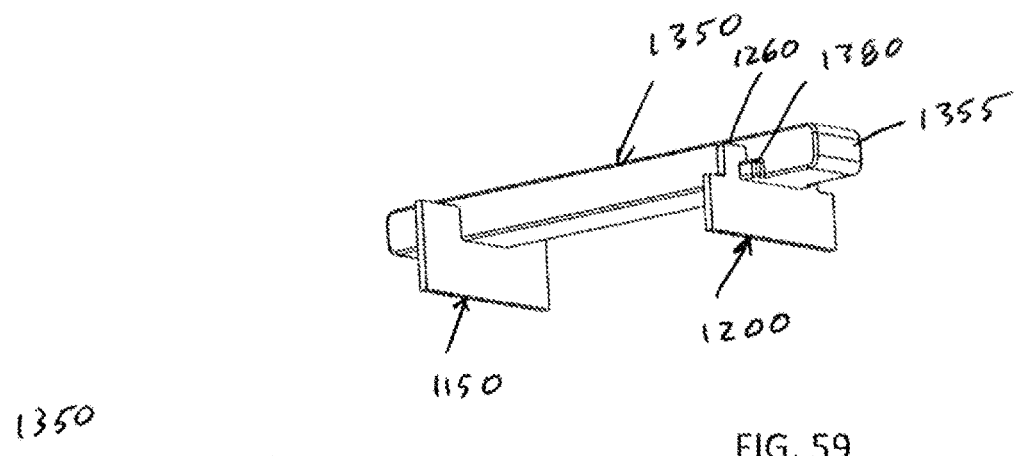
FIG. 59 is an isolation view of the wear strip of FIG. 58 shown with spacers in a locked position.
Figure 60:
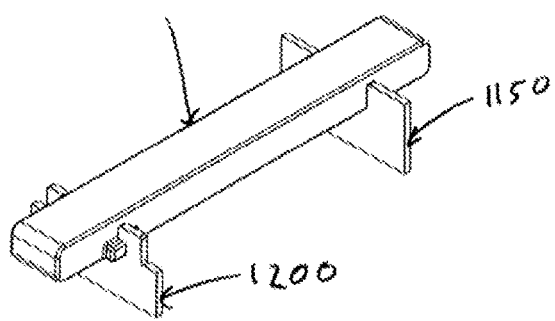
FIG. 60 is a reverse perspective view of the embodiment shown in FIG. 59.
Figure 61:
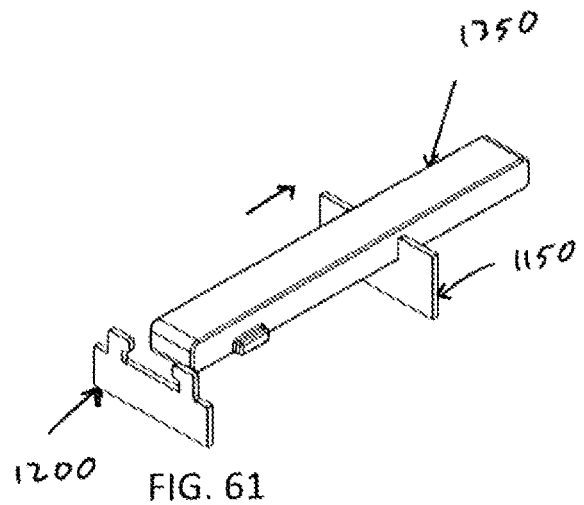
FIG. 61 is similar to FIG. 60 but shows the wear strip laterally moved relative to the spacers wherein the wear strip is in an unlocked position.
Figure 62:
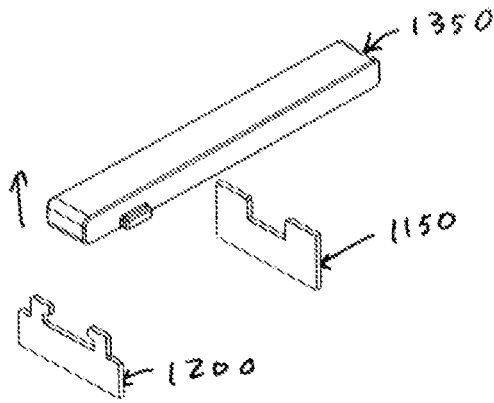
FIG. 62 is similar to FIG. 56 but shows the wear strip disengaged from the spacers.
Figure 63:
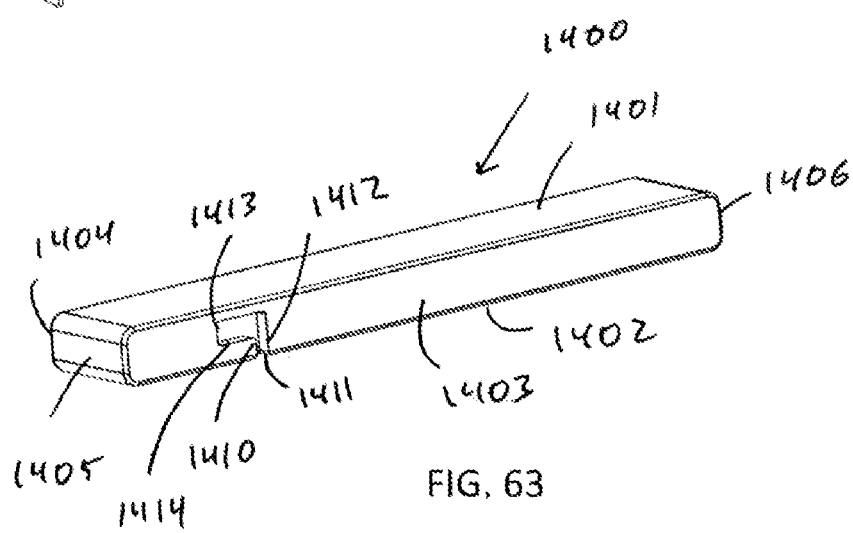
FIG. 63 is a perspective view of an embodiment of a wear strip.
Figure 64:
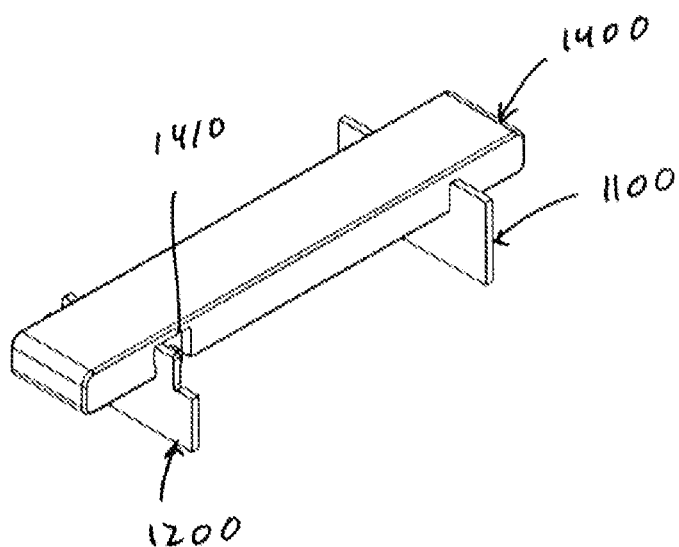
FIG. 64 is an isolation perspective view of the wear strip of FIG. 63 shown with spacers in a locked position.
Figure 65:
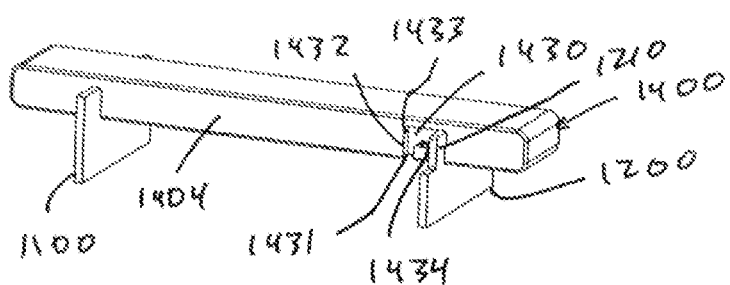
FIG. 65 is a reverse perspective view of the embodiment illustrated in FIG. 64.
Figure 66:
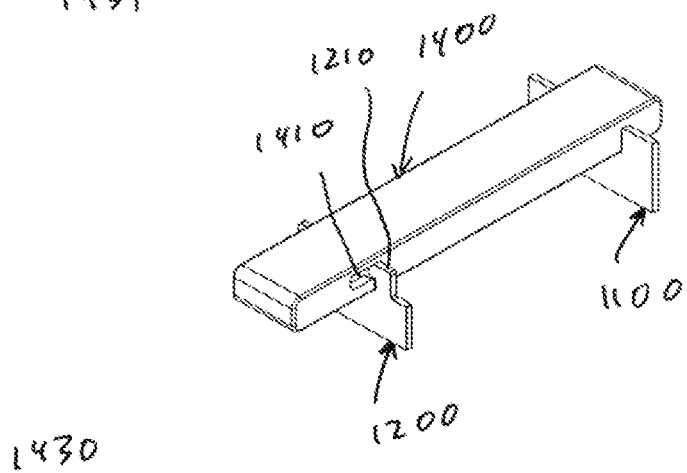
FIG. 66 is similar to FIG. 65 but shows the wear strip laterally moved relative to the spacers wherein the wear strip is in an unlocked position.
Figure 67:
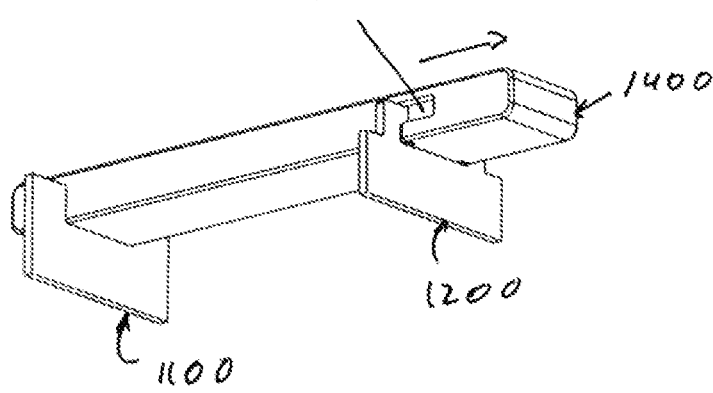
FIG. 67 is a reverse perspective view of the embodiment illustrated in FIG. 66.
Figure 68:
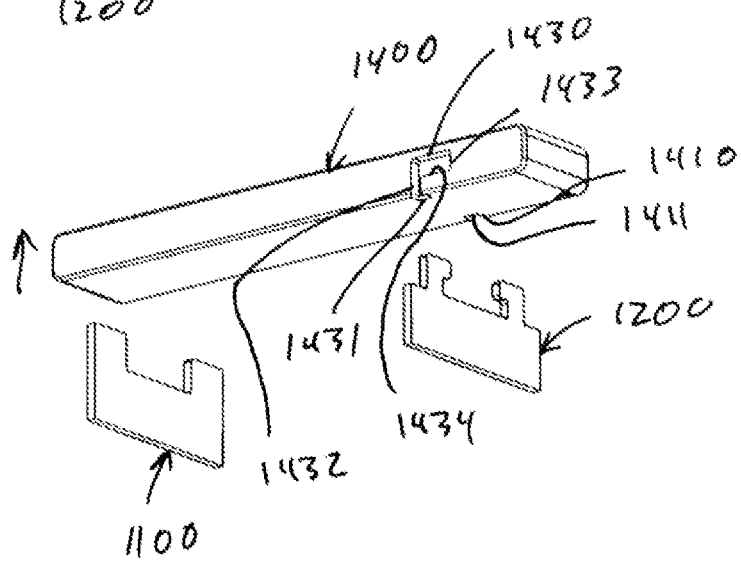
FIG. 68 is similar to FIG. 67 but shows the wear strip disengaged from the spacers.
Figure 69:
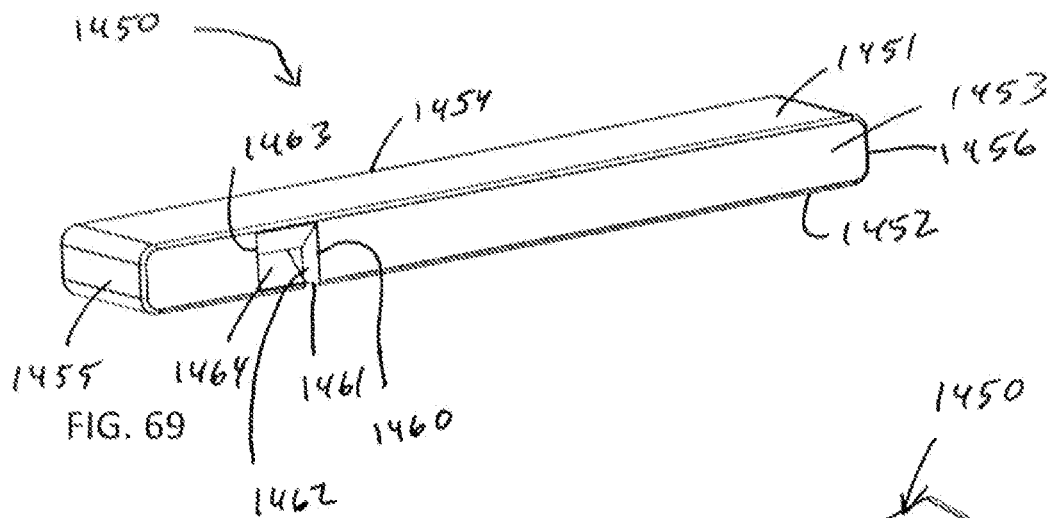
FIG. 69 is a perspective view of an embodiment of a wear strip.
Figure 70:
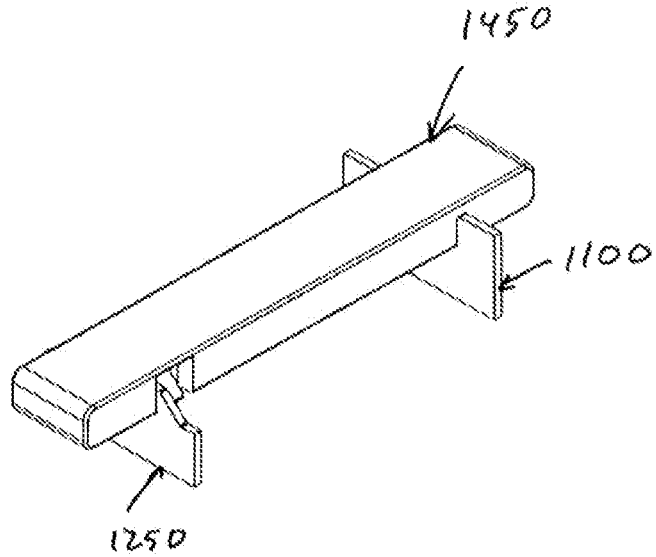
FIG. 70 is a perspective view of the embodiment of FIG. 69 shown with spacers in a locked position.
Figure 71:
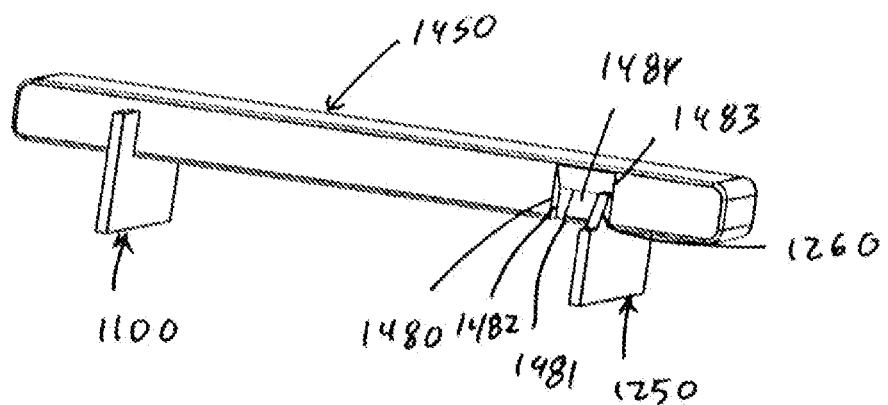
FIG. 71 is a reverse perspective view of the embodiment shown in FIG. 70.
Figure 72:
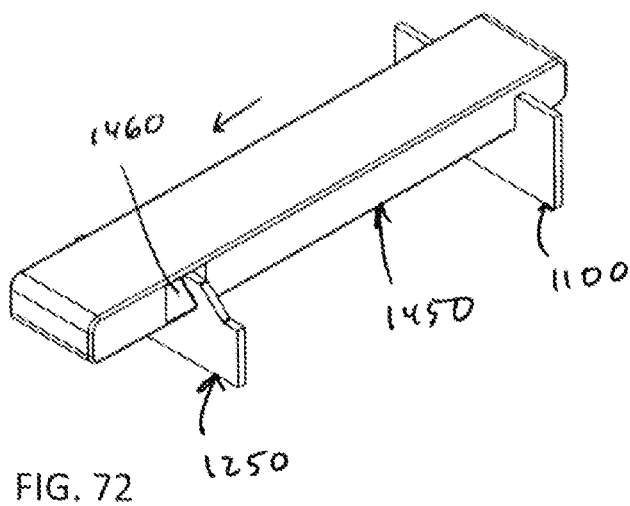
FIG. 72 is similar to FIG. 70 but shows the wear strip moved laterally relative to the spacers wherein the wear strip is in an unlocked position.
Figure 73:
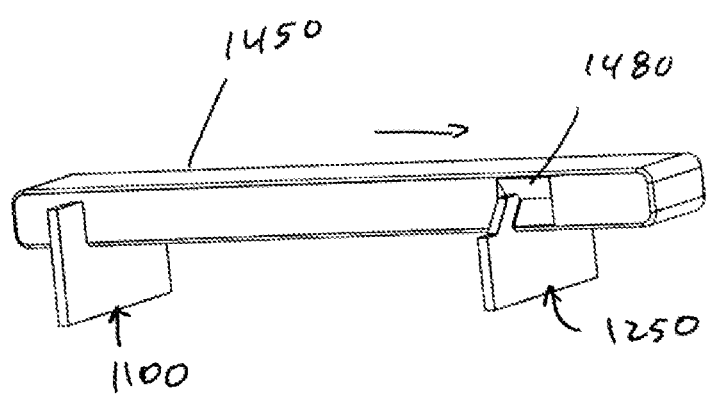
FIG. 73 is a reverse perspective view of the embodiment shown in FIG. 72.
Figure 74:
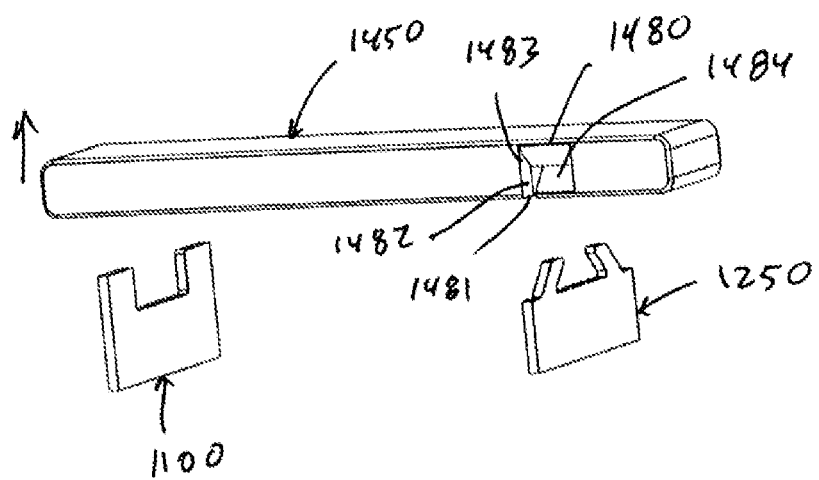
FIG. 74 is similar to FIG. 73 but shows the wear strip disengaged from the spacers.
Figure 75:
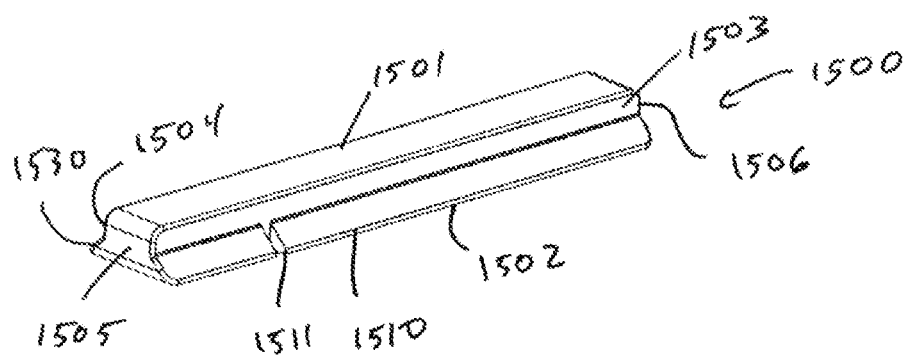
FIG. 75 is a perspective view of an embodiment of a wear strip.
Figure 76:
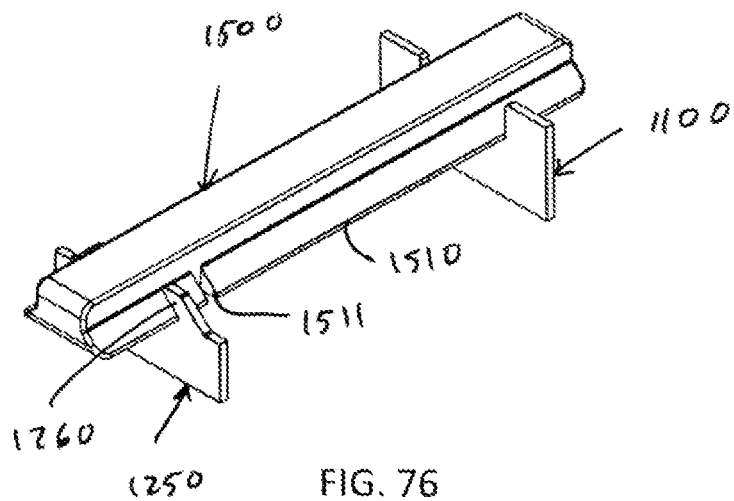
FIG. 76 is a perspective view of the embodiment of FIG. 75 shown with spacers in a locked position.
Figure 77:
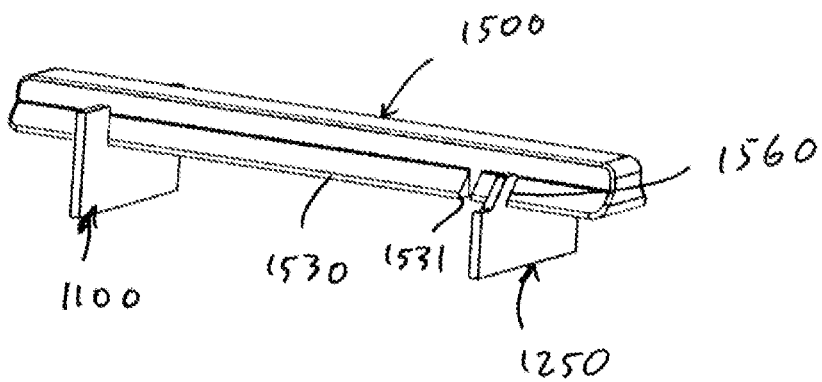
FIG. 77 is a reverse perspective view of the embodiment illustrated in FIG. 76.

An embodiment of a spacer 1250 is illustrated in FIG. 52. Spacer 1250 has a top 1251, a bottom 1252, a side 1253 and a side 1254. A lock 1260 is provided on the top 1251 of the spacer 1250. The lock 1260 has arms 1270 and 1280. Arms 1270 and 1280 are preferably symmetrical about a central vertical axis of the spacer 1250. The arms are preferably inwardly located from respective sides of the spacer and are inwardly oriented (top distal ends closer together than lower proximal ends). A channel 1290 is formed in the spacer 1250. The channel 1290 is preferably open to the top 1251 of the spacer 1250 and is equally spaced between sides 1253 and 1254. The channel 1290 has side wall 1291 (defined by arm 1270), side wall 1292 (defined by arm 1280) and lower wall 1293. The channel 1290 is narrower at the top and wider at the bottom on account of the inwardly angled arms. It is appreciated how the arms 1270 and 1280 of the lock 1260 create a channel that can lock (vertically retain) an item within the channel 1290.

An embodiment of a wear strip 1300 is illustrated in FIGS. 53-57. Wear strip 1300 has a top 1301, a bottom 1302, a side 1303, a side 1304, an end 1305 and an end 1306. A lip 1310 is located on side 1303 adjacent the bottom 1302 and spanning between ends 1305 and 1306. The lip 1310 preferably has a flat top that lies in a plane that is generally parallel with a top plane. A lip 1330 is located on side 1304 adjacent the bottom 1302 and spanning between ends 1305 and 1306. The lip 1330 preferably has a flat top that lies in a plane that is generally parallel with a top plane. The wear strip 1300 is shown in the locked position in FIGS. 54 and 55. In this position, the upper portion 1222 of arm 1220 engages the top of lip 1310 and the upper portion 1232 of arm 1230 engages the top of lip 1330 to prevent vertical movement of the wear strip 1300 relative to the spacer 1200. The wear strip 1300 is moved along its longitudinal axis until the lips are clear of the lock 1210 before the wear strip is vertically lifted from spacer 1100. The locking of the wear strip 1300 occurs in the reverse manner, lowering wear strip into channel 1140, sliding wear strip 1300 along its longitudinal axis until the lips 1310 and 1330 are locked below arms 1220 and 1230, respectively, of spacer 1200.

An embodiment of a wear strip 1350 is illustrated in FIGS. 58-62. Wear strip 1350 has a top 1351, a bottom 1352, a side 1353, a side 1354, an end 1355 and an end 1356. A lip 1360 is located on side 1353 adjacent the bottom 1302 and is locate near end 1355. The lip 1360 preferably has a flat top that lies in a plane that is generally parallel with a top plane. A lip 1380 is located on side 1354 adjacent the bottom 1352 and is located near end 1355. The lip 1380 preferably has a flat top that lies in a plane that is generally parallel with a top plane. The wear strip 1350 is shown in the locked position in FIGS. 59 and 60. In this position, the lock arms 1270 and 1280 engage to top of lips 1260 and 1380, respectively, to prevent vertical movement of the wear strip 1350 relative to the spacer 1250. The wear strip 1350 is moved along its longitudinal axis until the lips are clear of the lock 1260 before the wear strip is vertically lifted from spacer 1150. The locking of the wear strip 1350 occurs in the reverse manner, lowering wear strip into channel 1190, sliding wear strip 1350 along its longitudinal axis until the lips 1360 and 1380 are locked below arms 1270 and 1290, respectively, of spacer 1250.

An embodiment of a wear strip 1400 is illustrated in FIGS. 63-68. Wear strip 1400 has a top 1401, a bottom 1402, a side 1403, a side 1404, an end 1405 and an end 1406. A channel 1410 is formed in side 1403. The channel 1410 has an opening 1411 open to the bottom 1402 with a narrow passage 1412 and a wide passage 1413. The wide passage 1413 is above the narrow passage 1412, creating a lip 1414 where the wide passage extends beyond the narrow passage towards end 1405. A channel 1430 is formed in side 1404. The channel 1430 has an opening 1431 open to the bottom 1402 with a narrow passage 1432 and a wide passage 1433. The wide passage 1433 is above the narrow passage 1432, creating a lip 1434 where the wide passage extends beyond the narrow passage towards end 1405. Lips 1414 and 1434 are preferably planar and preferably lie in planes generally parallel to a wear strip top plane. Channels 1410 and 1430 are preferably symmetrical about the wear strip longitudinal axis. The wear strip 1400 is shown in the locked position in FIGS. 64 and 65. In this position, the upper portion 1222 of arm 1220 engages the top of lip 1414 and the upper portion 1232 of arm 1230 engages the top of lip 1434 to prevent vertical movement of the wear strip 1400 relative to the spacer 1200. The wear strip 1400 is moved along its longitudinal axis until the lips are clear of the lock 1210 before the wear strip is vertically lifted from spacer 1100 and spacer 1200 by having the lock pass through the narrow passages 1412 and 1432 and openings 1411 and 1431. The locking of the wear strip 1400 occurs in the reverse manner, lowering wear strip into channel 1140 and having the arms 1220 and 1230 pass through the openings 1411 and 1431 narrow passages 1412 and 1432, and sliding wear strip 1400 along its longitudinal axis until the lips 1414 and 1434 are locked below arms 1220 and 1230, respectively, of spacer 1200.

An embodiment of a wear strip 1450 is illustrated in FIGS. 69-74. Wear strip 1450 has a top 1451, a bottom 1452, a side 1453, a side 1454, an end 1455 and an end 1456. A channel 1460 is formed in side 1453. The channel 1460 has an opening 1461 open to the bottom 1452 with a narrow passage 1462 and a wide passage 1463. The wide passage 1463 is above the narrow passage 1462, creating a lip 1464 where the wide passage extends beyond the narrow passage towards end 1405. A channel 1480 is formed in side 1404. The channel 1480 has an opening 1481 open to the bottom 1402 with a narrow passage 1482 and a wide passage 1483. The wide passage 1483 is above the narrow passage 1482, creating a lip 1484 where the wide passage extends beyond the narrow passage towards end 1405. Lips 1464 and 1484 are preferably planar and preferably lie in angled planes. Channels 1460 and 1480 are preferably symmetrical about the wear strip longitudinal axis. The wear strip 1450 is shown in the locked position in FIGS. 70 and 71. In this position, the arms 1270 and 1280 engage the lips 1464 and 1484 to prevent vertical movement of the wear strip 1450 relative to the spacer 1250. The wear strip 1450 is moved along its longitudinal axis until the lips are clear of the lock 1260 before the wear strip is vertically lifted from spacer 1100 and spacer 1250 by having the lock pass through the narrow passages 1462 and 1482 and openings 1461 and 1481. The locking of the wear strip 1450 occurs in the reverse manner, lowering wear strip into channel 1140 and having the arms 1270 and 1280 pass through the openings 1461 and 1481, and narrow passages 1462 and 1482, and sliding wear strip 1450 along its longitudinal axis until the lips 1464 and 1484 are locked below arms 1270 and 1280, respectively, of spacer 1250.

Figure 78:
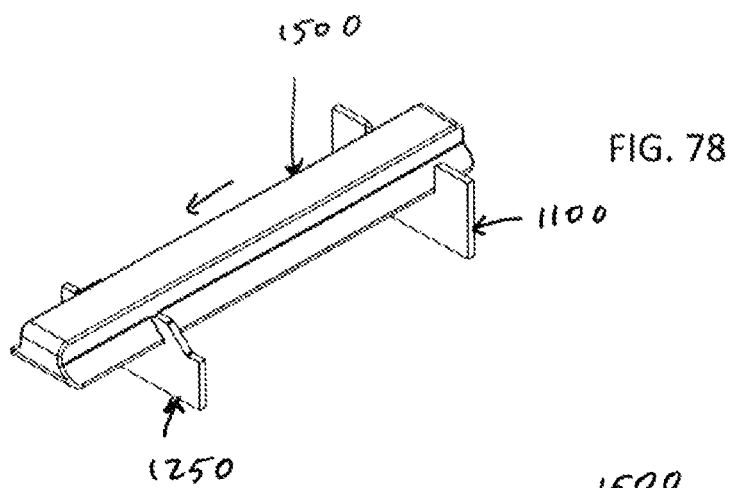
FIG. 78 is similar to FIG. 76 but shows the wear strip moved laterally relative to the spacers wherein the wear strip is in an unlocked position.
Figure 79:
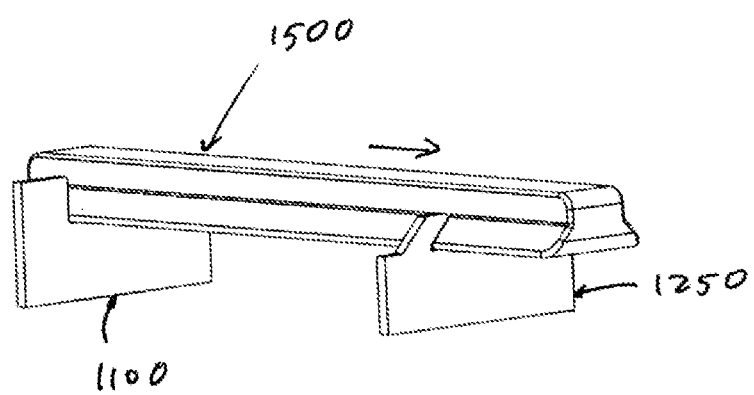
FIG. 79 is a reverse perspective view of the embodiment shown in FIG. 78.
Figure 80:
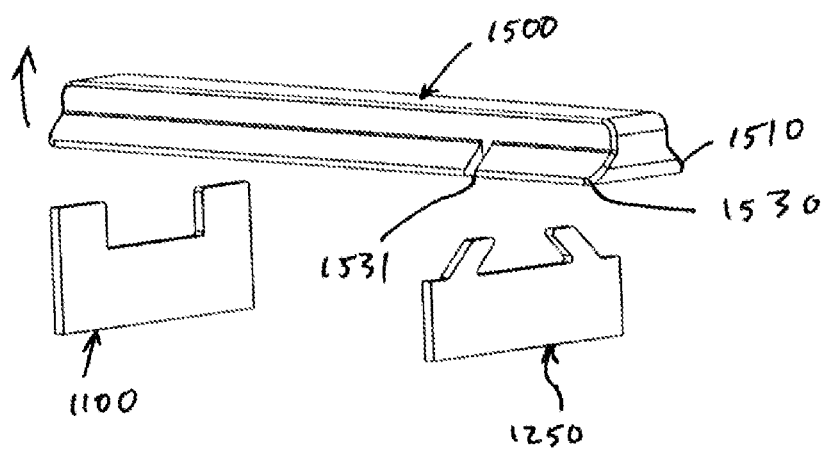
FIG. 80 is similar to FIG. 79 but shows the wear strip disengaged from the spacers.
Figure 81:
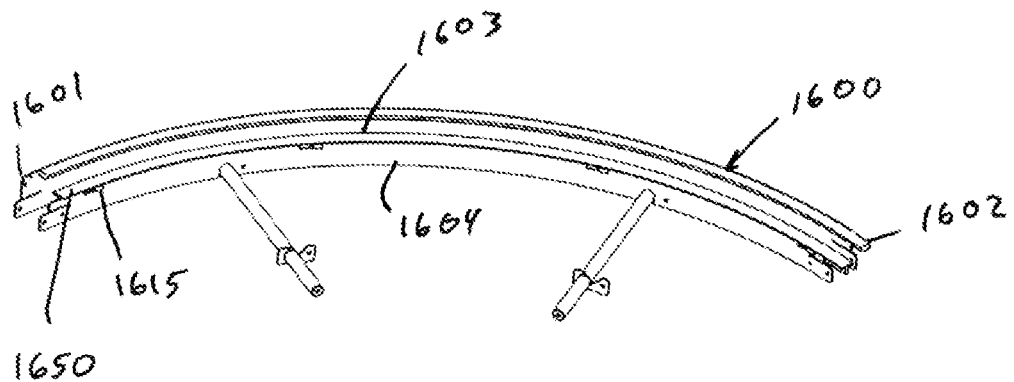
FIG. 81 is a perspective view showing a spiral frame and wear strip.
Figure 82:
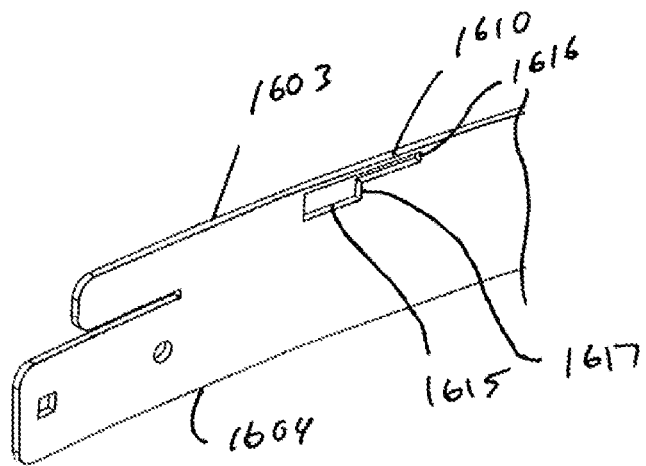
FIG. 82 is a partial isolation view of a section of the spiral frame shown in FIG. 81.
Figure 83:
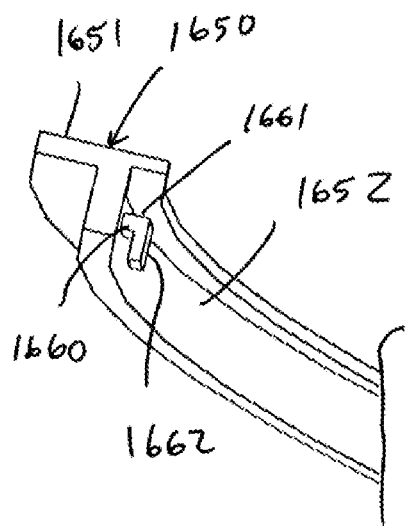
FIG. 83 is a partial isolation view of a section of the wear strip shown in FIG. 81.
Figure 84:
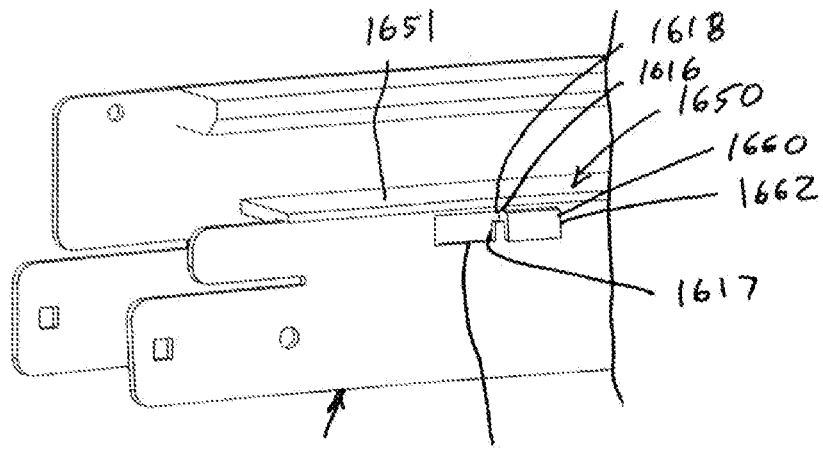
FIG. 84 is a close-up view showing the wear strip locked relative to the frame.
Figure 85:
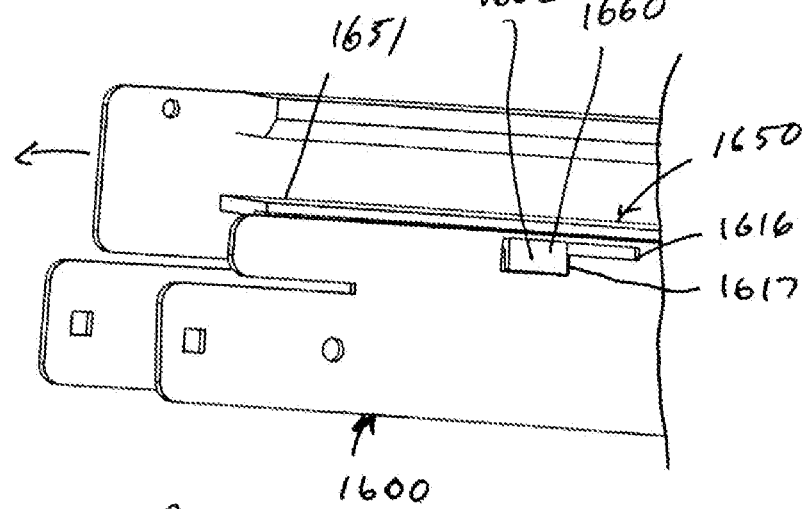
FIG. 85 is similar to FIG. 84 but shows the wear strip unlocked from the frame.
Figure 86:
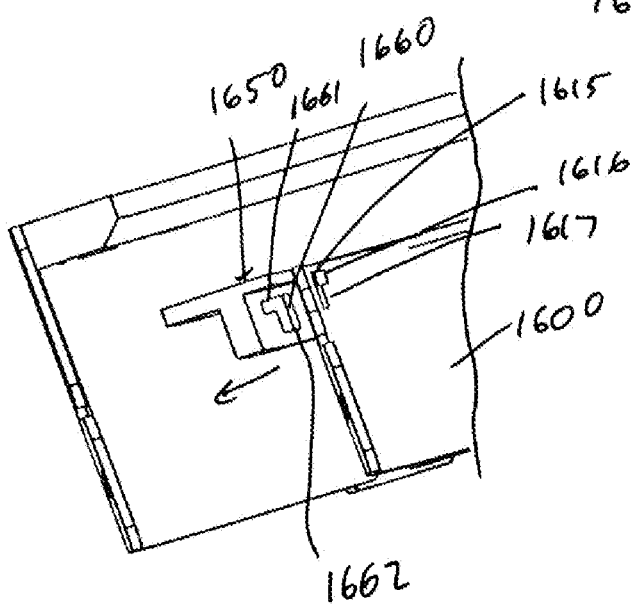
FIG. 86 is similar to FIG. 85 but shows the wear strip disengaged from the frame.
Figure 87:
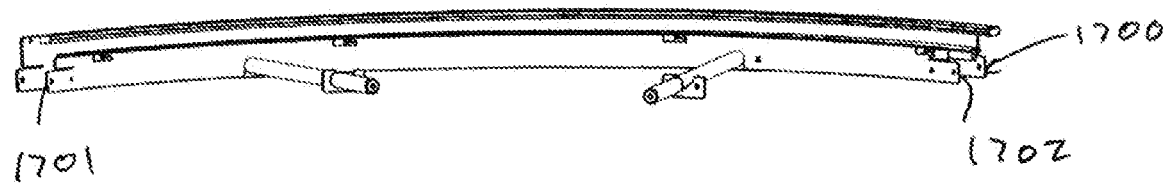
FIG. 87 is a perspective view showing a spiral frame and wear strip.
Figure 88:
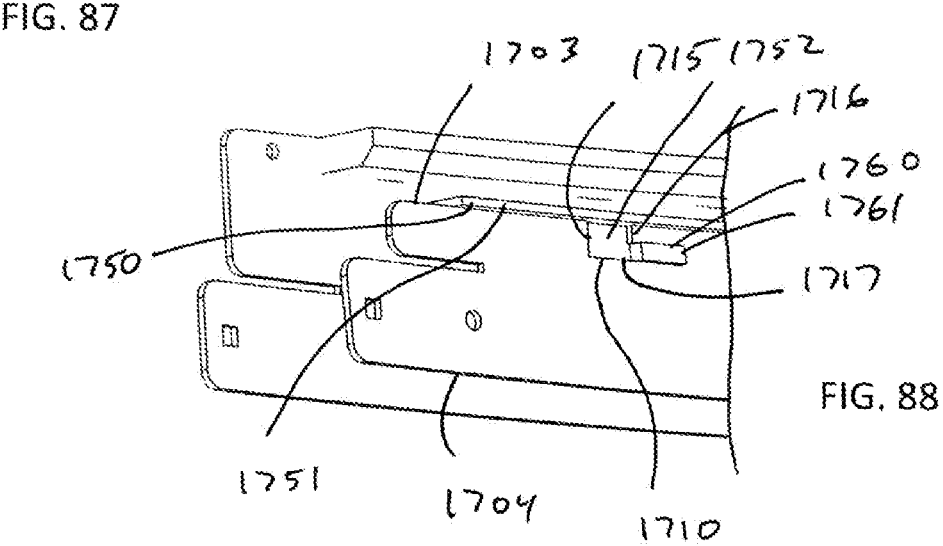
FIG. 88 is a close-up view showing the wear strip locked relative to the frame.
Figure 89:
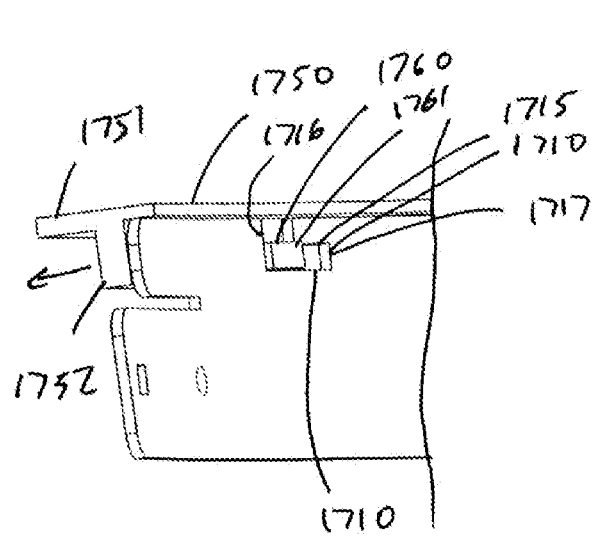
FIG. 89 is similar to FIG. 88 but shows the wear strip unlocked from the frame.
Figure 90:
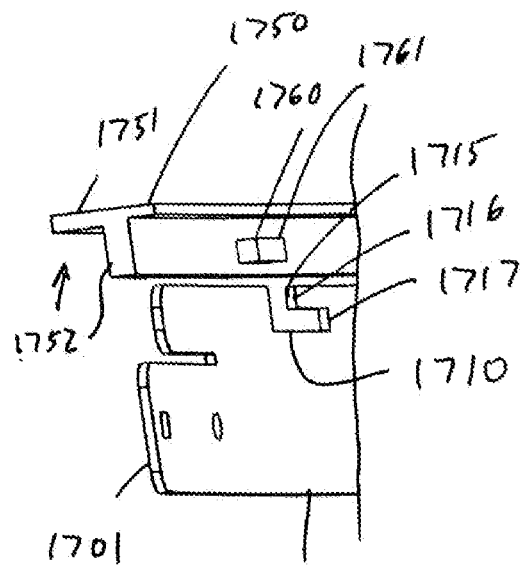
FIG. 90 is similar to FIG. 89 but shows the wear strip disengaged from the frame.

An embodiment of a wear strip 1500 is illustrated in FIGS. 75-80. Wear strip 1500 has a top 1501, a bottom 1502, a side 1503, a side 1504, an end 1505 and an end 1506. A lip 1510 is located on side 1503 adjacent the bottom 1502 and spanning continuously between ends 1505 and 1506 except for a slot 1511. The lip 1510 preferably has a flat top that lies in an angled plane. A lip 1530 is located on side 1504 adjacent the bottom 1502 and spanning continuously between ends 1505 and 1506 except for slot 1531. The lip 1530 preferably has a flat top that lies in an angled plane. The wear strip 1500 is shown in the locked position in FIGS. 76 and 77. In this position, the arms 1270 and 1280 of lock 1260 engage the lips 1510 and 1530, respectively to prevent vertical movement of the wear strip 1500 relative to the spacer 1250. The wear strip 1500 is moved along its longitudinal axis until the lips are vertically aligned with the slots, as seen in FIGS. 78 and 79, before the wear strip is vertically lifted from spacer 1100 and spacer 1250 by having the arms pass through the slots. The locking of the wear strip 1500 occurs in the reverse manner, lowering wear strip into channel 1140 and into channel 1290 by passing the arms through the slots, and then sliding wear strip 1500 along its longitudinal axis until the lips 1510 and 1530 are locked below arms 1270 and 1280, respectively, of spacer 1250.

An embodiment of a spiral frame 1600 and wear strip 1650 are illustrated in FIGS. 81-86. The frame 1600 has ends 1601 and 1602. A frame piece has a top 1603 and a bottom 1604. A lock 1610 is provided having an opening 1615 with a wide portion 1616 and a narrow portion 1617. The wide portion is above the narrow portion. The wear strip 1650 has a top 1651 and a wall 1652. The wall 1652 has a protrusion 1660 having a horizontal portion 1661 and a vertical portion 1662. The vertical portion 1662 is preferably in the spaced from the wall 1652 by the length of the horizontal portion 1661. The vertical portion can pass through the opening where the wide portion 1616 and narrow portion 1617 are vertically aligned. Then, the wear strip 1650 is moved along its longitudinal direction so that the horizontal portion 1661 is received within an end of the wide portion 1616 of the opening but the vertical portion 1662 is no longer aligned with the narrow portion 1617. In this locked position, the wear strip cannot move vertically or in/out with respect to the spiral frame 1600. The wear strip must be slid to allow the vertical portion 1662 to align with the narrow portion 1617 before the wear strip can be removed from the opening 1615. There are preferably several openings 1615 and corresponding protrusions 1660 so that a secure lock can be provided.

An embodiment of a spiral frame 1700 and wear strip 1750 are illustrated in FIGS. 87-90. The frame 1700 has ends 1701 and 1702. A frame piece has a top 1703 and a bottom 1704. A lock 1710 is provided having a channel 1715 with a narrow upper portion 1716 and a wide lower portion 1717. The wear strip 1750 has a top 1751 and a wall 1752. The wall 1752 has a protrusion 1760 that is preferably block shaped. The protrusion can enter the channel 1715, pass through the narrow upper portion 1716 and be received in the wide lower portion 1717. Then, the wear strip 1750 is moved along its longitudinal direction so that the protrusion 1760 is received within an end of the wide portion 1717 where it is no longer aligned with the narrow portion 1616. In this locked position, the wear strip cannot move vertically with respect to the spiral frame 1700. The wear strip 1750 is moved in the opposite direction so that it is unlocked (aligned with the narrow upper portion 1716) before it can be removed from the channel 1715. There are preferably several channels and corresponding protrusions allowing for a secure locking engagement of the wear strip and spiral frame.

Thus, it is apparent that there has been provided, in accordance with the invention, a wear strip that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A wear strip securable in place with a frame spacer having a lock, said wear strip comprising:
 a top;
 a bottom;
 a first side, said first side having a lip, said first side further having a channel formed therein with an opening, a narrow passage, and a wide passage, said lip being formed where said wide passage is wider than said narrow passage; and
 a second side,
 wherein the lock selectably engages said lip to lock said wear strip in position.

2. The wear strip of claim 1 wherein said lip is a first lip and said wear strip further comprises a second lip on said second side, said first lip and said second lip are engaged by the lock when said wear strip in in a locked position to prevent vertical movement of said wear strip relative to the frame spacer.

3. The wear strip of claim 2 wherein:
 said wear strip has a first end and a second end;
 said first lip is on said first side at said bottom; and
 said second lip is on said second side at said bottom.

4. The wear strip of claim 3 wherein said first lip spans completely between said first end and said second end and are symmetrical about a wear strip longitudinal axis.

5. The wear strip of claim 4 wherein said first lip has a flat top.

6. The wear strip of claim 5 wherein said flat top lies in a plane that is not parallel to a top plane of the top.

7. The wear strip of claim 6 wherein said first lip has a vertical slot therethrough.

8. The wear strip of claim 1 wherein said lip is a flat lip.

9. The wear strip of claim 8 wherein said flat lip is angled and lies in a plane that is not parallel to a top plane of said top.

10. In combination:
 a frame spacer having a lock comprised of a first arm and a second arm with a channel therebetween with a channel top and a channel bottom; and
 a wear strip comprising:
  a top;
  a bottom;
  a first side, said first side having a first lip; and
  a second side, said second side having a second lip, said second lip being a mirror image of said first lip with respect to a wear strip longitudinal axis,
 wherein said first arm of the lock selectably engages the first lip and the second arm of the lock selectably engages the second lip when said wear strip is in a locked position.

11. The combination of claim 10 wherein said first lip lies in a first lip plane and said second lip lies in a second lip plane.

12. The combination of claim 11 wherein said first lip has a first lip vertical slot therethrough and said second lip has a second lip vertical slot therethrough.

13. The combination of claim 10 wherein said frame spacer has a channel with a narrow upper gap and a wide lower gap.

14. The combination of claim 10 wherein said first arm and said second arm are inwardly angled whereby said channel is wider at said channel bottom.

15. A wear strip selectably securable to a spiral frame having a lock with an opening with a wide portion and a narrow portion, said wear strip comprising:
　a top; and
　a wall, said wall having a protrusion extending therefrom, said protrusion being selectably engaged by the lock when the wear strip is in a locked position relative to the spiral frame to prevent vertical movement of the wear strip relative to the spiral frame.

16. The wear strip of claim 15 wherein said protrusion has a horizontal section and vertical section, said vertical section being spaced apart from said wall.

17. The wear strip of claim 16 wherein said vertical section is passed through said opening where said wide portion and said narrow portion are aligned and moved to where said wide portion is not aligned with said narrow opening to lock said wear strip in position relative to the spiral frame.

18. The wear strip of claim 15 wherein said protrusion is a block.

19. The wear strip of claim 18 wherein said block is slid vertically from a top of the spiral frame through the narrow portion and slid laterally within the wide portion to lock the wear strip in a locked position.

20. A wear strip securable in place with a frame spacer having a lock and having a longest dimension along a frame spacer axis, said wear strip comprising:
　a top;
　a bottom;
　a longitudinal axis;
　a first side oriented parallel to said longitudinal axis, said first side having a lip parallel to said longitudinal axis; and
　a second side oriented parallel to said longitudinal axis,
　wherein the lock selectably engages said lip to lock said wear strip in a position, and
　wherein said longitudinal axis is perpendicular to the frame spacer axis when said wear strip is locked in said position.

21. In combination:
　a frame spacer having a lock comprised of a first arm and a second arm with a channel therebetween with a channel top and a channel bottom, said frame spacer having a longest dimension along a frame spacer longitudinal axis; and
　a wear strip comprising:
　　a top;
　　a bottom;
　　a wear strip longitudinal axis;
　　a first side, said first side having a first lip; and
　　a second side, said second side having a second lip,
　wherein said first arm of the lock selectably engages the first lip and the second arm of the lock selectably engages the second lip when said wear strip is in a locked position, and
　wherein said frame spacer longitudinal axis is perpendicular to said wear strip longitudinal axis when said wear strip is in said locked position.

* * * * *